United States Patent
Sasai et al.

(10) Patent No.: US 10,306,234 B2
(45) Date of Patent: May 28, 2019

(54) IMAGE DECODING METHOD, IMAGE CODING METHOD, IMAGE DECODING APPARATUS, IMAGE CODING APPARATUS, PROGRAM, AND INTEGRATED CIRCUIT

(71) Applicant: Panasonic Intellectual Property Corporation of America, Torrance, CA (US)

(72) Inventors: Hisao Sasai, Osaka (JP); Takahiro Nishi, Nara (JP); Youji Shibahara, Osaka (JP); Toshiyasu Sugio, Osaka (JP); Virginie Drugeon, Darmstadt (DE)

(73) Assignee: SUN PATENT TRUST, New York, NY (US)

( * ) Notice: Subject to any disclaimer, the term of this patent is extended or adjusted under 35 U.S.C. 154(b) by 0 days.

(21) Appl. No.: 14/546,111

(22) Filed: Nov. 18, 2014

(65) Prior Publication Data

US 2015/0071342 A1  Mar. 12, 2015

Related U.S. Application Data

(60) Continuation of application No. 14/054,974, filed on Oct. 16, 2013, which is a division of application No.
(Continued)

(30) Foreign Application Priority Data

Sep. 30, 2010  (JP) ................................ 2010-222996

(51) Int. Cl.
*H04N 19/14* (2014.01)
*H04N 19/103* (2014.01)
(Continued)

(52) U.S. Cl.
CPC ........... *H04N 19/14* (2014.11); *H04N 19/103* (2014.11); *H04N 19/176* (2014.11); *H04N 19/463* (2014.11)

(58) Field of Classification Search
CPC ..................................................... H04N 19/103
(Continued)

(56) References Cited

U.S. PATENT DOCUMENTS 6,907,142 B2   6/2005  Kalevo et al.
7,236,524 B2   6/2007  Sun et al.
(Continued)

FOREIGN PATENT DOCUMENTS

JP   2003-520531   7/2003
JP   2005-528047   9/2005
(Continued)

OTHER PUBLICATIONS

International Search Report dated Jan. 10, 2012 in International (PCT) Application No. PCT/JP2011/005444.
(Continued)

*Primary Examiner* — On S Mung
(74) *Attorney, Agent, or Firm* — Wenderoth, Lind & Ponack, L.L.P.

(57) ABSTRACT

An image decoding method includes: restoring a selected prediction mode used in prediction at a time of coding; and decoding a current block included in coded image data to generate a decoded block, according to the prediction based on the selected prediction mode. The restoring includes: determining a first estimated prediction mode; determining a second estimated prediction mode different from the first estimated prediction mode; and restoring the selected prediction mode based on the mode information, the first estimated prediction mode, and the second estimated prediction mode.

8 Claims, 39 Drawing Sheets

Related U.S. Application Data

13/814,255, filed as application No. PCT/JP2011/005444 on Sep. 28, 2011, now abandoned.

(51) Int. Cl.
*H04N 19/176* (2014.01)
*H04N 19/463* (2014.01)

(58) Field of Classification Search
USPC ........................................ 375/240.12, 240.25
See application file for complete search history.

(56) References Cited

U.S. PATENT DOCUMENTS

| | | | |
|---|---|---|---|
| 7,289,672 | B2 | 10/2007 | Sun et al. |
| 7,295,713 | B2 | 11/2007 | Kalevo et al. |
| 7,386,048 | B2 | 6/2008 | Sun et al. |
| 7,567,719 | B2 | 7/2009 | Kalevo et al. |
| 8,228,986 | B2 | 7/2012 | Sun et al. |
| 8,233,538 | B2 | 7/2012 | Sun et al. |
| RE43,567 | E | 8/2012 | Sun et al. |
| 8,279,927 | B2 | 10/2012 | Sun et al. |
| 8,711,935 | B2 | 4/2014 | Kim et al. |
| 8,811,469 | B2 | 8/2014 | Kim et al. |
| 2001/0017942 | A1 | 8/2001 | Kalevo et al. |
| 2003/0223495 | A1 | 12/2003 | Sun et al. |
| 2003/0223496 | A1 | 12/2003 | Sun et al. |
| 2003/0223645 | A1 | 12/2003 | Sun et al. |
| 2005/0254717 | A1 | 11/2005 | Kalevo et al. |
| 2007/0133891 | A1 | 6/2007 | Jeong |
| 2008/0152004 | A1 | 6/2008 | Fujisawa et al. |
| 2008/0175318 | A1 | 7/2008 | Sun et al. |
| 2008/0175319 | A1 | 7/2008 | Sun et al. |
| 2008/0175320 | A1 | 7/2008 | Sun et al. |
| 2008/0175321 | A1 | 7/2008 | Sun et al. |
| 2008/0247657 | A1 | 10/2008 | Kalevo et al. |
| 2009/0232206 | A1 | 9/2009 | Boon et al. |
| 2010/0128995 | A1* | 5/2010 | Drugeon .......... H04N 19/00733 382/238 |
| 2010/0260261 | A1 | 10/2010 | Kotaka et al. |
| 2011/0243229 | A1 | 10/2011 | Kim et al. |
| 2011/0268188 | A1 | 11/2011 | Kim et al. |
| 2011/0292994 | A1 | 12/2011 | Lim et al. |
| 2011/0317757 | A1 | 12/2011 | Coban et al. |
| 2012/0008683 | A1 | 1/2012 | Karczewicz et al. |
| 2014/0185675 | A1 | 7/2014 | Kim et al. |
| 2015/0249825 | A1 | 9/2015 | Kim et al. |
| 2015/0249826 | A1 | 9/2015 | Kim et al. |

FOREIGN PATENT DOCUMENTS

| | | |
|---|---|---|
| JP | 2007-116351 | 5/2007 |
| WO | 01/54416 | 7/2001 |
| WO | 03/101117 | 12/2003 |
| WO | 2010/032941 | 3/2010 |
| WO | 2010/077071 | 7/2010 |

OTHER PUBLICATIONS

Tomoyuki Yamamoto et al., "Flexible Representation of Intra Prediction Modes", Joint Collaborative Team on Video Coding (JCT-VC) of ITU-T SG16 WP3 and ISO/IEC JTC1/SC29/WG11, JCTVC-B063, 2nd Meeting: Geneva, CH, Jul. 21-28, 2010.

ISO/IEC 14496-10 (MPEG-4 Part10: Advanced Video Coding), Oct. 1, 2004.

Virginie Drugeon et al., "High Precision Edge Prediction for Intra Coding", 15th IEEE International Conference on Image Processing (ICIP 2008), Oct. 12-15, 2008.

Vadim Seregin, Tammy Lee, Jianle Chen, "Intra mode parsing without access neighbouring information", Joint Collaborative Team on Video Coding (JCT-VC) of ITU-T SG16 WP3 and ISO/IEC JTC1/SC29/WG11 6th Meeting: Torino, IT, Jul. 14-22, 2011, [JCTVC-F378].

Office Action dated Apr. 21, 2014 in U.S. Appl. No. 13/814,255.
Office Action dated Apr. 17, 2014 in U.S. Appl. No. 14/054,974.
Extended European Search Report dated May 26, 2015 in European Application No. 11828426.4.

"Test Model under Consideration", Joint Collaborative Team on Video Coding (JCT-VC) of ITU-T SG16 WP3 and ISO/IEC JTC1/SC29/WG11, JCTVC-B205, $2^{nd}$ Meeting: Geneva, CH, Jul. 21-28, 2010, XP030007704.

Amonou et al., "Video coding technology proposal by France Telecom, NTT, NTT DoCoMo, Panasonic and Technicolor", Joint Collaborative Team on Video Coding (JCT-VC) of ITU-T SG16 WP3 and ISO/IEC JTC1/SC29/WG11, JCTVC-A114—Annex A, $1^{st}$ Meeting: Dresden, DE, Apr. 15-23, 2010, XP030007553.

ISO/IEC 14496-10 (MPEG-4 Part 10: Advanced Video Coding), Reference No. ISO/IEC 14496-10:200X (E), Apr. 16, 2010, XP030017580.

Office Action dated Nov. 19, 2015 in Chinese Patent Application No. 201180037651.2, with English translation of Search Report.

Official Communication dated Mar. 31, 2016 in European Application No. 11828426.4.

Communication pursuant to Article 94(3) EPC dated Nov. 10, 2016 in European patent application No. 11828426.4.

Office Action dated Nov. 18, 2016 in U.S. Appl. No. 15/233,069.

* cited by examiner

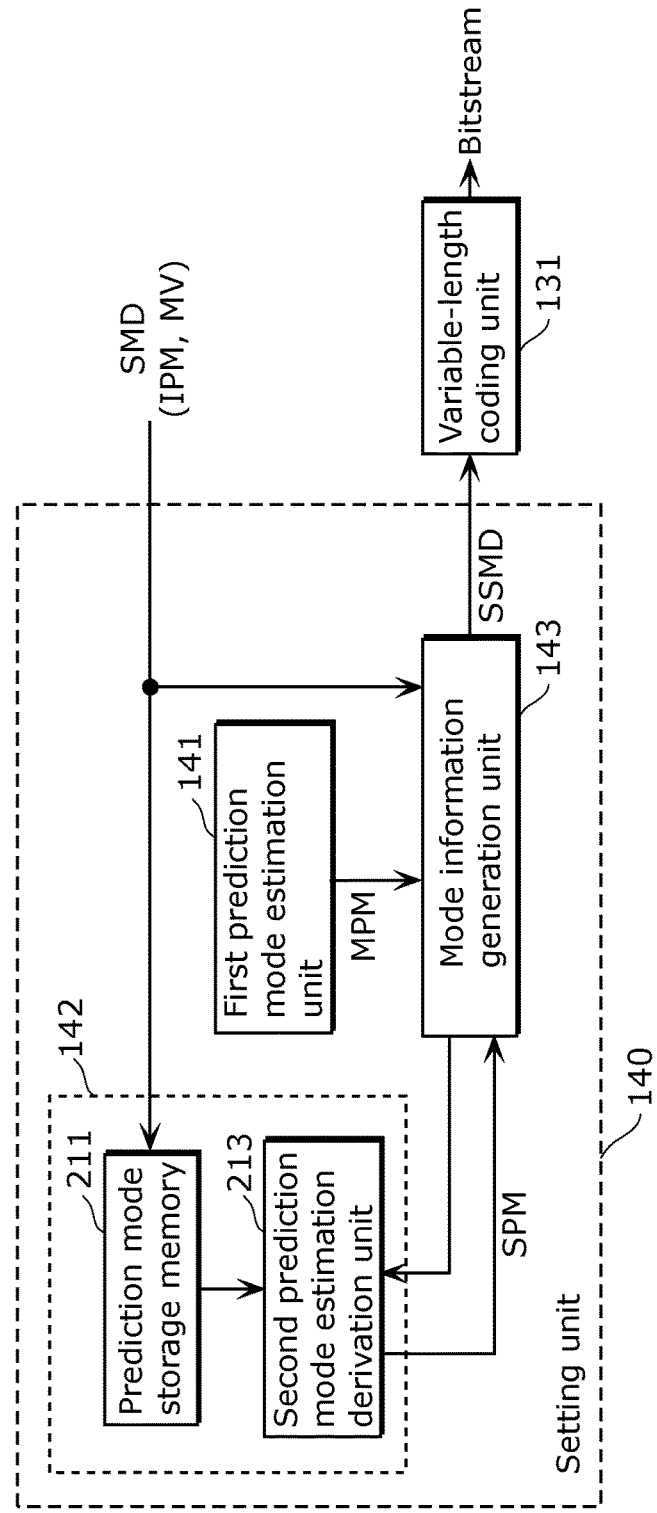

FIG. 35

| Corresponding standard | Driving frequency |
|---|---|
| MPEG-4 AVC | 500 MHz |
| MPEG-2 | 350 MHz |
| ⋮ | ⋮ |

FIG. 36
(a)
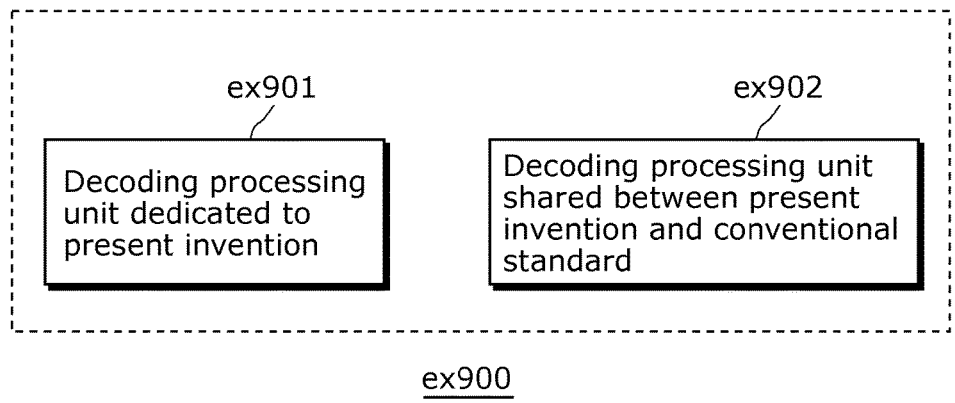
(b)
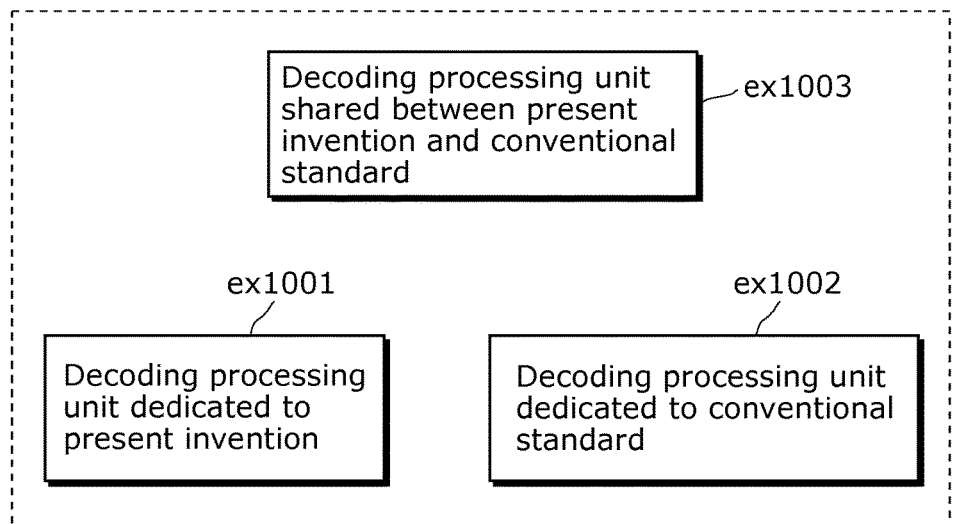

IMAGE DECODING METHOD, IMAGE CODING METHOD, IMAGE DECODING APPARATUS, IMAGE CODING APPARATUS, PROGRAM, AND INTEGRATED CIRCUIT

TECHNICAL FIELD

The present invention relates to an image coding method for performing compression coding on image data or video data with higher coding efficiency, an image decoding method for decoding compressed-coded image data or compressed-coded video data, an image coding apparatus thereof, an image decoding apparatus thereof, a program thereof, and an integrated circuit thereof.

BACKGROUND ART

The number of applications used for, for example, video-on-demand type service including video-conferencing, digital video broadcasting, and video content streaming via the Internet continues to increase. These applications are dependent on the transmission of video data. When the video data is transmitted or recorded, a significant amount of data is transmitted through a conventional transmission channel having a limited bandwidth or is recorded into a conventional recording medium having a limited data capacity. In order to transmit the video data through the conventional transmission channel or record the video data into the conventional recording medium, it is absolutely essential to compress or reduce the amount of digital data.

With this being the situation, multiple video coding standards have been developed for video data compression. Examples of the video coding standards include the standards of the International Telecommunication Union Telecommunication Standardization Sector (ITU-T) standard specified by "H.26X" and the International Standards Organization/International Electrotechnical Commission (ISO/IEC) specified by "MPEG-x". Currently, the latest and most advanced video coding standard is presented by the H.264/MPEG-4 AVC standard (see Non Patent Literature 1).

The basic coding approach taken by most of these standards is based on predictive coding that includes the following main stages [a] to [d].

[a] In order to perform data compression for each of video frames at the block level, the video frame is divided into blocks.

[b] Temporal and spatial redundancy is determined by predicting an individual block from previously-coded video data.

[c] The determined redundancy is eliminated by reducing the predicted data from the video data.

[d] The rest of the data is compressed by the Fourier transform, quantization, and entropy coding.

According to the existing video coding standard, a prediction mode used for predicting macroblocks is different for each of the blocks. Most of the video coding standards employ motion estimation and motion compensation in order to predict video data from a previously-coded or -decoded frame (inter-frame prediction). Alternatively, block data may be predicted from an adjacent block included in the same frame (intra-frame prediction). The H.264/AVC standard defines some different intra-frame prediction modes for a reference pixel used for prediction or for a direction in which a pixel is to be extrapolated.

FIG. 1A is a diagram showing an example of a relationship between a current block to which intra prediction estimation based on the conventional H.264/AVC standard is applied and a reference pixel. FIG. 1B is a diagram showing prediction directions included in an intra prediction mode set based on the conventional H.264/AVC standard.

As shown in FIG. 1A, a current block 10 having the size of 4 by 4 pixels is predicted by extrapolating thirteen reference pixels 20 located immediately above and left of the current block 10. By this prediction, a predicted block corresponding to the current block 10 is generated. At this time, in order to execute the extrapolation, one of eight possible extrapolation directions (intra-prediction directions) as shown in FIG. 1B is selected. To be more specific, one direction prediction mode is selected from among eight direction prediction modes indicating the respective eight extrapolation directions. Alternatively, a direct-current (DC) prediction mode may be selected. In the DC prediction mode, an average value of the reference pixels 20 is used for predicting the current block 10.

As described, the prediction mode used for prediction is selected from among the multiple prediction modes for each macroblock. Then, the coded current block is compressed by entropy coding and transmitted together with information related to the selected prediction mode. According to the existing video coding standard, an estimated value is predicted as the information related to the selected prediction mode, based on a rule predetermined by the standard. For example, as information indicating an intra prediction mode defined by the H.264/AVC, the estimated value of the intra prediction mode is determined as a small number indicating the prediction method among the intra prediction modes of the previously-coded neighboring blocks.

Then, when the estimated prediction value and the information regarding the current block to be coded agree with each other, only a flag indicating this agreement is transmitted. On the other hand, when the estimated value and the information regarding the current block disagree with each other, the information regarding the current block is transmitted. For example, when the estimated value of the intra prediction mode agrees with the prediction mode that is actually selected at a time of coding, only the flag is transmitted. On the other hand, when the estimated value disagrees with the selected prediction mode, information used for restoring the selected prediction mode is transmitted.

FIG. 2 is a diagram showing an example of a detailed configuration of a setting unit 510, among components of an image coding apparatus based on the conventional H.264/AVC standard. The setting unit 510 estimates a prediction mode and sets a coded value of the prediction mode. FIG. 3 is a diagram showing an example of a detailed configuration of a restoration unit 620, among components of an image decoding apparatus based on the conventional H.264/AVC standard. The restoration unit 620 restores the prediction mode.

As shown in FIG. 2, the setting unit 510 receives coding mode information SMD indicating a coding mode (the intra prediction mode or the inter prediction mode). For example, when intra-picture prediction coding is selected as the coding mode, the coding mode information SMD represents information IPM indicating the intra prediction mode. On the other hand, when inter-picture prediction coding is selected as the coding mode, the coding mode information SMD represents location information (motion vector) MV.

A prediction mode storage memory 511 stores the received coding mode information SMD. A prediction mode estimation unit 512 obtains, using a predetermined means, estimated prediction mode value candidates from among the previously-coded coding mode information pieces received from the prediction mode storage memory 511.

The following describes an example of a method whereby prediction mode estimation units 512 and 624 based on the H.264/AVC standard estimate an estimated prediction mode value MPM of a 4-by-4-pixel block, with reference to FIG. 1A.

In coding and decoding steps, the prediction mode estimation units 512 and 624 obtain, for the current block 10 having the size of 4 by 4 pixels, an intra prediction mode IPM_A of a neighboring block 30 that has been previously coded (or decoded) and an intra prediction mode IPM_B of a neighboring block 40 that has been previously coded (or decoded). Then, according to Expression 1 described below, one of IPM_A and IPM_B that has a smaller value is set as the estimated prediction mode value MPM.

$$MPM = \text{Min}(\text{PredMode}A, \text{PredMode}B) \quad \text{Expression 1}$$

Here, each of "PredModeA" and "PredModeB" indicates a number of an index specifying the prediction mode used in the neighboring block. Moreover, "Min ( )" is a function that outputs the index having the smaller number.

The prediction mode estimation unit 512 determines the estimated prediction mode value MPM from among the estimated prediction mode value candidates, and outputs the determined estimated prediction mode value MPM.

A mode information generation unit 515 compares the coding mode IPM of the current block to be coded and the estimated prediction mode value MPM. When these modes agree with each other, the mode information generation unit 515 sets a flag indicating the agreement with the estimated prediction mode value MPM to a prediction-coding-mode related signal SSMD. On the other hand, when these modes disagree with each other, the mode information generation unit 515 outputs, as the prediction-coding-mode related signal SSMD, the index of the mode signal other than the corresponding index. The setting method of the mode information generation unit 515 is represented by Expression 2.

[Math. 1]
```
if (MPM==IPM) {
    Prev_Intra_Pred_Mode_Flag=1
}
else {
    Prev_Intra_Pred_Mode_Flag=0
    if (IPM<MPM) {
        Rem_Intra_Pred_Mode = IPM
    }
    else {
        Rem_Intra_Pred_Mode = IPM−1
    }
}
```
... Expression 2

As indicated by Expression 2, the coding mode IPM that is the index of the coding mode of the current block is firstly compared with the estimated prediction mode value MPM calculated by Expression 1. When these modes agree with each other, a flag Prev_Intra_Pred_Mode_Flag that indicates whether or not the coding mode IPM agrees with the estimated prediction mode value MPM is set at "1". Then, this flag is outputted as the prediction-coding-mode related signal SSMD. On the other hand, when the coding mode IPM that is the index of the coding mode of the current block disagrees with the estimated prediction mode value MPM calculated by Expression 1, the flag Prev_Intra_Pred_Mode_Flag is set at "0". Then, the sizes of indexes are compared. When the index of the coding mode of the current block is smaller than the estimated prediction mode value MPM, information Rem_Intra_Pred_Mode that indicates the coding mode of the current block is set at the value of the coding mode IPM. On the other hand, when the index of the coding mode of the current block is greater than the estimated prediction mode value MPM, the information Rem_Intra_Pred_Mode that indicates the coding mode of the current block is set at a value obtained by subtracting 1 from the value of the coding mode IPM. Then, each of Prev_Intra_Pred_Mode_Flag and Rem_Intra_Pred_Mode is outputted as the signal SSMD.

A variable-length coding unit 520 performs entropy coding on the prediction-coding-mode related signal SSMD, and outputs the resulting signal as a bitstream.

Moreover, as shown in FIG. 3, a variable-length decoding unit 610 decodes the received bitstream and then outputs a quantized frequency transform coefficient QT and prediction-coding-mode related information SSMD.

The restoration unit 620 receives the prediction-coding-mode related signal SSMD, and outputs the coding mode information SMD (that includes the following to be used for decoding: a coding mode MD; and the information indicating the intra prediction mode IPM or the location information (motion vector) MV). To be more specific, a signal determination unit 621 receives the prediction-coding-mode related signal SSMD. Then, when the flag indicating the agreement with the estimated prediction mode value MPM is included in the prediction-coding-mode related signal SSMD, the signal determination unit 621 outputs the intra prediction mode IPM as the estimated prediction mode value MPM. Otherwise, the signal determination unit 621 sets the intra prediction mode IPM from the index information further included in the prediction-coding-mode related signal SSMD, and then outputs the intra prediction mode IPM. The setting method used by the signal determination unit 621 is represented by Expression 3.

[Math. 2]
```
if (Prev_Intra_Pred_Mode_Flag==1) {
    IPM=MPM
}
else {
    if (Rem_Intra_Pred_Mode<MPM) {
        IPM=Rem_Intra_Pred_Mode
    }
    else {
        IPM = Rem_Intra_Pred_Mode+1
    }
}
```
... Expression 3

As represented by Expression 3, suppose that the flag Prev_Intra_Pred_Mode_Flag indicating whether or not the intra prediction mode agrees with the estimated prediction mode value MPM is read and this flag is set at 0. In this case, the flag Prev_Intra_Pred_Mode_Flag is further read to restore the intra prediction mode IPM.

A prediction mode storage memory 623 stores: the received coding mode MD; and the information indicating the intra prediction mode IPM (such as an intra-prediction block size and an intra-prediction direction) or the location information (motion vector) MV. The prediction mode estimation unit 624 obtains, from the prediction mode storage memory 623, multiple estimated prediction mode value candidates from the previously-decoded coding mode MD and one of the previously-decoded information indicating the intra prediction mode IPM and the previously-decoded location information (motion vector) MV, using a predetermined means as represented by Expression 1.

The prediction mode estimation unit 624 determines the estimated prediction mode value MPM from among the multiple estimated prediction mode value candidates, and outputs the determined estimated prediction mode value MPM.

Meanwhile, a video coding method for compressing video data using edge detection has been proposed as well, and edge detection may be included in a coding apparatus and a decoding apparatus (see Non Patent Literature 2).

With this method, a predicted block corresponding to the current block 10 is generated from prediction made by, in addition to the intra direction prediction based on the H.264/AVC standard, extrapolating the reference pixels 20 on the basis of an angle obtained by edge detection. Moreover, in Non Patent Literature 2, whether or not edge detection is used is indicated by the DC prediction mode that uses the average value of the reference pixels 20. To be more specific, the indexes of the intra prediction modes IPMs indicating DC prediction and edge prediction are the same. When the result of edge detection satisfies a certain condition, the predicted block is generated on the basis of the angle obtained by edge detection. When the result of edge detection does not satisfy the certain condition, the predicted block is generated using the average value. Here, the certain condition is whether or not the size of the edge-detected vector exceeds a certain value.

CITATION LIST

Non Patent Literature

[NPL 1]
ISO/IEC 14496-10 "MPEG-4 Part 10, Advanced Video Coding"
[NPL 2]
2008 IEEE International Conference on Image Processing "HIGH PRECISION EDGE PREDICTION FOR INTRA CODING"

SUMMARY OF INVENTION

Technical Problem

The aforementioned conventional technology, however, has the following problem.

According to the aforementioned conventional technology, the indexes of the direction prediction mode and the DC prediction mode are fixed. For this reason, when the edge prediction mode and the DC prediction mode are to be expressed by a single code as in Non Patent Literature 2, the amount of data to be coded is increased or distortion occurs in a coded image. A more specific explanation is given as follows.

In the case of the intra prediction mode estimation defined by the conventional H.264/AVC, a prediction mode to be a candidate is a mode having been used for coding a neighboring block of the current block. Each of the prediction mode estimation units 512 and 624 selects, as the estimated prediction mode value, a mode assigned a smaller number from among the mode numbers of the prediction mode candidates (the numbers shown in FIG. 1B and the number "2" indicating the average-value-based prediction (i.e., the DC prediction mode)).

On account of this, the estimated prediction mode of the current block 10 agrees with one of the prediction modes of the neighboring blocks 30 and 40. However, when the edge prediction mode and the DC prediction mode are expressed by a single code as in Non Patent Literature 2, it is impossible to indicate whether the prediction modes of the neighboring blocks 30 and 40 are based on the DC prediction or the edge prediction. Thus, when the prediction mode of the current block 10 is the edge prediction mode, it is less likely for the prediction mode to agree with the estimated prediction mode. In other words, the amount of coded data indicating the prediction mode that is to be transmitted to the decoding apparatus side is increased.

The present invention is conceived in view of the stated problem, and has an object to provide an image coding method of coding image data and video data with higher coding efficiency without the need for processing a considerable amount of data and an image decoding method of decoding the coded image data and the coded video data.

Solution to Problem

The image decoding method in an aspect according to the present invention is an image decoding method of decoding coded image data generated by coding image data for each block according to prediction based on a prediction mode. To be more specific, the image decoding method includes: restoring a selected prediction mode used in the prediction at a time of coding, based on mode information indicating a result of estimation of the prediction mode executed at the time of coding; and decoding a current block included in the coded image data to generate a decoded block, according to the prediction based on the selected prediction mode, wherein the restoring includes: determining one of prediction modes as a first estimated prediction mode; determining, as a second estimated prediction mode, an other one of the prediction modes that is different from the first estimated prediction mode; and restoring the selected prediction mode based on the mode information, the first estimated prediction mode, and the second estimated prediction mode.

With this, when the selected prediction mode is to be restored, the mode information can be transmitted with a small amount of coded data. Hence, the coding efficiency can be increased, and coding distortion can be suppressed.

Moreover, the mode information may include at least flag information indicating a result of comparison between the selected prediction mode and each of the first estimated prediction mode and the second estimated prediction mode. In the restoring included in the restoring of a selected prediction mode, (i) the first estimated prediction mode may be determined as the selected prediction mode when the flag information indicates that the selected prediction mode agrees with the first estimated prediction mode, (ii) the second estimated prediction mode may be determined as the selected prediction mode when the flag information indicates that the selected prediction mode agrees with the second estimated prediction mode, and (iii) the selected prediction mode may be restored based on information that is further included in the mode information and specifies the selected prediction mode, when the flag information indicates that the selected prediction mode disagrees with each of the first estimated prediction mode and the second estimated prediction mode.

Furthermore, the mode information indicates: the flag information indicating that the prediction mode used for prediction at the time of coding agrees with the prediction mode estimated at the time of coding; or the flag information and the prediction mode used for prediction at the time of coding. In the restoring, first flag information corresponding to the first estimated prediction mode is firstly decoded. When the first flag information indicates that the prediction mode used for prediction at the time of coding agrees with the prediction mode estimated at the time of coding, the first estimated prediction mode is determined as the selected prediction mode. When the first flag information indicates that the prediction mode used for prediction at the time of coding disagrees with the prediction mode estimated at the time of coding, second flag information corresponding to the second estimated prediction mode is decoded. When the second flag information indicates that the prediction mode used for prediction at the time of coding agrees with the prediction mode estimated at the time of coding, the second estimated prediction mode is determined as the selected prediction mode. When the second flag information indicates that the prediction mode used for prediction at the time of coding disagrees with the prediction mode estimated at the time of coding, selected-mode coding information is decoded. Then, based on a size comparison made between the selected-mode coding information and the estimated prediction mode, the selected prediction mode may be restored.

Moreover, one of the first estimated prediction mode and the second estimated prediction mode may indicate DC/edge prediction.

Furthermore, in the determining of a first estimated prediction mode, a prediction mode assigned an index number that is a smallest of index numbers assigned to prediction modes of previously-decoded blocks adjacent to the current block may be determined as the first prediction mode.

Moreover, in the determining of a second estimated prediction mode, (i) the second estimated prediction mode may be determined as a DC prediction mode when the first estimated prediction mode indicates a planar mode, and (ii) the second estimated prediction mode may be determined as the planar mode when the first estimated prediction mode does not indicate the planar mode.

Furthermore, the restoring may include: detecting an edge in the previously-generated decoded block; and determining, based on the edge detected in the detecting, whether the DC-edge prediction mode indicates DC prediction or edge prediction.

Moreover, one of the first estimated prediction mode and the second estimated prediction mode may be estimated according to an edge direction detected in the detecting.

The image decoding method in an aspect according to the present invention is a method of coding image data for each block. To be more specific, the image decoding method includes: coding a current block included in the image data, according to prediction based on a selected prediction mode selected from among predetermined prediction mode candidates; decoding the coded current block to generate a decoded block; determining one of prediction modes as a first estimated prediction mode; determining, as a second estimated prediction mode, an other one of the prediction modes that is different from the first estimated prediction mode; and outputting the coded current block and mode information to be used for restoring the selected prediction mode. Moreover, the outputting includes generating the mode information based on the first estimated prediction mode, the second estimated prediction mode, and the selected prediction mode.

Furthermore, in the generating of the mode information, when the selected prediction mode agrees with one of the first estimated prediction mode and the second estimated prediction mode, flag information indicating whether the selected prediction mode agrees with the first estimated prediction mode or the second estimated prediction mode may be generated as the mode information, and when the selected prediction mode disagrees with each of the first estimated prediction mode and the second estimated prediction mode, the mode information may be generated to include (i) flag information indicating that the selected prediction mode disagrees with each of the first estimated prediction mode and the second estimated prediction mode and (ii) information specifying the selected prediction mode.

Moreover, in the generating of the mode information, the first estimated prediction mode and the selected prediction mode are firstly compared. Then, first flag information indicating whether or not these modes agree with each other is generated as the mode information. When the first estimated prediction mode and the selected prediction mode disagree with each other, the second estimated prediction mode and the selected prediction mode are next compared. Then, second flag information indicating whether or not these modes agree with each other is generated as the mode information. When the second estimated prediction mode and the selected prediction mode disagree with each other, selected-prediction-mode information may be generated as the mode information, based on the selected prediction mode and the estimated prediction mode.

Furthermore, one of the first estimated prediction mode and the second estimated prediction mode may indicate DC/edge prediction.

Moreover, in the determining of a first estimated prediction mode, a prediction mode assigned an index number that is a smallest of index numbers assigned to prediction modes of previously-coded blocks adjacent to the current block may be determined as the first prediction mode.

Furthermore, in the determining of a second estimated prediction mode, (i) the second estimated prediction mode may be determined as a DC prediction mode when the first estimated prediction mode indicates a planar mode, and (ii) the second estimated prediction mode may be determined as the planar mode when the first estimated prediction mode does not indicate the planar mode.

Moreover, the generating of the mode information may include: detecting an edge in the previously-generated decoded block; and determining, based on the edge detected in the detecting, whether the DC-edge prediction mode indicates DC prediction or edge prediction.

Moreover, one of the first estimated prediction mode and the second estimated prediction mode may be estimated according to an edge direction detected in the detecting.

The image decoding apparatus in an aspect according to the present invention decodes coded image data generated by coding image data for each block according to prediction based on a prediction mode. To be more specific, the image decoding apparatus includes: a restoration unit which restores a selected prediction mode used in the prediction at a time of coding, based on mode information indicating a result of estimation of the prediction mode executed at the time of coding; and a decoding unit which decodes a current block included in the coded image data to generate a decoded block, according to the prediction based on the selected prediction mode. Moreover, the restoration unit includes: a first prediction mode estimation unit which determines one of prediction modes as a first estimated prediction mode; a second prediction mode estimation unit which determines, as a second estimated prediction mode, an other one of the prediction modes that is different from the first estimated prediction mode; and a prediction mode restoration unit which restores the selected prediction mode based on the mode information, the first estimated prediction mode, and the second estimated prediction mode.

The image coding apparatus in an aspect according to the present invention codes image data for each block. To be more specific, the image coding apparatus includes: a coding unit which codes a current block included in the image data, according to prediction based on a selected prediction mode selected from among predetermined prediction mode candidates; a decoding unit which decodes the coded current block to generate a decoded block; a first prediction mode estimation unit which determines one of prediction modes as a first estimated prediction mode; a second prediction mode estimation unit which determines, as a second estimated prediction mode, an other one of the prediction modes that is different from the first estimated prediction mode; and an output unit which outputs the coded current block and mode information to be used for restoring the selected prediction mode. Moreover, the output unit includes a mode information generation unit which generates the mode information based on the first estimated prediction mode, the second estimated prediction mode, and the selected prediction mode.

The program in an aspect according to the present invention causes a computer to decode coded image data generated by coding image data for each block according to prediction based on a prediction mode. To be more specific, the program causes the computer to execute: restoring a selected prediction mode used in the prediction at a time of coding, based on mode information indicating a result of estimation of the prediction mode executed at the time of coding; and decoding a current block included in the coded image data to generate a decoded block, according to the prediction based on the selected prediction mode. Moreover, the restoring includes: determining one of prediction modes as a first estimated prediction mode; determining, as a second estimated prediction mode, an other one of the prediction modes that is different from the first estimated prediction mode; and restoring the selected prediction mode based on the mode information, the first estimated prediction mode, and the second estimated prediction mode.

The program in another aspect according to the present invention causes a computer to code image data for each block. To be more specific, the program causes the computer to execute: coding a current block included in the image data, according to prediction based on a selected prediction mode selected from among predetermined prediction mode candidates; decoding the coded current block to generate a decoded block; determining one of prediction modes as a first estimated prediction mode; determining, as a second estimated prediction mode, an other one of the prediction modes that is different from the first estimated prediction mode; and outputting the coded current block and mode information to be used for restoring the selected prediction mode. Moreover, the outputting includes generating the mode information based on the first estimated prediction mode, the second estimated prediction mode, and the selected prediction mode.

The integrated circuit in an aspect according to the present invention decodes coded image data generated by coding image data for each block according to prediction based on a prediction mode. To be more specific, the integrated circuit includes: a restoration unit which restores a selected prediction mode used in the prediction at a time of coding, based on mode information indicating a result of estimation of the prediction mode executed at the time of coding; and a decoding unit which decodes a current block included in the coded image data to generate a decoded block, according to the prediction based on the selected prediction mode. Moreover, the restoration unit includes: a first prediction mode estimation unit which determines one of prediction modes as a first estimated prediction mode; a second prediction mode estimation unit which determines, as a second estimated prediction mode, an other one of the prediction modes that is different from the first estimated prediction mode; and a prediction mode restoration unit which restores the selected prediction mode based on the mode information, the first estimated prediction mode, and the second estimated prediction mode.

The integrated circuit in another aspect according to the present invention codes image data for each block. To be more specific, the integrated circuit includes: a coding unit which codes a current block included in the image data, according to prediction based on a selected prediction mode selected from among predetermined prediction mode candidates; a decoding unit which decodes the coded current block to generate a decoded block; a first prediction mode estimation unit which determines one of prediction modes as a first estimated prediction mode; a second prediction mode estimation unit which determines, as a second estimated prediction mode, an other one of the prediction modes that is different from the first estimated prediction mode; and an output unit which outputs the coded current block and mode information to be used for restoring the selected prediction mode. Moreover, the output unit includes a mode information generation unit which generates the mode information based on the first estimated prediction mode, the second estimated prediction mode, and the selected prediction mode.

It should be noted that the present invention can be implemented not only as an image coding method and an image decoding method, but also as: an image coding apparatus and an image decoding apparatus having, as processing units, steps included in the image coding method and the image decoding method. Moreover, the present invention can be implemented as a computer program causing a computer to execute these steps. Furthermore, the present invention can be implemented as: a computer-readable recording medium, such as a Compact Disc-Read Only Memory (CD-ROM), having the computer program recorded thereon; and information, data, or a signal that indicates the computer program. It should be obvious that the computer program, the information, the data, and the signal can be distributed via a communication network such as the Internet.

Some or all of the components of the image coding apparatus and the image decoding apparatus may be configured with a single system large scale integration (system LSI). The system LSI is a super multifunctional LSI manufactured by integrating a plurality of components into a single chip. More specifically, the system LSI is a computer system including a microprocessor, a read only memory (ROM), and a random access memory (RAM).

Advantageous Effects of Invention

According to the present invention, an estimated prediction mode value can be predicted more accurately. Hence, the amount of data to be coded as the prediction mode can be reduced, and the coding efficiency can be accordingly increased.

BRIEF DESCRIPTION OF DRAWINGS

FIG. 6B is a block diagram showing another example of the detailed configuration of the setting unit included in the image coding apparatus in Embodiment 1.

FIG. 35 shows an example of a look-up table in which video data standards are associated with driving frequencies.

(a) of FIG. 36 is a diagram showing an example of a configuration for sharing a module of a signal processing unit, and (b) of FIG. 36 is a diagram showing another example of a configuration for sharing a module of the signal processing unit.

DESCRIPTION OF EMBODIMENTS

Embodiment 1

When coding image data or video data, an image coding apparatus in Embodiment 1 have: an edge prediction mode where an edge included in a neighboring block located near a current block is detected and intra prediction is performed based on the detected edge; and a DC prediction mode where intra prediction is performed based on an average value of pixels located near the current block. When these modes are expressed by one same signal (i.e., a DC/edge prediction mode), the image coding apparatus determines a plurality of estimated prediction modes and codes a mode signal.

To be more specific, in Embodiment 1, by determining the estimated prediction modes and coding the DC/edge prediction mode into a short code, the amount of data coded as the DC/edge prediction mode can be suppressed.

Firstly, a configuration of the image coding apparatus in Embodiment 1 is described.

Figure 4:
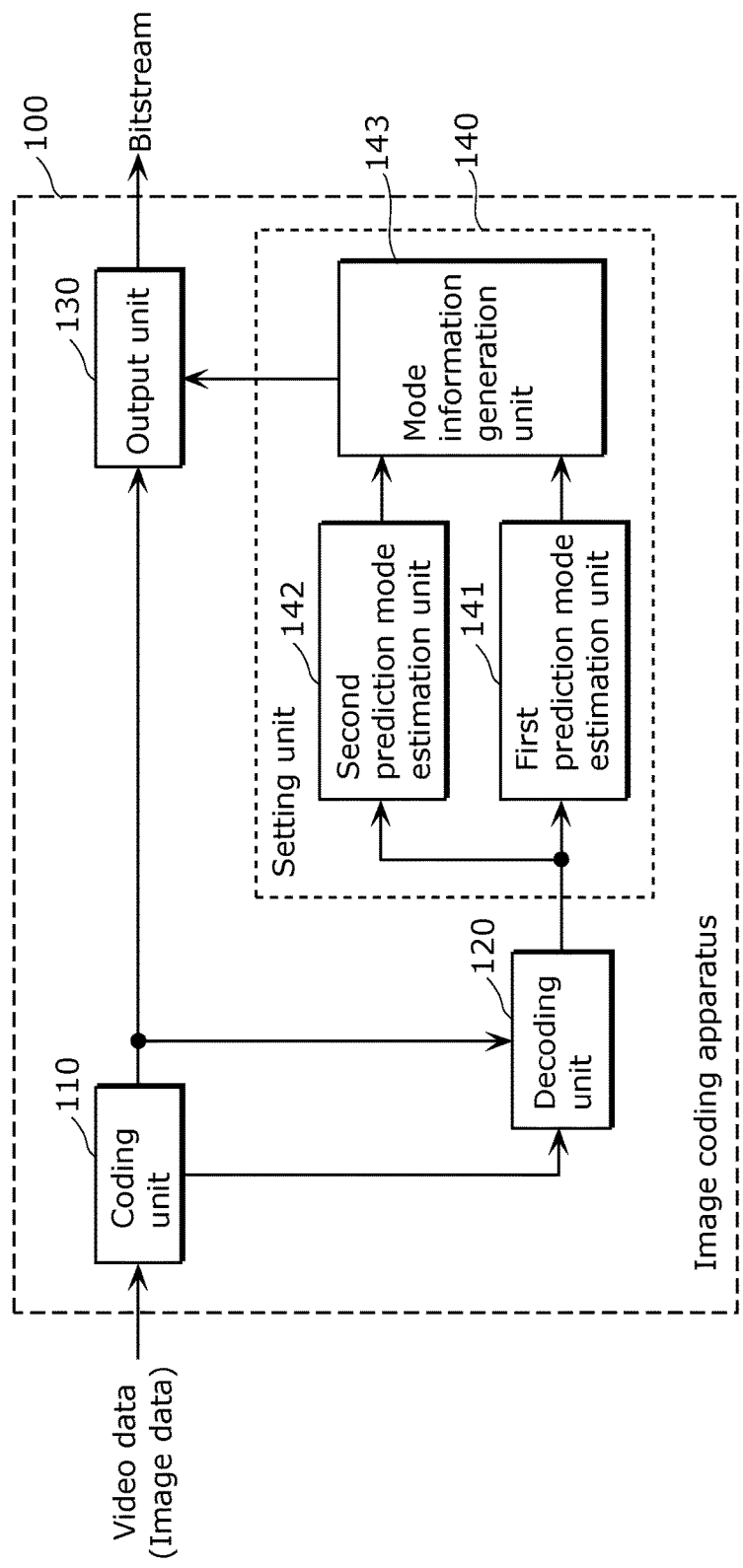
FIG. 4 is a block diagram showing an example of a configuration of an image coding apparatus in Embodiment 1.

FIG. 4 is a block diagram showing an example of a configuration of an image coding apparatus 100 in Embodiment 1.

The image coding apparatus 100 codes input image data or input video data, for each block. As shown in FIG. 4, the image coding apparatus 100 includes a coding unit 110, a decoding unit 120, an output unit 130, and a setting unit 140.

The coding unit 110 codes a current block according to prediction based on a prediction mode selected from among a plurality of prediction mode candidates. Here, the current block is one of blocks included in the image data or the video data.

The prediction mode candidates refer to all possible prediction modes each of which can be selected when prediction is made. For example, the prediction mode candidates include the predefined eight direction prediction modes (see FIG. 1B), the DC prediction mode using the average value of the reference pixels, and the edge prediction mode indicating a direction of an edge detected in a neighboring block. The prediction mode refers to information indicating a reference destination for referencing a predicted image.

It should be noted that the prediction mode candidates are not limited to the above examples. For example, the prediction mode candidates may include 33 direction prediction modes at the maximum, the DC prediction mode, and a planar mode. Note that the number of direction prediction modes may be variable according to the size of the current block. For example, the number of direction prediction modes may be: 18 when the size of the current block is 4 by 4 pixels; 33 when the size of the current block is 8 by 8 pixels to 32 by 32 pixels; and 2 when the size of the current block is 64 by 64 pixels.

The planar mode refers to a mode for predicting each pixel of the current block by multiplying each value of neighboring pixels by a corresponding weight according to a distance to a pixel to be predicted and then by adding the resulting values of the neighboring pixels. For example, when a value of a pixel located at the upper right of the block 10 is predicted using a pixel located at the upper right of the block 30 and a pixel located at the lower right of the block 40, a weight by which a value of the pixel located at the lower right of the block 40 is multiplied is set greater than a weight by which a value of the pixel located at the upper right of the block 30 is multiplied.

The decoding unit 120 decodes the current block coded by the coding unit 110 and, as a result, generates a decoded block.

The output unit 130 outputs, as a bitstream, mode information together with the current block coded by the coding unit 110. The mode information is used for restoring the selected prediction mode used by the coding unit 110.

The setting unit 140 determines the plurality of estimated prediction modes and generates, based on the determined estimated prediction modes, mode information regarding the selected prediction mode used for coding the current block. The present example describes the case where the mode information is generated based on two estimated prediction modes. As shown in FIG. 4, the setting unit 140 includes a first prediction mode estimation unit 141, a second prediction mode estimation unit 142, and a mode information generation unit 143.

The first prediction mode estimation unit 141 determines an estimated prediction mode from the prediction modes of the neighboring blocks that have been previously coded. For example, the method represented by Expression 1 may be used.

The second prediction mode estimation unit 142 determines an estimated prediction mode different from the estimated prediction mode determined by the first prediction mode estimation unit 141.

The mode information generation unit 143 generates the mode information based on the estimated prediction modes set by the first prediction mode estimation unit 141 and the second prediction mode estimation unit 142 and the selected prediction mode selected by the coding unit 110. With this configuration, the image coding apparatus 100 in Embodiment 1 determines the estimated prediction mode and updates, at a time of coding, the DC/edge prediction mode using a short code according to the estimated prediction mode.

The following describes detailed configurations and operations of processing units included in the image coding apparatus 100 in Embodiment 1.

Figure 5:
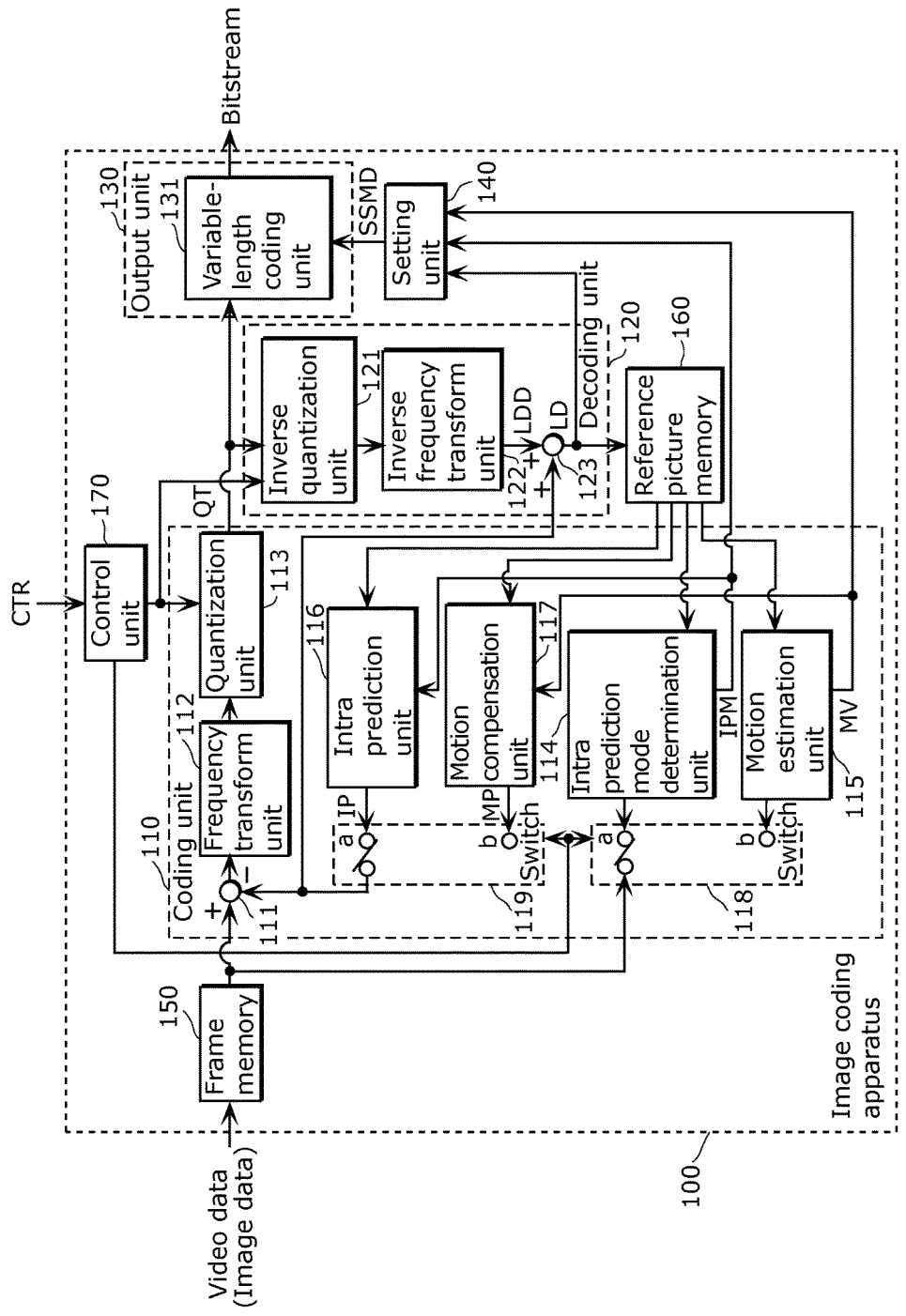
FIG. 5 is a block diagram showing an example of a detailed configuration of an image coding apparatus that performs hybrid coding in Embodiment 1.

FIG. 5 is a block diagram showing an example of a detailed configuration of the image coding apparatus 100 in Embodiment 1. The image coding apparatus 100 performs hybrid coding.

As shown in FIG. 5, the image coding apparatus 100 includes the coding unit 110, the decoding unit 120, the output unit 130, the setting unit 140, a frame memory 150, a reference picture memory 160, and a control unit 170. It should be noted that the components identical to those shown in FIG. 4 are assigned the same reference signs as used in FIG. 4.

Moreover, as shown in FIG. 5, the coding unit 110 includes a subtraction unit 111, a frequency transform unit 112, a quantization unit 113, an intra prediction mode determination unit 114, a motion estimation unit 115, an intra prediction unit 116, a motion compensation unit 117, and switches 118 and 119. The decoding unit 120 includes an inverse quantization unit 121, an inverse frequency transform unit 122, and an addition unit 123. The output unit 113 includes a variable-length coding unit 131.

A detailed configuration of the setting unit 140 is described later with reference to FIG. 6A and FIG. 6B.

The following describes the processes performed by the processing units, in line with an operation performed by the image coding apparatus 100 to code input video data including a plurality of frames.

Each of pictures included in the input video data is stored into the frame memory 150. Each of the pictures is divided into a plurality of blocks and is outputted per block (for example, per macroblock having 16 blocks horizontally and 16 pixels vertically) from the frame memory 150. It should be noted that the input video data may be either progressive or interlaced.

Each of the macroblocks is coded according to the intra prediction mode or the inter prediction mode. Firstly, the case where a current macroblock is coded according to the intra prediction mode is described.

In the intra prediction mode (i.e., intra frame prediction), the macroblock outputted from the frame memory 150 is inputted into the intra prediction mode determination unit 114 (at this time, the switch 118 is connected to a terminal "a" by the control unit 170). The intra prediction mode determination unit 114 determines how to perform intra prediction on the input macroblock.

To be more specific, the intra prediction mode determination unit 114 needs to determine, as the intra prediction mode (IPM), an intra-prediction block size (one of the following: 4 pixels horizontally by 4 pixels vertically; 8 pixels horizontally by 8 pixels vertically; and 16 pixels horizontally by 16 pixels vertically) and an intra prediction direction. For example, the intra prediction mode determination unit 114 determines the intra-prediction block size and the intra prediction direction that allow the amount of coded data generated by coding the current block to be smaller than a predetermined threshold. More preferably, the intra prediction mode determination unit 114 determines the intra-prediction block size and the intra prediction direction that allow the amount of generated coded data to be at the minimum.

Figure 1A:
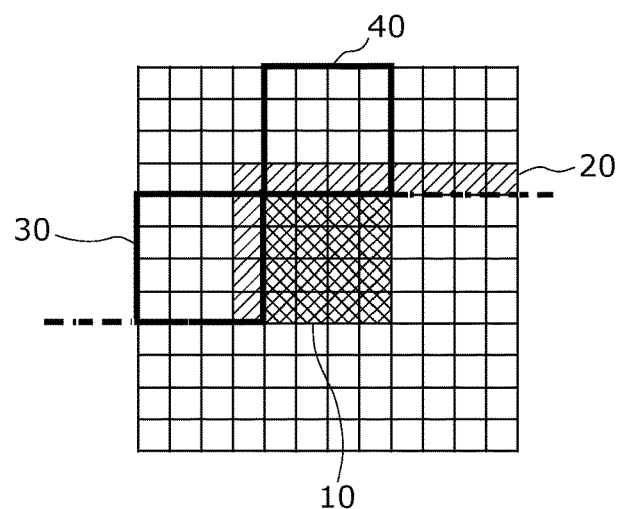
FIG. 1A is a diagram showing an example of a relationship between a current block to which intra prediction estimation based on the conventional H.264/AVC standard is applied and a reference pixel.
Figure 1B:
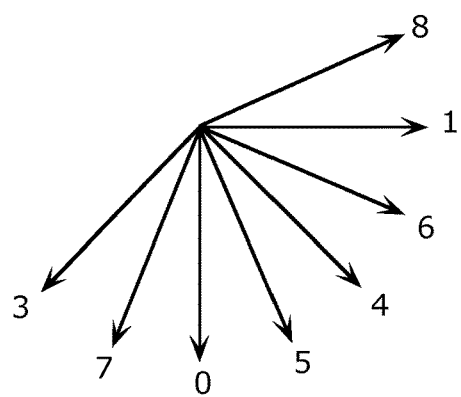
FIG. 1B is a diagram showing prediction directions included in an intra prediction mode set based on the conventional H.264/AVC standard.
Figure 2:
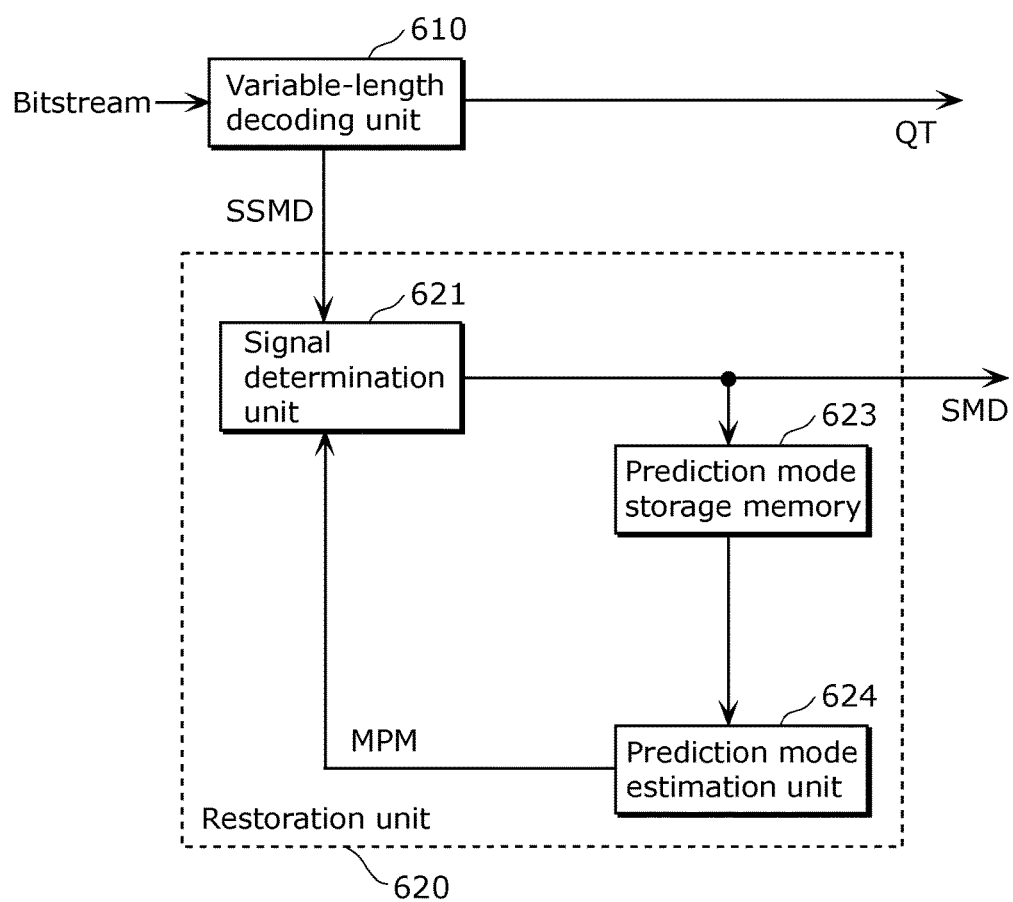
FIG. 2 is a diagram showing an example of a detailed configuration of a setting unit, among components of an image coding apparatus based on the conventional H.264/AVC standard.
Figure 3:
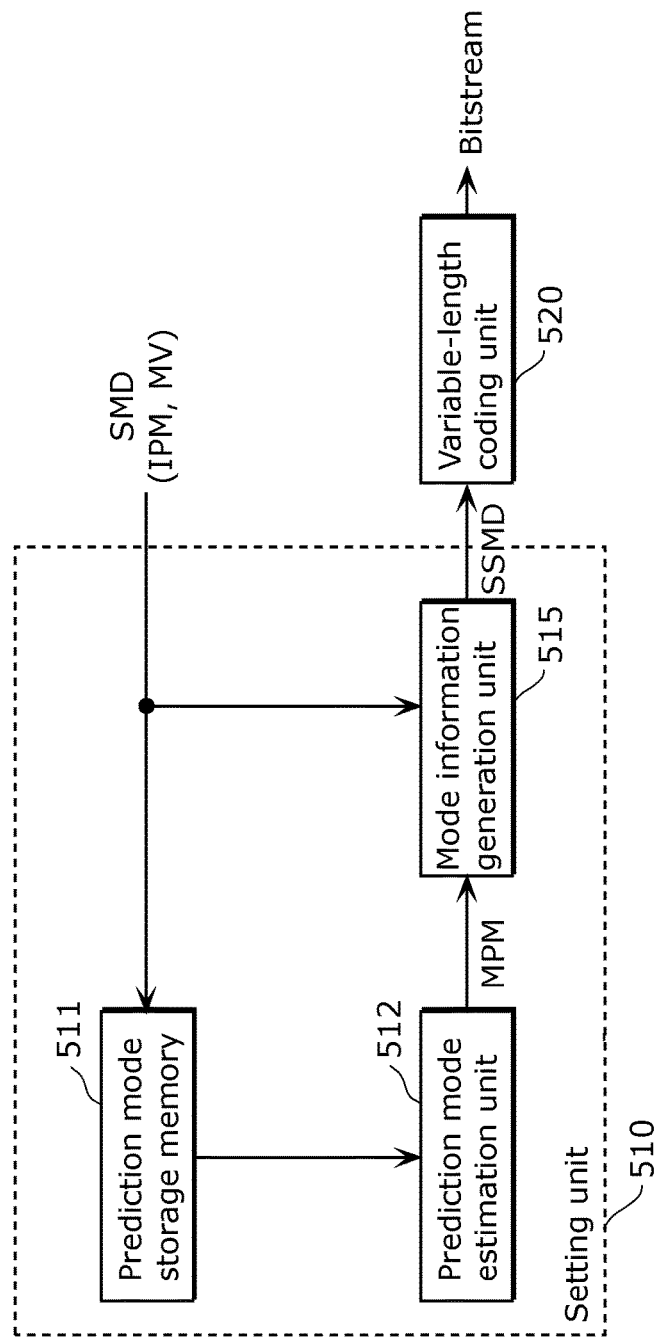
FIG. 3 is a diagram showing an example of a detailed configuration of a restoration unit, among components of an image decoding apparatus based on the conventional H.264/AVC standard.

For example, the current block 10 (4 pixels horizontally by 4 pixels vertically) shown in FIG. 1A may be predicted using the reference pixels 20 according to one of the eight predefined intra prediction directions. Here, the reference pixels 20 (diagonally shaded rectangles in FIG. 1A) used in intra prediction have been previously coded and decoded, and are stored in the reference picture memory 160. The information indicating the determined intra prediction mode IPM is outputted to the intra prediction unit 116 and the setting unit 140.

The intra prediction unit 116 obtains a reference pixel (an intra reference pixel) to be used in intra prediction from the reference picture memory 160, based on the intra prediction mode IPM determined by the intra prediction mode determination unit 114. Then, the intra prediction unit 116 generates an image IP as a result of the intra prediction performed using the value of the reference pixel, and outputs the generated intra prediction image IP to the subtraction unit 111 (at this time, the switch 119 is connected to a terminal "a" by the control unit 170).

The subtraction unit 111 receives: the macroblock (the current macroblock) of the picture included in the input video data from the frame memory 150; and the intra prediction image IP generated by the intra prediction unit 116. Then, the subtraction unit 111 generates a difference image by calculating a difference (may also referred to as a prediction residual) between the current macroblock and the intra prediction image IP, and outputs the generated difference image to the frequency transform unit 112.

The frequency transform unit 112 generates a frequency transform coefficient by performing frequency transform, such as discrete cosine transform, on the difference image generated by the subtraction unit 111. Then, the frequency transform unit 112 outputs the generated frequency transform coefficient.

The quantization unit 113 quantizes the frequency transform coefficient generated by the frequency transform unit 112, and outputs a quantized frequency transform coefficient QT. Here, quantization is a process of dividing the frequency transform coefficient by a predetermined value (a quantization step). Note that this quantization step is given by the control unit 170 (the quantization step may be included in a control signal CTL received by the control unit 170). The quantized frequency transform coefficient QT is outputted to the variable-length coding unit 131 and the inverse quantization unit 121.

The inverse quantization unit 121 performs inverse quantization on the quantized frequency transform coefficient QT, and outputs the inversely-quantized frequency transform coefficient to the inverse frequency transform unit 122. At this time, a quantization step that is the same as the quantization step used in quantization by the quantization unit 113 is inputted to the inverse quantization unit 121 by the control unit 170.

The inverse frequency transform unit 122 performs inverse frequency transform on the inversely-quantized frequency transform coefficient to generate a decoded difference image LDD. The inverse frequency transform unit 122 outputs the generated decoded difference image LDD to the addition unit 123.

The addition unit 123 generates a decoded image LD by adding the decoded difference image LDD to the intra prediction image IP (or an inter prediction image MP, described later, in the case of the inter prediction mode). The addition unit 123 stores the generated decoded image LD into the reference picture memory 160. Here, the decoded image LD stored into the reference picture memory 160 is used as a reference image in a later coding process.

The variable-length coding unit 131 performs variable-length coding on the quantized frequency transform QT received from the quantization unit 113. Moreover, the variable-length coding unit 131 similarly processes the information indicating the intra prediction mode IPM received from the intra prediction mode determination unit 114 via the setting unit 140, and outputs the bitstream to be also referenced as a coded sequence. As mentioned above, the detailed configuration of the setting unit 140 is described later with reference to FIG. 6A and FIG. 6B.

The variable-length coding methods to be used by the variable-length coding unit 131 include a context-adaptive arithmetic coding method adopted by the international standard H.264 for coding video. The context-adaptive arithmetic coding method switches between probability tables used in arithmetic coding, according to the current data to be variable-length coded and the data which has been previously variable-length coded (context-adaptive). In this case, the variable-length coding unit 131 includes a memory for holding the probability tables.

It should be noted that the variable-length coding unit 131 may perform variable-length coding on the quantized frequency transform coefficient QT using the context-adaptive variable-length coding method.

Next, the case where the current macroblock is coded in the inter prediction mode is described.

In the inter prediction mode (i.e., inter frame prediction), the macroblock outputted from the frame memory 150 is inputted into the motion estimation unit 115 (at this time, the switch 118 is connected to a terminal "b" by the control unit 170). The motion estimation unit 115 estimates motion information (location information (motion vector)) regarding a reference picture (a reconstructed picture that is held in the reference picture memory 160 and is different from the picture to be coded) of the input macroblock.

In motion estimation, the following location information (motion vector) is typically estimated as the motion information: the location information (motion vector) including a minimum difference value between a current block to be coded and a predicted image and a minimum sum of weights of the amounts of data coded as the location information (motion vectors). The estimated location information (motion vector) is outputted as the motion information regarding the current block, to the motion compensation unit 117 and the setting unit 140.

Based on the motion information (the location information (motion vector)) estimated by the motion estimation unit 115, the motion compensation unit 117 obtains, from the reference picture memory 160, a reference pixel (an inter reference pixel) used in inter prediction. Then, the motion compensation unit 117 generates an inter prediction image MP and outputs the generated inter prediction image MP to the subtraction unit 111 (at this time, the switch 119 is connected to a terminal "b" by the control unit 170).

The processes performed by the subtraction unit 111, the frequency transform unit 112, the quantization unit 113, the inverse quantization unit 121, the inverse frequency transform unit 122, and the addition unit 123 are the same as those processes explained above in the case of intra prediction. Therefore, explanations about these processes are omitted here.

The variable-length coding unit 131 performs variable-length coding on the quantized frequency transform coefficient QT received from the quantization unit 113. Moreover, the variable-length coding unit 131 also performs variable-length coding on mode information that is outputted from the setting unit 140 and includes: information indicating a coding mode MD; and information indicating the intra prediction mode IPM or the motion information (location information (motion vector)) MV. Then, the variable-length coding unit 131 outputs the bitstream. As mentioned above, the detailed configuration of the setting unit 140 is described later with reference to FIG. 6A and FIG. 6B.

Here, when coding the motion information (location information (motion vector)) MV according to the context-adaptive arithmetic coding method, the variable-length coding unit 131 includes a memory for holding probability tables.

The mode information includes a full set of information required by a decoding apparatus in order for the decoding side (such as an image decoding apparatus 300 (see FIG. 9) described later) to reproduce the prediction made by the coding side (such as the image coding apparatus 100) when coding the video data. Therefore, the mode information defines the coding mode for each macroblock, that is, defines for each macroblock whether intra prediction or inter prediction has been applied. Moreover, the mode information includes information regarding how the macroblock is subdivided. According to the H.264/AVC standard, the macroblock having the size of 16 by 16 pixels may be subdivided into sub-blocks each having the size of 8 by 8 pixels or 4 by 4 pixels in the case of intra prediction.

Having a dependence on the coding mode, the mode information further includes a set of location information (location information (motion vector)) used in motion compensation or information specifying the intra prediction mode applied for performing intra prediction on the current block.

It should be noted that the control unit 170 selects the coding mode (the intra prediction mode or the inter prediction mode).

For example, the control unit 170 selects the coding mode by comparing a current-block image IMG with the inter prediction image IP generated based on the intra prediction mode IPM and the decoded image LD or the inter prediction image MP generated based on the location information (motion vector) MV and the decoded image LD. In general, the control unit 170 selects the coding mode where a weighted sum of the number of generated bits and the coding distortion is at the minimum.

For example, the control unit 170 may use a cost function for determining an optimal prediction mode to code the current block, the cost function being based on the bit rate and the coding distortion according to the H.264 standard. The difference image is orthogonally transformed, quantized, and variable-length coded, for each prediction mode. Then, the bit rate and the coding distortion are calculated for each prediction mode. It should be noted that a Lagrange cost function J presented by Expression 4 for example is used as the cost function.

$$J = D + \lambda \cdot R \qquad \text{Expression 4}$$

In Expression 4, "R" represents the bit rate used for coding the difference image (may also referred to as the prediction residual) and the prediction mode information. Moreover, "D" represents the coding distortion, and "$\lambda$" represents a Lagrange multiplier calculated according to a quantized parameter QP selected for coding. The control unit 170 selects the prediction mode where the cost function J is the lowest, as the prediction mode used in predicting the current block.

It should be noted that the control unit 170 includes a memory that temporarily stores the const function J in order to select the optimal prediction mode.

Figure 6A:
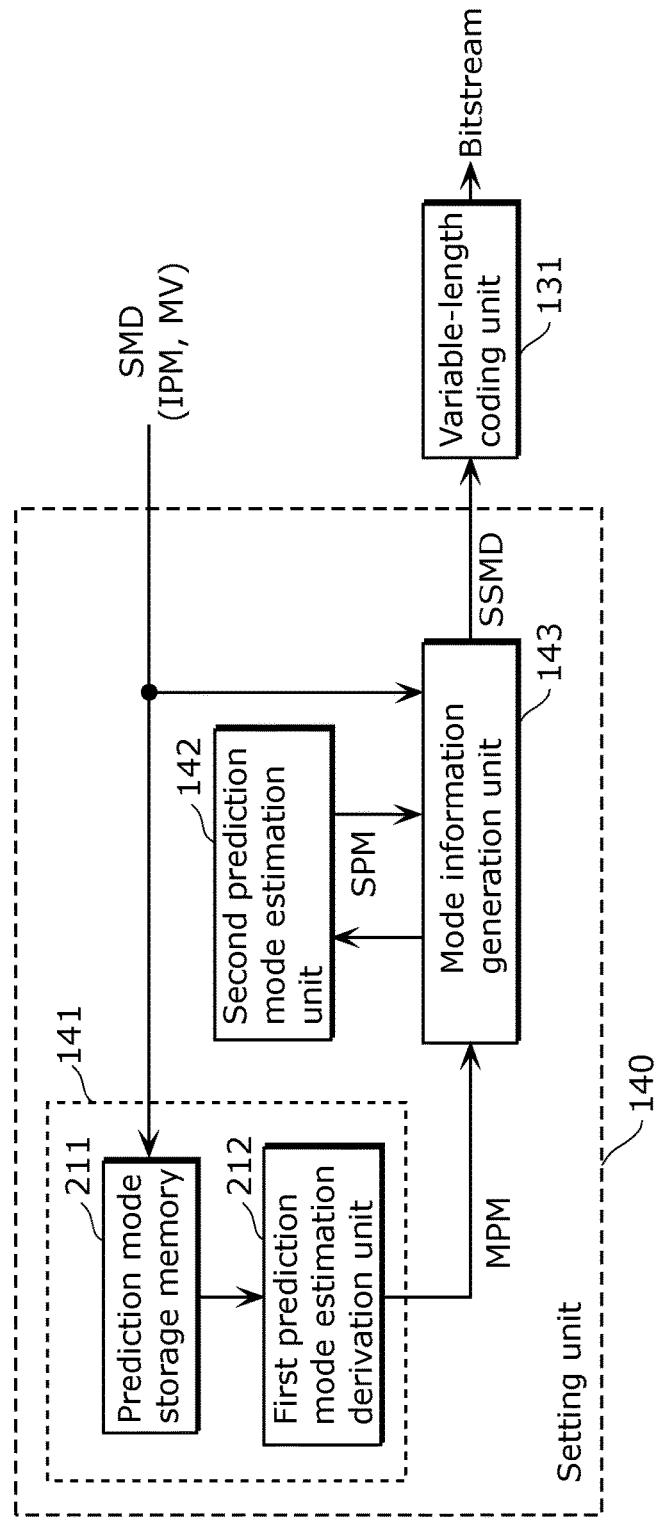
FIG. 6A is a block diagram showing an example of a detailed configuration of a setting unit included in the image coding apparatus in Embodiment 1.

Each of FIG. 6A and FIG. 6B is a diagram showing an example of a detailed configuration of the setting unit 140 in Embodiment 1. As shown in the diagrams, the setting unit 140 includes the first prediction mode estimation unit 141, the second prediction mode estimation unit 142, and the mode information generation unit 143. Note that the components identical to those shown in FIG. 4 are assigned the same reference signs as used in FIG. 4.

The first prediction mode estimation unit 141 shown in FIG. 6A includes a prediction mode storage memory 211 and a first prediction mode estimation derivation unit 212.

It should be noted that the setting unit 140 receives coding mode information SMD indicating the coding mode (the intra prediction mode or the inter prediction mode) selected by the control unit 170. For example, when intra-picture prediction coding is selected as the coding mode, the coding mode information SMD represents information indicating the intra prediction mode IPM (such as the intra-prediction block size and the intra-prediction direction). On the other hand, when inter-picture prediction coding is selected as the coding mode, the coding mode information SMD represents location information (motion vector) MV.

The prediction mode storage memory 211 stores the received coding mode information SMD. The first prediction mode estimation derivation unit 212 derives, from the previously-coded coding mode information stored in the prediction mode storage unit 211, a first estimated prediction mode MPM that is a result of estimating the prediction mode using a predetermined means. Then, the first prediction mode estimation derivation unit 212 outputs the first estimated prediction mode MPM to the mode information generation unit 143.

Here, as a method of deriving the first estimated prediction mode MPM, the prediction mode of the previously-coded block located above and adjacent to the current block to be coded may be compared with the prediction mode of the previously-coded block located to the left of and adjacent to the current block, and then the prediction mode assigned the smaller index number may be used as the first estimated prediction mode MPM, as represented by Expression 1 above. Moreover, the prediction modes of the blocks that are located on the upper left and upper right of and adjacent to the current block may be further referenced. Then, the prediction mode that occurs with the highest frequency may be derived as the first estimated prediction mode MPM. The method of deriving the first estimated prediction mode MPM is not limited to the above examples, and may be a different method as long as the different method derives the prediction mode that is estimated to occur with the highest frequency.

It should be noted that when the number of direction prediction modes is different according to the block size, the direction prediction mode that is closest to the estimated prediction mode selected by the above method may be derived as the first estimated prediction mode MPM out of the possible direction prediction modes to be selected for the current block.

The second prediction mode estimation unit 142 obtains a control signal from the mode information generation unit 143 and outputs, to the mode information generation unit 143, a second estimated prediction mode SPM that is an estimated value of the second prediction mode set according to a predetermined method.

Here, by allowing the second estimated prediction mode SPM to indicate DC/edge prediction, one piece of mode information indicating the plurality of prediction modes can be efficiently coded and decoded.

The mode information generation unit 143 generates the mode information based on the first estimated prediction mode MPM, the second estimated prediction mode SPM, and the selected prediction mode SMD selected by the coding unit 110. Then, the mode information generation unit 143 outputs the mode information as a prediction-coding-mode related signal SSMD to the variable-length coding unit 131. The variable-length coding unit 131 performs variable-length coding on the prediction-coding-mode related signal SSMD, and then outputs the signal as a bitstream.

Figure 7A:
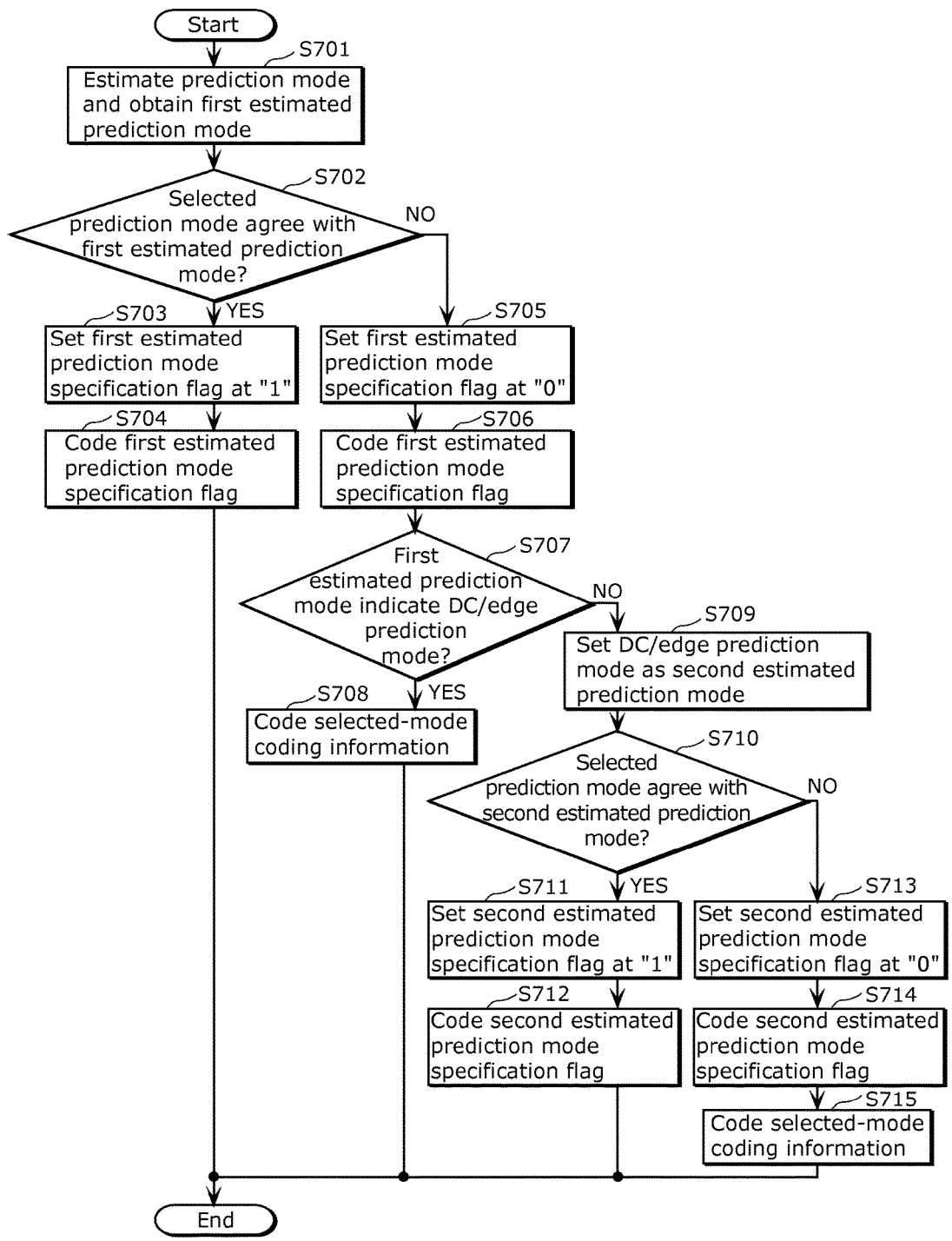
FIG. 7A is a flowchart showing an example of an operation performed by the setting unit included in the image coding apparatus in Embodiment 1.

FIG. 7A is a flowchart showing an example of an operation performed by the first prediction mode estimation unit 141, the second prediction mode estimation unit 142, and the setting unit 143 that are shown in FIG. 6A. Generation of the mode information by the mode information generation unit 143 is described in more detail with reference to FIG. 7A.

Firstly, the mode information generation unit 143 obtains the first estimated prediction mode MPM derived by the first prediction mode estimation unit 141 (Step S701). When the selected prediction mode SMD agrees with the first estimated prediction mode MPM (YES in Step S702), a first estimated prediction mode specification flag is set at "1 (indicating the agreement)" (Step S703). Then, the variable-length coding unit 131 codes the first estimated prediction mode specification flag as the prediction-coding-mode related signal SSMD (Step S704).

On the other hand, when the selected prediction mode SMD disagrees with the first estimated prediction mode MPM (NO in Step S702), the first estimated prediction mode specification flag is set at "0 (indicating the disagreement)" (Step S705). Then, the variable-length coding unit 131 codes the first estimated prediction mode specification flag as the prediction-coding-mode related signal SSMD (Step S706).

Next, when the first estimated prediction mode MPM indicates DC/edge prediction (YES in Step S707), the selected prediction mode SMD is set as selected-mode coding information which is thus added to flag information. Then, the variable-length coding unit 131 codes the selected-mode coding information as the prediction-coding-mode related signal SSMD (Step S708).

When the first estimated prediction mode MPM indicates DC/edge prediction (NO in Step S707), the mode information generation unit 143 outputs a control signal to the second prediction mode estimation unit 142. With this, the second prediction mode estimation unit 142 sets the DC/edge prediction mode as the second estimated prediction mode SPM and then outputs the second estimated prediction mode SPM to the mode information generation unit 143 (Step S709).

Next, the selected prediction mode SMD agrees with the second estimated prediction mode SPM (YES in Step S710), a second estimated prediction mode specification flag is set at "1 (indicating the agreement)" (Step S711). Then, the variable-length coding unit 131 codes the second estimated prediction mode specification flag as the prediction-coding-mode related signal SSMD (Step S712).

On the other hand, when the selected prediction mode SMD disagrees with the second estimated prediction mode SPM (NO in Step S710), the second estimated prediction mode specification flag is set at "0 (indicating the disagreement)" (Step S713). Then, the variable-length coding unit 131 codes the second estimated prediction mode specification flag as the prediction-coding-mode related signal SSMD (Step S714).

Moreover, the selected prediction mode SMD is set as the selected-mode coding information which is thus added to flag information. Then, the variable-length coding unit 131 codes the selected-mode coding information as the prediction-coding-mode related signal SSMD (Step S715).

The present example describes the case where, when the selected prediction mode SMD disagrees with the first estimated prediction mode MPM or the second estimated prediction mode SPM, the selected prediction mode SMD is coded with no change as the selected-mode coding information. However, it should be noted that the preset invention is not limited to this. For example, when no number agreeing with the estimated prediction mode is present and the index number of the selected prediction mode SMD is larger than the index number of the estimated prediction mode, as represented by Expression 2, a value obtained by subtracting the number of estimated prediction modes (2 at the maximum in the examples shown in FIG. 6A and FIG. 7A) may be coded as the selected-mode coding information. With this, the amount of coded data can be further reduced.

Suppose that: an index number of the first estimated prediction mode MPM is represented by "MPM"; an index number of the selected prediction mode SMD is represented by "SMD"; the first estimated prediction mode specification flag is represented by "MPMF"; the second estimated prediction mode specification flag is represented by "SPMF"; an index number of DC/edge prediction is represented by "DCEDGE"; and the selected-mode coding information is represented by "REM". In this case, the aforementioned flow can be represented by Expression 5 for example.

[Math. 3]
```
if (MPM==SMD){
    MPMF=1
}
else {
    MPMF=0
    if( MPM==DCEDGE ){
        if ( SMD < MPM){
            REM = SMD
        }
        else {
            REM = SMD-1
        }
    }
    else{
        if( SPM==SMD){
            SPMF=1
        }
        else {
            SPMF=0
            if ( MPM < SPM ){
                if( SMD < MPM ){
                    REM = SMD
                }
                else if( SMD < SPM ){
                    REM = SMD-1
                }
                else{
                    REM = SMD-2
                }
            }
        }
    }
}
```

-continued

```
    else{
        if( SMD < SPM ){
            REM = SMD
        }
        else if( SMD < MPM ){
            REM = SMD-1
        }
        else{
            REM = SMD-2
        }
    }
  }
 }
}
                                    ... Expression 5
```

It should be noted that the index number of the DC/edge prediction mode may be "0". In this case, the index number of the second estimated prediction mode SPM is always "0". Thus, when the index number of the selected prediction mode SMD is to be coded, a value obtained by subtracting at least 1 may be coded and, therefore, the amount of coded data can be further reduced. An example indicated in notation similar to that of Expression 5 is presented as Expression 6 below.

```
[Math. 4]
if ( MPM==SMD){
    MPMF=1
}
else {
  MPMF=0
    if( MPM==DCEDGE ){
        REM = SMD-1
    }
    else{
        if( SPM=SMD){
            SPMF-1
        }
        else {
            SPMF=0
            if( SMD < MPM ){
                REM = SMD-1
            }
            else{
                REM = SMD-2
            }
        }
    }
}
                                    ... Expression 6
```

Moreover, the functions may be changed between the first prediction mode estimation unit 141 and the second prediction mode estimation unit 142 unlike the configuration shown in FIG. 6A. The changed configuration is shown in FIG. 6B.

The second prediction mode estimation unit 142 shown in FIG. 6B includes the prediction mode storage memory 211 and a second prediction mode estimation derivation unit 213.

Unless otherwise noted, the components operate in the same manner as in FIG. 6A.

The first prediction mode estimation unit 141 outputs, to the mode information generation unit 143, the first estimated prediction mode MPM that is an estimated value of the first prediction mode set according to a predetermined method.

Here, by allowing the first estimated prediction mode MPM to indicate DC/edge prediction, one piece of mode information indicating the plurality of prediction modes can be efficiently coded and decoded.

The second prediction mode estimation derivation unit 142 receives a control signal from the mode information generation unit 143, and derives, from the previously-coded coding mode information stored in the prediction mode storage unit 211, a second estimated prediction mode SPM that is a result of estimating the prediction mode using a predetermined means. Then, the second prediction mode estimation derivation unit 142 outputs the second estimated prediction mode SPM to the mode information generation unit 143.

Here, the method of deriving the second estimated prediction mode SPM is the same as the method of deriving the first estimated prediction mode MPM as in FIG. 6A. However, the first estimated prediction mode MPM may be obtained, and the second estimated prediction mode SPM different from the first estimated prediction mode MPM may be derived. For example, after excluding the first estimated prediction mode MPM from the mode candidates, the second estimated prediction mode SPM may be determined according to a predetermined method. With this, the candidates may be different between the first and second estimated prediction modes, and this can reduce the amount of coded data.

The mode information generation unit 143 generates the mode information based on the first estimated prediction mode MPM, the second estimated prediction mode SPM, and the selected prediction mode SMD selected by the coding unit 110. Then, the mode information generation unit 143 outputs the mode information as a prediction-coding-mode related signal SSMD to the variable-length coding unit 131. The variable-length coding unit 131 performs variable-length coding on the prediction-coding-mode related signal SSMD, and then outputs the signal as a bitstream.

Figure 7B:
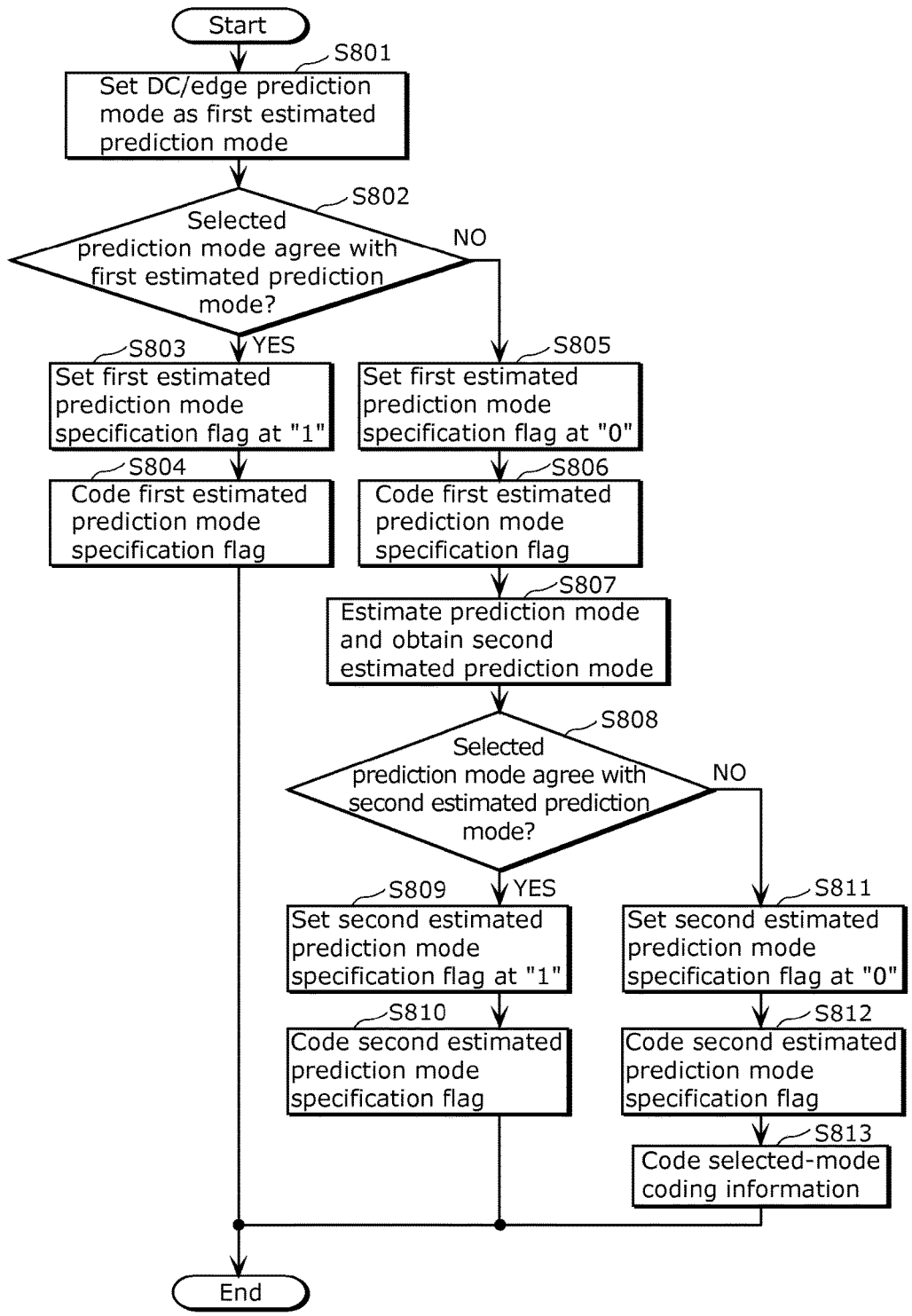
FIG. 7B is a flowchart showing another example of the operation performed by the setting unit included in the image coding apparatus in Embodiment 1.

FIG. 7B is a flowchart showing an example of an operation performed by the first prediction mode estimation unit 141, the second prediction mode estimation unit 142, and the setting unit 143 that are shown in FIG. 6B.

Firstly, the first prediction mode estimation unit 141 sets the DC/edge prediction mode as the first estimated prediction mode MPM, and the mode information generation unit 143 obtains the set first estimated prediction mode MPM (Step S801). When the selected prediction mode SMD agrees with the first estimated prediction mode MPM (YES in Step S802), a first estimated prediction mode specification flag is set at "1 (indicating the agreement)" (Step S803). Then, the variable-length coding unit 131 codes the first estimated prediction mode specification flag as the prediction-coding-mode related signal SSMD (Step S804).

On the other hand, when the selected prediction mode SMD disagrees with the first estimated prediction mode MPM (NO in Step S802), the first estimated prediction mode specification flag is set at "0 (indicating the disagreement)" (Step S805). Then, the variable-length coding unit 131 codes the first estimated prediction mode specification flag as the prediction-coding-mode related signal SSMD (Step S806).

Next, the mode information generation unit 143 outputs a control signal to the second prediction mode estimation unit 142. As a result, the second prediction mode estimation unit 142 derives the second estimated prediction mode SPM according to a predetermined method and outputs the derived second estimated prediction mode SPM to the mode information generation unit 143 (Step S807).

Next, the selected prediction mode SMD agrees with the second estimated prediction mode SPM (YES in Step S808), a second estimated prediction mode specification flag is set at "1 (indicating the agreement)" (Step S7809). Then, the variable-length coding unit 131 codes the second estimated prediction mode specification flag as the prediction-coding-mode related signal SSMD (Step S810).

On the other hand, when the selected prediction mode SMD disagrees with the second estimated prediction mode SPM (NO in Step S808), the second estimated prediction mode specification flag is set at "0 (indicating the disagreement)" (Step S811). Then, the variable-length coding unit 131 codes the second estimated prediction mode specification flag as the prediction-coding-mode related signal SSMD (Step S812).

Moreover, the selected prediction mode SMD is set as the selected-mode coding information which is thus added to flag information. Then, the variable-length coding unit 131 codes the selected-mode coding information as the prediction-coding-mode related signal SSMD (Step S813).

The present example describes the case where, when the selected prediction mode SMD disagrees with the first estimated prediction mode MPM or the second estimated prediction mode SPM, the selected prediction mode SMD is coded with no change as the selected-mode coding information. However, it should be noted that the preset invention is not limited to this. For example, when no number agreeing with the estimated prediction mode is present and the index number of the selected prediction mode SMD is larger than the index number of the estimated prediction mode, as represented by Expression 2, a value obtained by subtracting the number of estimated prediction modes (2 at the maximum in the examples shown in FIG. 6B and FIG. 7B) may be coded as the selected-mode coding information. With this, the amount of coded data can be further reduced. An example indicated in notation similar to that of Expressions 5 and 6 is presented as Expression 7 below.

[Math. 5]
```
if ( MPM=SMD){
    MPMF=1
}
else {
    MPMF=0
    if( SPM==SMD ){
        SPMF=1
    }
    else{
        SPMF=0
        if ( MPM < SPM ){
            if( SMD < MPM ){
                REM = SMD
            }
            else if( SMD < SPM ){
                REM = SMD-1
            }
            else{
                REM = SMD-2
            }
        }
        else{
            if( SMD < SPM ){
                REM = SMD
            }
            else if( SMD < MPM ){
                REM = SMD-1
            }
            else{
                REM = SMD-2
            }
        }
    }
}
```
... Expression 7

It should be noted that the index number of the DC/edge prediction mode may be "0" as in the case shown in FIG. 7A. In this case, the index number of the first estimated prediction mode SPM is always "0". Thus, when the index number of the selected prediction mode SMD is to be coded, a value obtained by subtracting at least 1 may be coded and, therefore, the amount of coded data can be further reduced. An example indicated in notation similar to that of Expression 7 is presented as Expression 8 below.

[Math. 6]
```
if ( MPM==SMD){
    MPMF=1
}
else {
    MPMF=0
    if( SPM==SMD ){
        SPMF=1
    }
    else{
        SPMF=0
        if( SMD < SPM ){
            REM = SMD-1
        }
        else{
            REM = SMD-2
        }
    }
}
```
... Expression 8

With the configuration described thus far, coding can be efficiently performed on the mode information regarding the DC mode that is a prediction mode for an even area and the edge prediction mode that is a prediction mode for an area including an edge. As a result, in addition to the reduction in the amount of data coded as the prediction mode, the image quality can be improved as well because of an increase in prediction performance.

Figure 8:
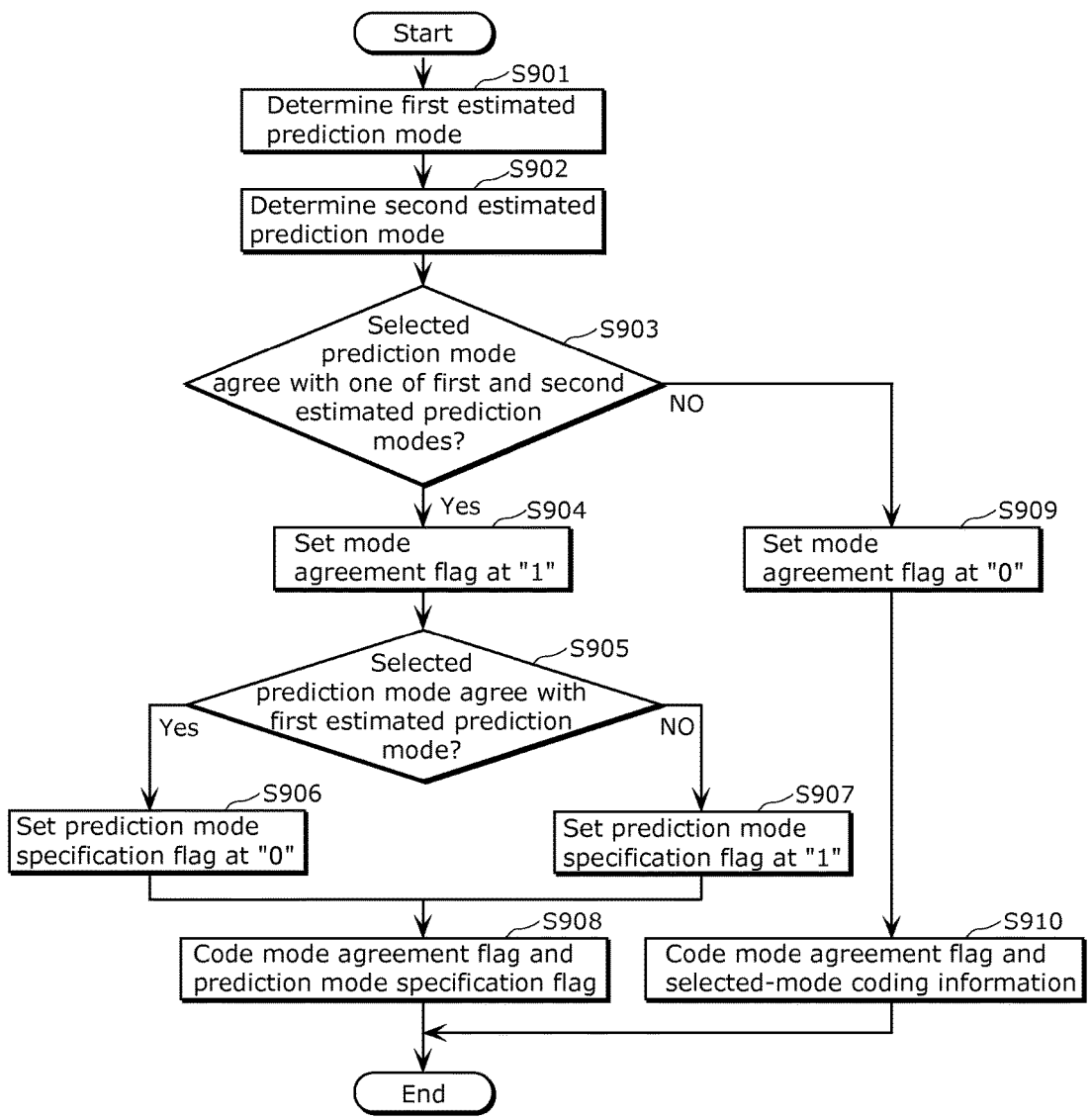
FIG. 8 is a flowchart showing another example of the operation performed by the setting unit included in the image coding apparatus in Embodiment 1.

Next, Modification of the examples shown in FIG. 7A and FIG. 7B is described, with reference to FIG. 8. FIG. 8 is a flowchart related to Modification of Embodiment 1. It should be noted that although the following describes an example where the setting unit 140 shown in FIG. 6A performs a process shown in FIG. 8, the present invention is not limited to this.

Note that a "mode agreement flag" described in the flowchart of FIG. 8 is a one-bit flag indicating that: the selected prediction mode agrees with one of the first and second estimated prediction modes ("1" is set in this case); or the selected prediction mode disagrees with both the first and second estimated prediction modes ("0" is set in this case). Moreover, a "prediction mode specification flag" is a one-bit flag indicating that: the selected prediction mode agrees with the first estimated prediction mode ("0" is set in this case); or the selected prediction mode agrees with the second estimated prediction modes ("1" is set in this case). Then, the mode agreement flag and the prediction mode specification flag are coded as the prediction-coding-mode related signal SSMD.

Firstly, the first prediction mode estimation unit 141 determines a first estimated prediction mode (S901). The first estimated prediction mode can be determined according to the method described above. In the present example, among the prediction modes of the blocks that are adjacent to a current block to be coded and have been previously coded, the prediction mode assigned the smallest index number is determined as the first estimated prediction mode.

Next, the second prediction mode estimation unit 142 determines a second estimated prediction mode (S902). The second estimated prediction mode is different from the first estimated prediction mode as described above. A method of determining the second estimated prediction mode is not particularly limited, and the following method can be used as an example.

Firstly, the second prediction mode estimation unit 142 determines whether or not the first estimated prediction mode indicates the planar mode. When the first estimated prediction mode indicates the planar mode, the second prediction mode estimation unit 142 determines the DC mode as the second estimated prediction mode. On the other hand, when the first estimated prediction mode does not indicate the planar mode, the second prediction mode estimation unit 142 determines the planar mode as the second estimated prediction mode.

Next, the mode information generation unit 143 determines whether the selected prediction mode agrees with one of the first and second estimated prediction modes (S903). When the selected prediction mode agrees with one of the first and second estimated prediction modes (Yes in S903), the mode information generation unit 143 sets the mode agreement flag at "1 (indicating the agreement with one of the first and second estimated prediction modes)" (S904).

After this, the mode information generation unit 143 determines whether or not the selected prediction mode agrees with the first estimated prediction mode (S905). It should be obvious that whether or not the selected prediction mode agrees with the second estimated prediction mode may be determined in Step S905.

When the selected prediction mode agrees with the first estimated prediction mode (Yes in S905), the mode information generation unit 143 sets the prediction mode specification flag at "0 (indicating the agreement with the first estimated prediction modes)" (S906). On the other hand, when the selected prediction mode disagrees with the first estimated prediction mode (No in S905), the mode information generation unit 143 sets the prediction mode specification flag at "1 (indicating the agreement with the second estimated prediction mode)" (S907).

Then, the variable-length coding unit 131 codes the mode agreement flag and the prediction mode specification flag set in Steps S904 to S907, as the prediction-coding-mode related signal SSMD (S908).

On the other hand, when the selected prediction mode disagrees with both the first and second estimated prediction modes in Step S903 (No in S903), the mode information generation unit 143 sets the mode agreement flag at "0 (indicating the disagreement with both the first and second estimated prediction modes)" (S909). Then, the variable-length coding unit 131 codes the mode agreement flag set in Step S909 and the information specifying the selected prediction mode, as the prediction-coding-mode related signal SSMD (S910).

Here, the information specifying the selected prediction mode corresponds to the selected-mode coding information that can be determined according to Expression 5 for example. However, the information is not limited to this as long as the decoding apparatus side can specify the selected prediction mode based on the information.

On comparison, the flowchart shown in FIG. 8 is different from the flowcharts shown in FIG. 7A and FIG. 7B in the meanings indicated by the flags and in the sequence of processes such as the comparing processes. However, the flowchart in FIG. 8 and the flowcharts in FIG. 7A and FIG. 7B have in common that the amount of data coded as the mode information is reduced using the two estimated prediction modes.

To be more specific, in each of the processes shown in FIG. 7A, FIG. 7B, and FIG. 8, when the selected prediction mode agrees with one of the first and second estimated prediction modes, the flag information indicating the agreement with which one of the first and second estimated prediction modes is generated as the mode information. On the other hand, when the selected prediction mode disagrees with both the first and second estimated prediction modes, the flag information indicating the disagreement with both the first and second estimated prediction modes and the information specifying the selected prediction mode are generated as the mode information.

Although the image coding apparatus, the image decoding apparatus, and the methods thereof according to the present invention have been described by way of Embodiment, the present invention is not limited to Embodiment above. It is to be noted that various changes and modifications will be apparent to those skilled in the art. Therefore, unless otherwise such changes and modifications depart from the scope of the present invention, they should be intended to be included therein.

For example, when the index number of the selected prediction mode SMD is to be coded, coding does not need to be performed in numerical order of the index numbers. More specifically, a smaller number may be assigned sequentially to a direction vector that is closer to the first estimated prediction mode MPM or the second estimated prediction mode SPM and then coding may be accordingly performed. This means that a smaller number is coded and, therefore, the amount of coded data can be reduced. Moreover, each of mode numbers to be assigned to the prediction modes may be dynamically changed according to the frequency of occurrence of the prediction mode. To be more specific, a smaller mode number may be assigned to a prediction mode that occurs with a higher frequency.

Moreover, the present invention is not limited to the H.264 video coding standard, and is not limited to the above-mentioned conventional predicted values of the intra prediction mode and the location information (motion vector), such as the intra prediction mode using the edge direction (edge prediction mode) as described in Non Patent Literature 2. In fact, the prediction-mode estimation method according to the present invention may be used by any block-by-block-basis video coding apparatus.

Furthermore, the edge detection unit used in the prediction-mode estimation method according to the present invention may be shared with some functions of a video coding system. For example, by applying the present invention to the video coding system having the edge prediction mode, the edge detection unit can be shared. Thus, resources can be used effectively.

Moreover, the present invention is not limited to a video coding application, and may be used for still image coding performed on a block-by-block basis.

Furthermore, as described above, the present invention can be implemented not only as the image coding apparatus and methods thereof, but also as a computer program causing a computer to execute each of the image coding methods in Embodiment 1. Also, the present invention can be implemented as a recording medium, such as a computer readable CD-ROM, that has the computer program recorded thereon. Moreover, the present invention can be implemented as information, data, or a signal indicating the computer program. The computer program, the information, the data, and the signal may be distributed via a communication network such as the Internet.

Although the image coding apparatus and the method thereof according to the present invention have been described by way of Embodiment, the present invention is not limited to Embodiment above. It is to be noted that various changes and modifications will be apparent to those skilled in the art. Therefore, unless otherwise such changes and modifications depart from the scope of the present invention, they should be intended to be included therein.

For example, Embodiment 1 describes the case, as an example, where the DC prediction and the edge prediction are assigned the same prediction index number. However, the present invention is not limited to this. Suppose that the same prediction index number is assigned to: the edge prediction mode; and a prediction mode that generates a predicted pixel according to a method that is not based on the direction prediction, such as a method of generating predicted pixels one by one. Even in this case, the prediction mode can be efficiently coded and decoded by performing the same process as described above.

Embodiment 2

Next, a configuration of an image decoding apparatus 300 in Embodiment 2 is described.

Figure 9:
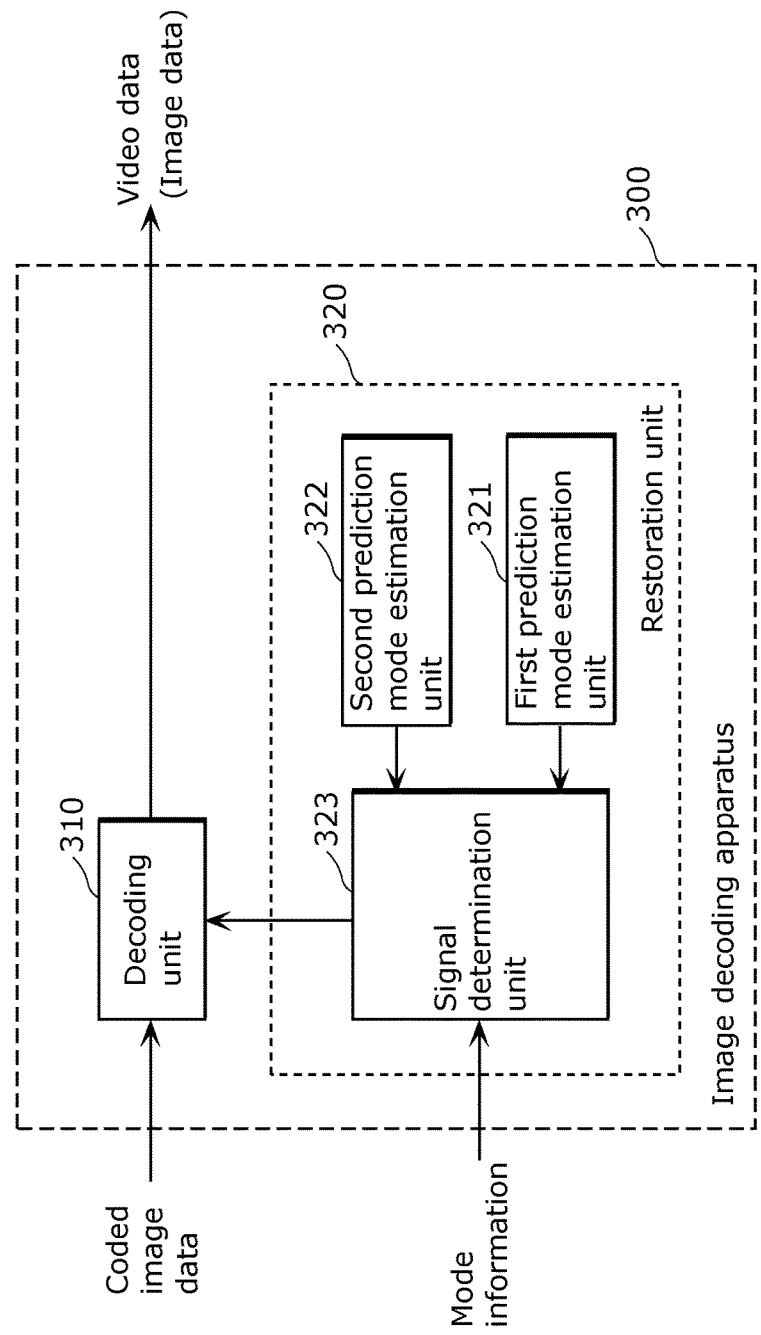
FIG. 9 is a block diagram showing an example of a configuration of an image decoding apparatus in Embodiment 2.

FIG. 9 is a block diagram showing an example of the configuration of the image decoding apparatus 300 in Embodiment 2.

The image decoding apparatus 300 decodes coded image data generated by coding image data for each block according to prediction based on a prediction mode. As shown in FIG. 9, the image decoding apparatus 300 includes a decoding unit 310 and a restoration unit 320.

The decoding unit 310 generates a decoded block by decoding a current block that is one of a plurality of blocks included in coded image data, according to prediction based on a selected prediction mode restored by the restoration unit 320. The generated decoded block is outputted as image data or video data. It should be noted that, as is the case with the coding apparatus side, prediction mode candidates refer to all possible prediction modes each of which can be selected when prediction is made. For example, the prediction mode candidates include eight direction prediction modes, the DC prediction mode, and the edge prediction mode. Alternatively, as described above, the prediction mode candidates may include 33 direction prediction modes at the maximum, the DC prediction mode, and the planar mode.

The restoration unit 320 restores the selected prediction mode from among the prediction mode candidates, based on mode information used for restoring the prediction mode selected when coding is performed. Here, the mode information refers to information indicating a result of the prediction-mode selection made when coding is performed. As shown in FIG. 9, the restoration unit 320 includes a first prediction mode estimation unit 321, a second prediction mode estimation unit 322, and a signal determination unit 323.

The first prediction mode estimation unit 321 and the second prediction mode estimation unit 322 are examples of a prediction mode restoration unit according to the present invention. The first prediction mode estimation unit 321 and the second prediction mode estimation unit 322 can set one of the DC prediction mode and the edge prediction mode as an estimated prediction mode and restore a bitstream in which the amount of data coded as the DC/edge prediction mode is reduced.

With the configuration described thus far, the image decoding apparatus 300 in Embodiment 2 decodes the bitstream in which the amount of data coded as the prediction mode is reduced, by estimating the plurality of prediction modes. To be more specific, by estimating at least two prediction modes, the image decoding apparatus 300 in Embodiment 2 restores the prediction mode.

The following describes detailed configurations and operations of processing units included in the image decoding apparatus 300 in Embodiment 2.

Figure 10:
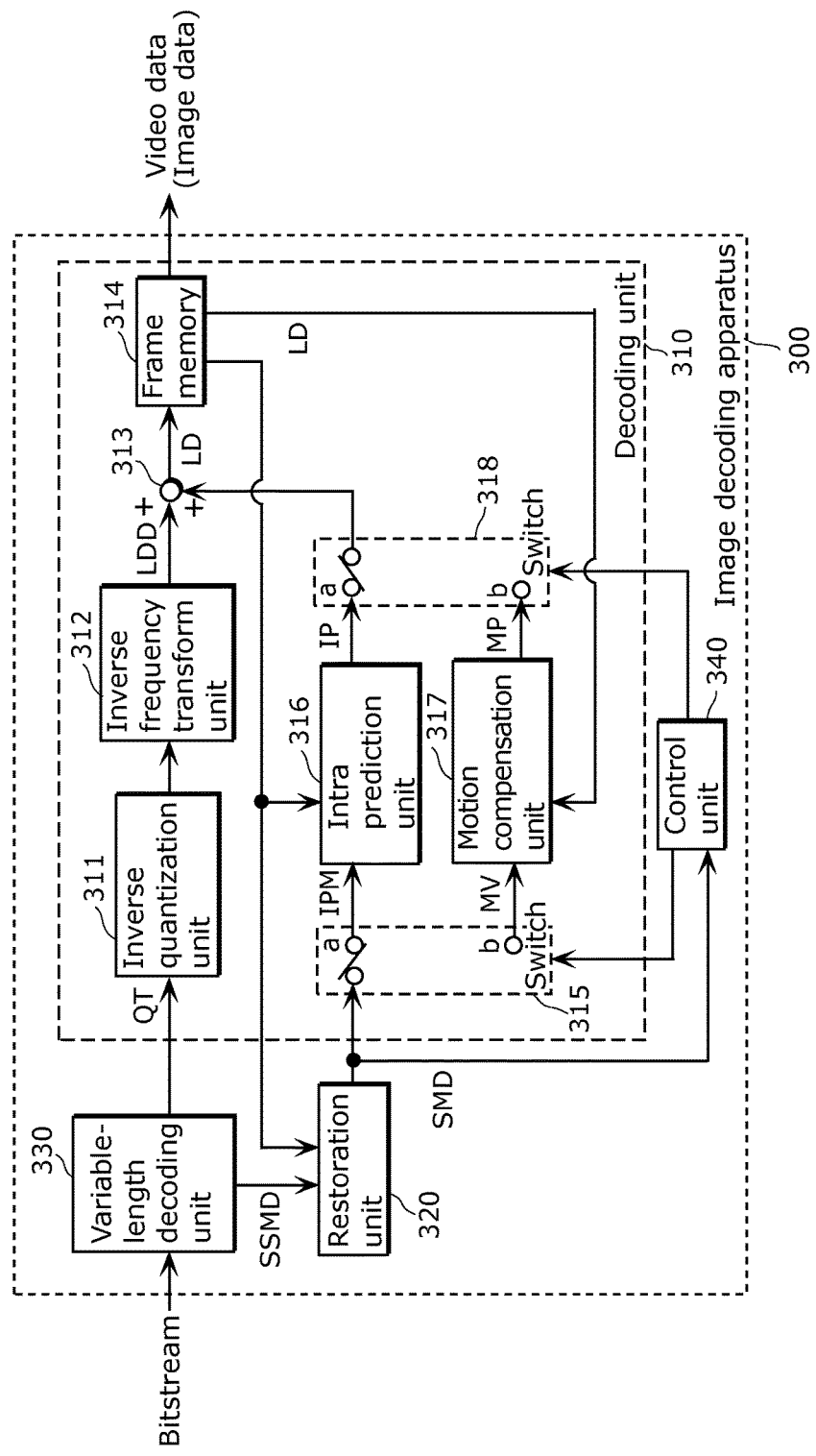
FIG. 10 is a block diagram showing an example of a detailed configuration of the image decoding apparatus in Embodiment 2.

FIG. 10 is a block diagram showing an example of a detailed configuration of the image decoding apparatus 300 in Embodiment 2. As shown in FIG. 10, the image decoding apparatus 300 includes the decoding unit 310, the restoration unit 320, a variable-length decoding unit 330, and a control unit 340.

Moreover, as shown in FIG. 10, the decoding unit 310 includes an inverse quantization unit 311, an inverse frequency transform unit 312, an addition unit 313, a frame memory 314, a switch 315, an intra prediction unit 316, a motion compensation unit 317, and a switch 318. A detailed configuration of the restoration unit 320 is described later with reference to FIG. 11A and FIG. 11B.

The following describes the processes performed by the processing units, in line with an operation performed by the image decoding apparatus 300 to decode a bitstream (coded video data). The image decoding apparatus 300 decodes the coded video data including a prediction residual, for each block as an intra-frame-prediction coded block or inter-frame-prediction coded block, and then outputs the decoded data as the video data or the image data.

The variable-length decoding unit 330 performs variable-length decoding on the bitstream using a predetermined means, and outputs a quantized frequency transform coefficient QT and prediction-coding-mode related information SSMD. The restoration unit 320 receives the prediction-coding-mode related information SSMD and a previously-decoded image signal LD, and outputs information indicating: a coding mode MD; and an intra prediction mode IPM or location information (motion vector) MV. As mentioned above, the detailed configuration of the restoration unit 320 is described later with reference to FIG. 11A and FIG. 11B.

The coding mode MD is inputted into the control unit 340. The information indicating the intra prediction mode IPM or the location information (motion vector) MV is inputted into the switch 315. The quantized frequency transform coefficient QT is inputted into the inverse quantization unit 311.

The control unit 340 controls the switches 315 and 318 based on the coding mode MD. When the coding mode MD indicates intra prediction coding, the switch 315 is connected to a terminal "a" and the information indicating the intra prediction mode IPM is inputted into the intra prediction unit 316. When the coding mode MD indicates inter prediction coding, the switch 315 is connected to a terminal "b", and the location information (motion vector) MV is inputted into the motion compensation unit 317.

When the current block is an intra-prediction coded block, each of the switches 315 and 318 is connected to the corresponding terminal "a". Then, the information indicating the intra prediction mode IPM is inputted into the intra prediction unit 316, and the quantized frequency transform coefficient QT is inputted into the inverse quantization unit 311. Note that the quantized frequency transform coefficient QT corresponds to the prediction residual coded by a coding apparatus (such as the image coding apparatus 100).

The intra prediction unit 316 obtains an intra-prediction reference pixel from the frame memory 314 based on the received intra prediction mode. Then, the intra prediction unit 316 generates an intra prediction image (a predicted block), and outputs the intra prediction image to the addition unit 313.

The inverse quantization unit 311 performs inverse quantization on the quantized frequency transform coefficient QT, and outputs the inversely-quantized frequency transform coefficient to the inverse frequency transform unit 312. Then, by performing inverse frequency transform on the inversely-quantized frequency transform coefficient, the inverse frequency transform unit 312 generates a decoded difference image LDD. The inverse frequency transform unit 312 outputs the generated decoded difference image LDD to the addition unit 313.

The addition unit 313 adds the decoded difference image LDD to the intra prediction image IP to generate a decoded image LD. The generated decoded image LD is stored into the frame memory 314. Here, the decoded image LD stored into the frame memory 314 is used as a reference picture in a later decoding process. Moreover, the decoded image LD is outputted in a manner that the decoded image LD forms the decoded video data.

When the current block is an inter prediction block, each of the switches 315 and 318 is connected to the corresponding terminal "b". Then, the information indicating the location information (motion vector) MV is inputted into the motion compensation unit 317, and the quantized frequency transform coefficient QT is inputted into the inverse quantization unit 311.

The motion compensation unit 317 obtains a reference pixel from the frame memory 314 based on the received location information (motion vector) MV. Then, the motion compensation unit 317 generates a predicted picture, and outputs the predicted picture to the addition unit 313.

The processes performed by the inverse quantization unit 311, the inverse frequency transform unit 312, and the addition unit 313 are the same as those described above for the case of the intra prediction block. The decoded image LD is stored into the frame memory 314. Here, the decoded image LD stored into the frame memory 314 is used as a reference picture in a later decoding process. Moreover, the decoded image LD is outputted in a manner that the decoded image LD forms the decoded video data.

Figure 11A:
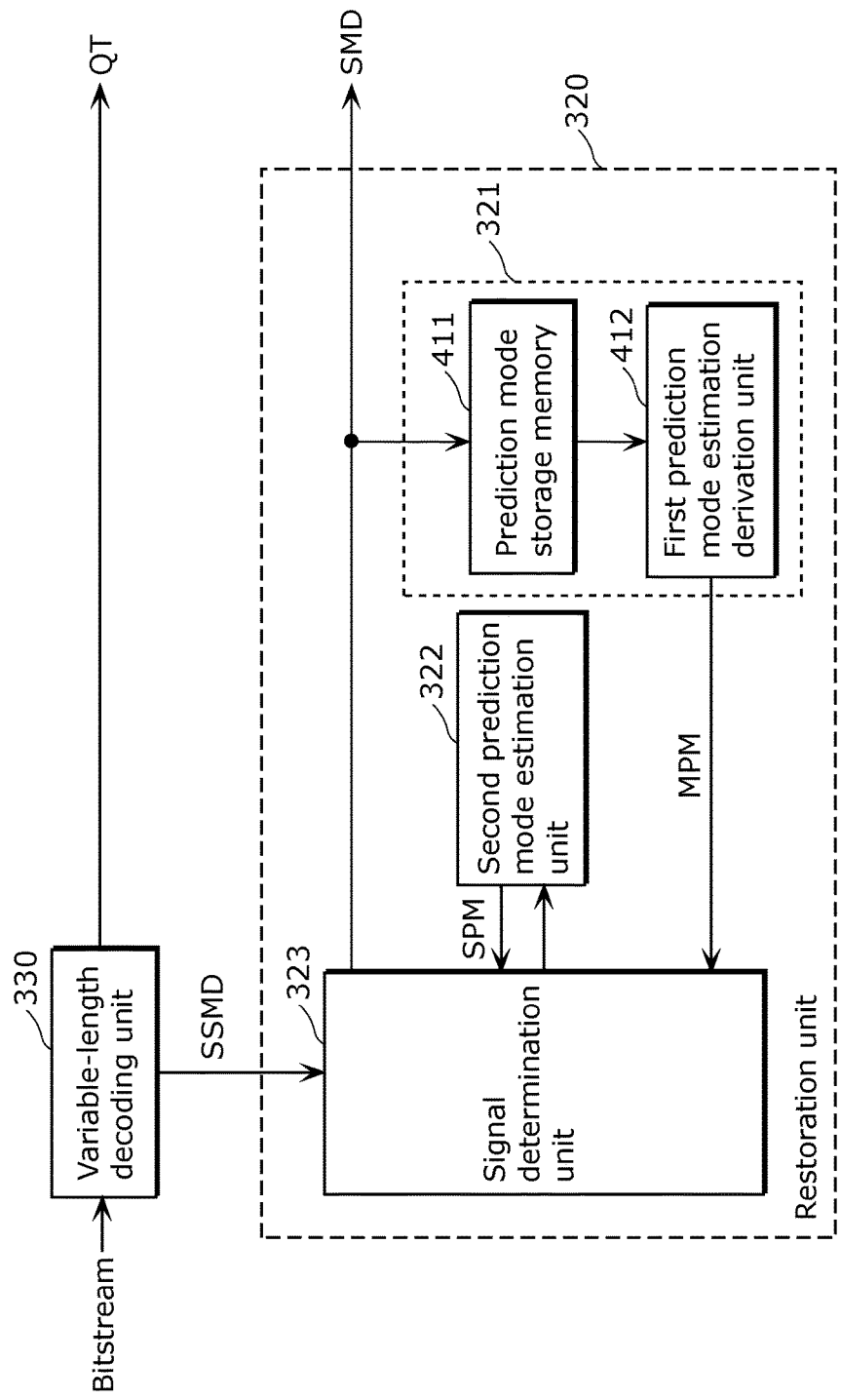
FIG. 11A is a block diagram showing an example of a detailed configuration of a restoration unit included in the image decoding apparatus in Embodiment 2.
Figure 11B:
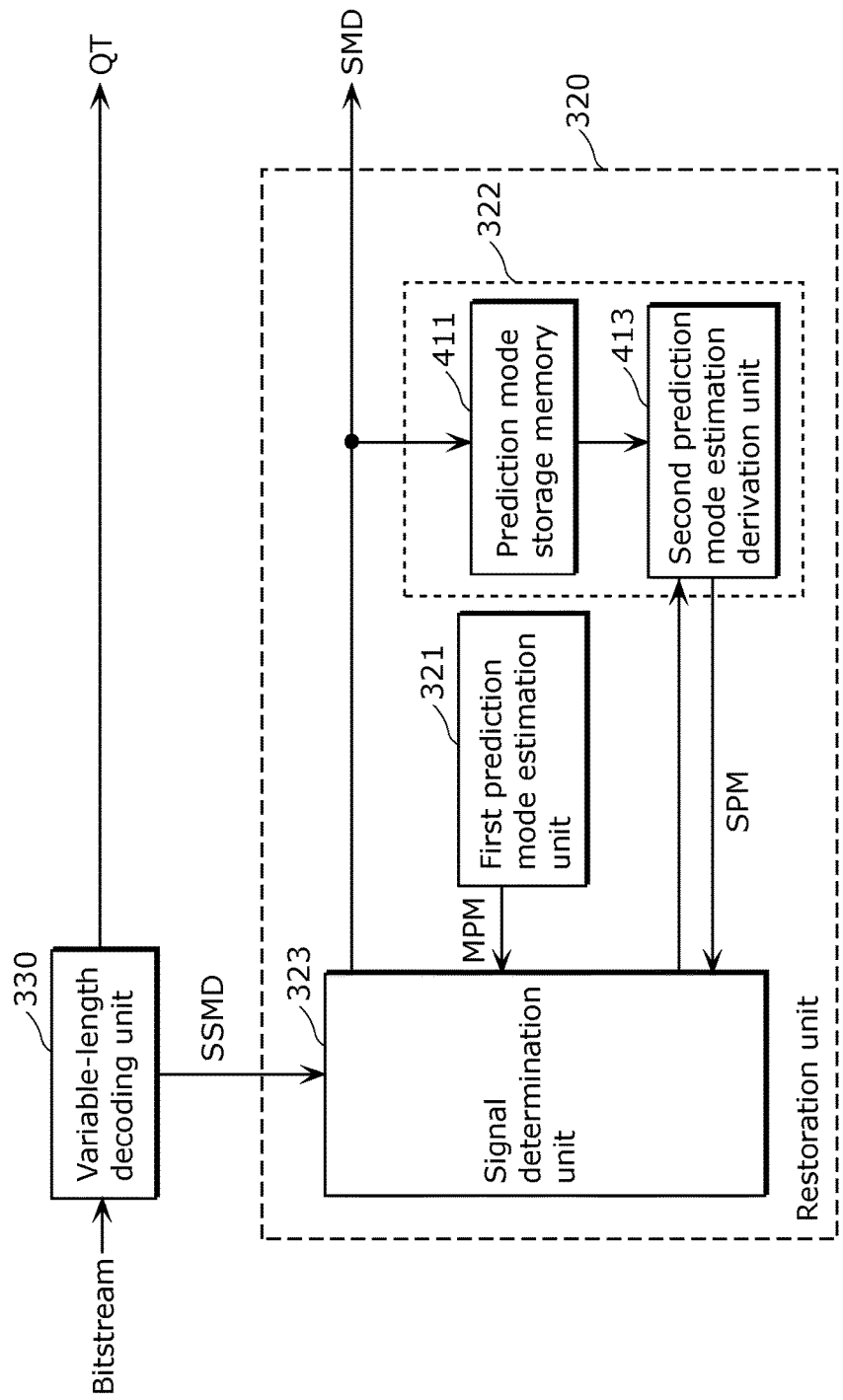
FIG. 11B is a block diagram showing another example of the detailed configuration of the restoration unit included in the image decoding apparatus in Embodiment 2.

Next, the detailed configuration of the restoration unit 320 in Embodiment 2 is described, with reference to FIG. 11A and FIG. 11B.

FIG. 11A is a diagram showing an example of the detailed configuration of the restoration unit 320 in Embodiment 2. As shown in this diagram and FIG. 9, the restoration unit 320 includes the first prediction mode estimation unit 321, the second prediction mode estimation unit 322, and the signal determination unit 323.

The first prediction mode estimation unit 321 includes a prediction mode storage memory 411 and a first prediction mode estimation derivation unit 412.

The restoration unit 320 receives the prediction-coding-mode related signal SSMD, and outputs, as coding mode information SMD, information indicating: the coding mode MD; and the intra prediction mode IPM or the location information (motion vector) MV.

The prediction mode storage memory 411 stores the received previously-decoded coding mode information SMD. The first prediction mode estimation derivation unit 412 derives, from the previously-decoded coding mode information SMD stored in the prediction mode storage unit 411, a first estimated prediction mode MPM that is a result of estimating the prediction mode using a predetermined means. Then, the first prediction mode estimation derivation unit 412 outputs the first estimated prediction mode MPM to the signal determination unit 323.

Here, as a method of deriving the first estimated prediction mode MPM, the prediction mode of the previously-decoded block located above and adjacent to the current block to be decoded may be compared with the prediction mode of the previously-decoded block located to the left of and adjacent to the current block, and then the prediction mode assigned the smaller index number may be used as the first estimated prediction mode MPM, as represented by Expression 1 above. Moreover, the prediction modes of the blocks that are located on the upper left and upper right of and adjacent to the current block may be further referenced. Then, the prediction mode that occurs with the highest frequency may be derived as the first estimated prediction mode MPM. The method of deriving the first estimated prediction mode MPM is not limited to the above examples, and may be a different method as long as the different method derives the prediction mode that is estimated to occur with the highest frequency. Note that this estimation method is the same as the method used for coding the bitstream.

It should be noted that when the number of direction prediction modes is different according to the block size, the direction prediction mode that is closest to the estimated prediction mode selected by the above method may be derived as the first estimated prediction mode MPM out of the possible direction prediction modes to be selected for the current block to be decoded.

The second prediction mode estimation unit 322 obtains a control signal from the signal determination unit 323 and outputs, to the signal determination unit 323, a second estimated prediction mode SPM that is an estimated value of the second prediction mode set according to a predetermined method.

The signal determination unit 323 generates the coding mode information SMD based on the first estimated prediction mode MPM, the second estimated prediction mode SPM, and the prediction-coding-mode related signal SSMD obtained by the variable-length decoding unit 330 performing variable-length decoding on the bitstream. Then, the signal determination unit 323 outputs the coding mode information SMD.

Here, by allowing the second estimated prediction mode SPM to indicate DC/edge prediction, one piece of mode information indicating the plurality of prediction modes can be efficiently coded and decoded.

Figure 12A:
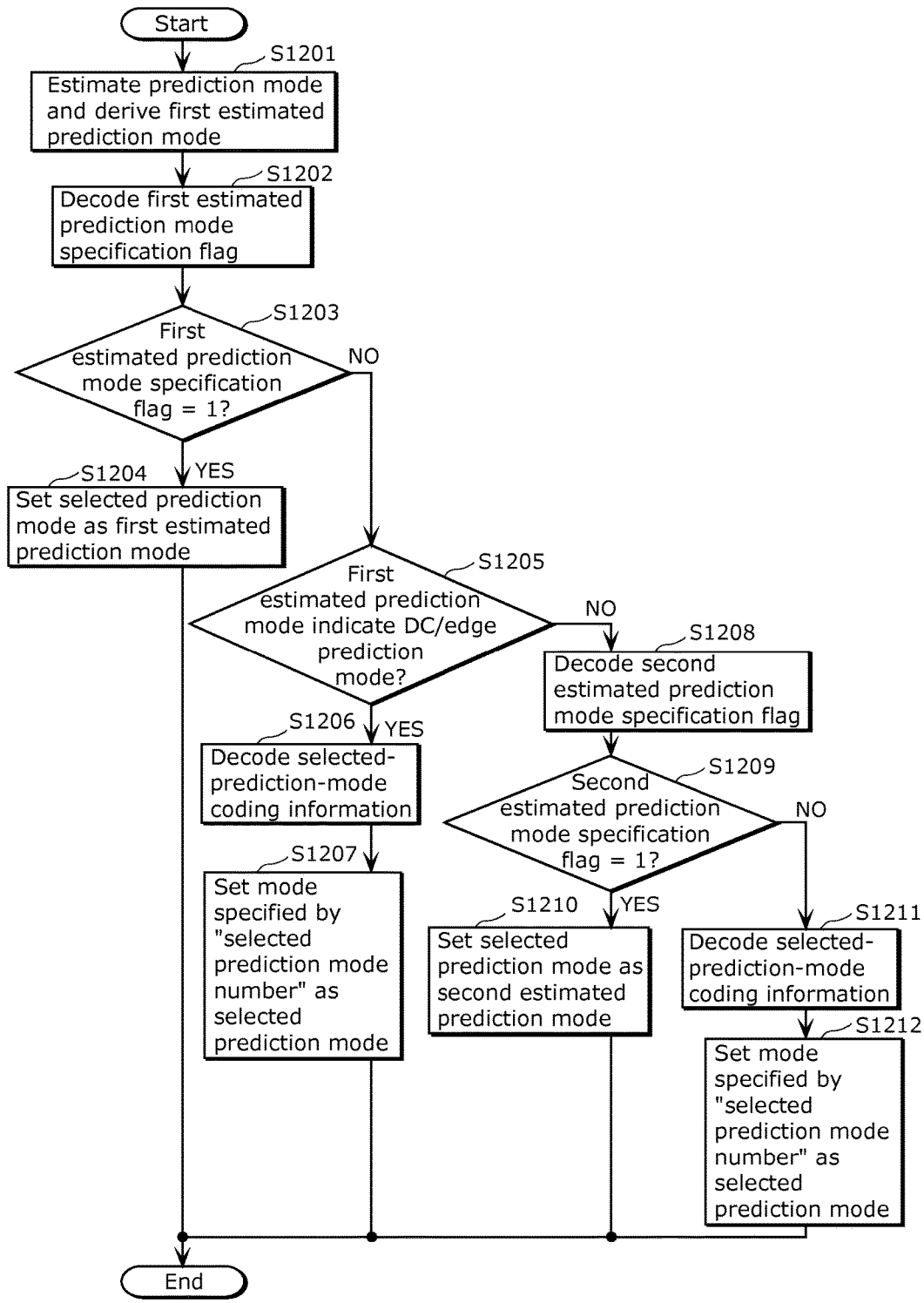
FIG. 12A is a flowchart showing an example of an operation performed by the restoration unit included in the image decoding apparatus in Embodiment 2.

FIG. 12A is a flowchart showing an example of an operation performed by the first prediction mode estimation unit 321, the second prediction mode estimation unit 322, and the signal determination unit 323 that are shown in FIG. 11A. An operation performed by the signal determination unit 323 to decode the coding mode information performed is described in more detail with reference to FIG. 12A.

Firstly, the signal determination unit 323 obtains the first estimated prediction mode MPM derived by the first prediction mode estimation unit 321 (Step S1201). Next, the signal determination unit 323 obtains the prediction-coding-mode related signal SSMD and decodes a first estimated prediction mode specification flag (Step S1202). When the first estimated prediction mode specification flag is set at "1" (YES in Step S1203), the signal determination unit 323 sets the selected prediction mode SMD as the first estimated prediction mode MPM (Step S1204) and outputs this first estimated prediction mode MPM.

On the other hand, when the first estimated prediction mode specification flag is set at "0" (NO in Step S1203) and the first estimated prediction mode MPM indicates the DC/edge prediction mode (YES in Step S1205), selectedprediction-mode coding information is next decoded (Step S1206). The mode specified by a selected prediction mode number obtained by the decoding is set as the selected prediction mode SMD (Step S1207), and the selected prediction mode SMD is outputted.

When the first estimated prediction mode MPM does not indicate the DC/edge prediction mode (NO in Step S1205), a second estimated prediction mode specification flag is decoded (Step S1208). When the second estimated prediction mode specification flag is set at "1" (YES in Step S1209), the selected prediction mode SMD is set as the second estimated prediction mode SPM (Step S1210) and this second estimated prediction mode SPM is outputted. When the second estimated prediction mode specification flag is set at "0" (NO in Step S1209), the selected-prediction-mode coding information is decoded (Step S1211). The mode specified by a selected prediction mode number obtained by the decoding is set as the selected prediction mode SMD (Step S1212), and the selected prediction mode SMD is outputted.

The present example describes the case where, when the selected prediction mode SMD disagrees with the first estimated prediction mode MPM or the second estimated prediction mode SPM, the selected prediction mode SMD is coded with no change as the selected-mode coding information. However, it should be noted that the preset invention is not limited to this. For example, when no number agreeing with the estimated prediction mode is present and the index number of the selected prediction mode SMD is larger than the index number of the estimated prediction mode, as represented by Expression 3, a value obtained by subtracting the number of estimated prediction modes (2 at the maximum in the examples shown in FIG. 6A and FIG. 7A) may be coded. Therefore, when decoding is performed, a value obtained by adding the number of estimated prediction modes (2 at the maximum in the examples shown in FIG. 11A and FIG. 12A) is decoded as the selected-mode coding information. With this, the bitstream in which the amount of coded data is further reduced can be decoded.

Suppose that: "parse ( )" represents that data within "( )" of the prediction-coding-mode related signal SSMD is decoded; an index number of the first estimated prediction mode MPM is represented by "MPM"; an index number of the selected prediction mode SMD is represented by "SMD"; the first estimated prediction mode specification flag is represented by "MPMF"; the second estimated prediction mode specification flag is represented by "SPMF"; an index number of DC/edge prediction is represented by "DCEDGE"; and the selected-mode coding information is represented by "REM". In this case, the aforementioned flow can be represented by Expression 9 for example.

[Math. 7]
```
parse ( MPMF )
if ( MPM==1){
    SMD=MPM
}
else{
    if( MPM==DCEDGE){
        parse (REM)
        if( REM < MPM ){
            SMD=REM
        }
        else{
            SMD=REM+1
        }
    }
    else{
        parse( SPMF )
        if ( SPMF == 1 ){
            SMD=SPM
        }
        else {
            parse( REM )
            if( MPM < SPM ){
                if( REM < MPM ){
                    SMD=REM
                }
                else if ( REM < SPM ){
                    SMD=REM+1
                }
                else {
                    SMD=REM+2
                }
            }
            else{
                if( REM < SPM ){
                    SMD=REM
                }
                else if( REM < MPM ){
                    SMD=REM+1
                }
                else{
                    SMD=REM+2
                }
            }
        }
    }
}
```
... Expression 9

It should be noted that the index number of the DC/edge prediction mode may be "0". In this case, the index number of the second estimated prediction mode SPM is always "0". Thus, when the index number of the selected prediction mode SMD is to be coded, a value obtained by subtracting at least 1 may be coded. Then, when decoding is performed, a value obtained by adding at least 1 is decoded. With this, the bitstream in which the amount of coded data is further reduced can be decoded. An example indicated in notation similar to that of Expression 9 is presented as Expression 10 below.

[Math. 8]
```
parse ( MPMF )
if ( MPM==1){
    SMD=MPM
}
else{
    if( MPM==DCEDGE){
        parse (REM)
        SMD=REM+1
    }
    else{
        parse( SPMF )
        if ( SPMF == 1 ){
            SMD=SPM
        }
        else {
            parse( REM )
            if( REM < MPM ){
                SMD=REM+1
            }
            else{
                SMD=REM+2
            }
        }
    }
}
```
... Expression 10

Moreover, the functions may be changed between the first prediction mode estimation unit 321 and the second prediction mode estimation unit 322 unlike the configuration shown in FIG. 11A. The changed configuration is shown in FIG. 11B. As shown in FIG. 11B, the second prediction mode estimation unit 322 includes the prediction mode storage memory 411 and a second prediction mode estimation derivation unit 413.

The restoration unit 320 receives the prediction-coding-mode related information SSMD and outputs, as the coding mode information SMD, the information indicating: the coding mode MD; and the intra prediction mode IPM or the location information (motion vector) MV.

The prediction mode storage memory 411 stores the received previously-decoded coding mode information SMD. The second prediction mode estimation derivation unit 413 derives, from the previously-decoded coding mode information SMD stored in the prediction mode storage unit 411, a second estimated prediction mode SPM that is a result of estimating the prediction mode using a predetermined means. Then, the second prediction mode estimation derivation unit 413 outputs the second estimated prediction mode SPM to the signal determination unit 323.

Here, the method of deriving the second estimated prediction mode SPM is the same as the method of deriving the first estimated prediction mode MPM as in FIG. 11A. However, the first estimated prediction mode MPM may be obtained, and the second estimated prediction mode SPM different from the first estimated prediction mode MPM may be derived. For example, after excluding the first estimated prediction mode MPM from the mode candidates, the second estimated prediction mode SPM may be determined according to a predetermined method. With this, the candidates may be different between the first and second estimated prediction modes. Hence, the bitstream in which the amount of coded data is reduced can be decoded. Note that this estimation method is the same as the method used for coding the bitstream.

The first prediction mode estimation unit 321 outputs, to the signal determination unit 323, the first estimated prediction mode MPM that is an estimated value of the first prediction mode set according to a predetermined method.

Here, by allowing the first estimated prediction mode MPM to indicate DC/edge prediction, one piece of mode information indicating the plurality of prediction modes can be efficiently coded and decoded.

The signal determination unit 323 generates the coding mode information SMD based on the first estimated prediction mode MPM, the second estimated prediction mode SPM, and the prediction-coding-mode related signal SSMD obtained by the variable-length decoding unit 330 performing variable-length decoding on the bitstream. Then, the signal determination unit 323 outputs the coding mode information SMD.

Figure 12B:
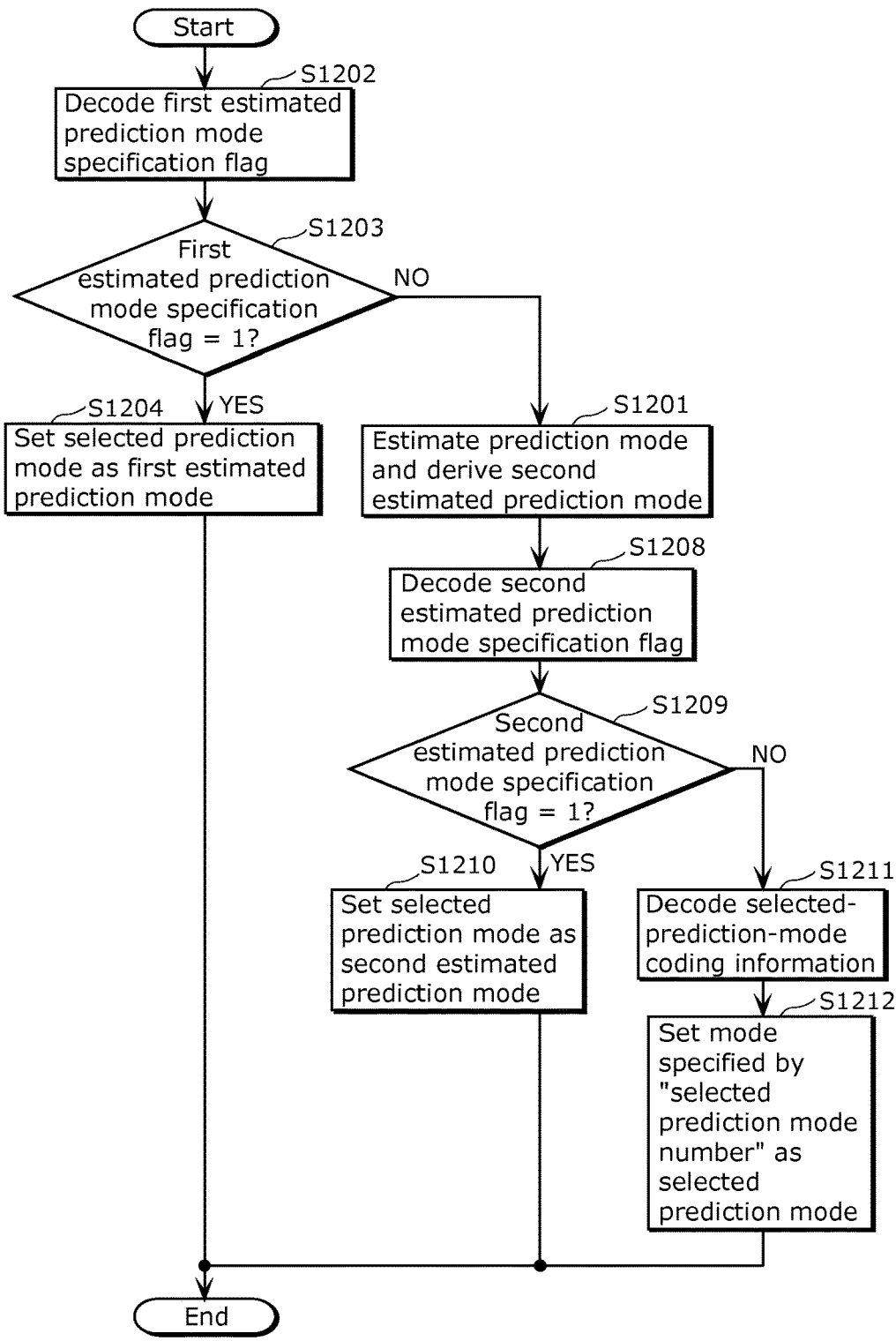
FIG. 12B is a flowchart showing another example of the operation performed by the restoration unit included in the image decoding apparatus in Embodiment 2.

FIG. 12B is a flowchart showing an example of an operation performed by the first prediction mode estimation unit 321, the second prediction mode estimation unit 322, and the signal determination unit 323 that are shown in FIG. 11B. An operation performed by the signal determination unit 323 to decode the coding mode information SMD is described in more detail with reference to FIG. 12B.

Firstly, the signal determination unit 323 obtains the prediction-coding-mode related signal SSMD and decodes a first estimated prediction mode specification flag (Step S1302). When the first estimated prediction mode specification flag is set at "1" (YES in Step S1302), the signal determination unit 323 sets the selected prediction mode SMD as the first estimated prediction mode MPM (Step S1303) and outputs this first estimated prediction mode MPM.

On the other hand, when the first estimated prediction mode specification flag is set at "0" (NO in Step S1302), the signal determination unit 323 obtains the second estimated prediction mode SPM derived by the second prediction mode estimation unit 322 (Step S1304). Following this, the signal determination unit 323 decodes the second estimated prediction mode specification flag from the prediction-coding-mode related signal SSMD (Step S1305).

When the second estimated prediction mode specification flag is set at "1" (YES in Step S1306), the selected prediction mode SMD is set as the second estimated prediction mode SPM (Step S1307) and this second estimated prediction mode SPM is outputted. When the second estimated prediction mode specification flag is set at "0" (NO in Step S1306), the selected-prediction-mode coding information is decoded (Step S1308). The mode specified by a selected prediction mode number obtained by the decoding is set as the selected prediction mode SMD (Step S1309), and the selected prediction mode SMD is outputted.

The present example describes the case where, when the selected prediction mode SMD disagrees with the first estimated prediction mode MPM or the second estimated prediction mode SPM, the selected prediction mode SMD is coded with no change as the selected-mode coding information. However, it should be noted that the preset invention is not limited to this. For example, when no number agreeing with the estimated prediction mode is present and the index number of the selected prediction mode SMD is larger than the index number of the estimated prediction mode, as represented by Expression 3, a value obtained by subtracting the number of estimated prediction modes (2 at the maximum in the examples shown in FIG. 6A and FIG. 7A) may be coded. Therefore, when decoding is performed, a value obtained by adding the number of estimated prediction modes (2 at the maximum in the examples shown in FIG. 11A and FIG. 12A) is decoded as the selected-mode coding information. With this, the bitstream in which the amount of coded data is further reduced can be decoded. An example indicated in notation similar to that of Expressions 9 and 10 is presented as Expression 11 below.

```
[Math. 9]
parse ( MPMF )
if ( MPM==1 ){
    SMD=MPM
}
else{
    parse( SPMF )
    if ( SPMF == 1 ){
        SMD=SPM
    }
    else {
        parse( REM )
        if( MPH < SPM ){
            if( REM < MPM ){
                SMD=REM
            }
            else if ( REM < SPM ){
                SMD=REM+1
            }
            else {
                SMD=REM+2
            }
        }
```

```
        else{
            if( REM < SPM ){
                SMD=REM
            }
            else if( REM < MPM ){
                SMD=REM+1
            }
            else{
                SMD=REM+2
            }
        }
    }
}
                                            ... Expression 11
```

It should be noted that the index number of the DC/edge prediction mode may be "0" as in the case shown in FIG. 12A. In this case, the index number of the second estimated prediction mode SPM is always "0". Thus, when the index number of the selected prediction mode SMD is to be coded, a value obtained by subtracting at least 1 may be coded. Then, when decoding is performed, a value obtained by adding at least 1 is decoded. With this, the bitstream in which the amount of coded data is further reduced can be decoded. An example indicated in notation similar to that of Expression 11 is presented as Expression 12 below.

```
[Math. 10]
parse ( MPMF )
if ( MPM==1){
    SMD=MPM
}
else{
    parse( SPMF )
    if ( SPMF == 1 ){
        SMD=SPM
    }
    else {
        parse( REM )
        if ( REM < SPM ){
            SMD=REM+1
        }
        else {
            SMD=REM+2
        }
    }
}
                                            ... Expression 12
```

The configuration as described thus far can decode the bitstream obtained by efficiently coding the mode information regarding the DC mode that is a prediction mode for an even area and the edge prediction mode that is a prediction mode for an area including an edge. As a result, in addition to the reduction in the amount of data to be coded as the prediction mode, the image quality can be improved as well because of an increase in prediction performance.

Figure 13:
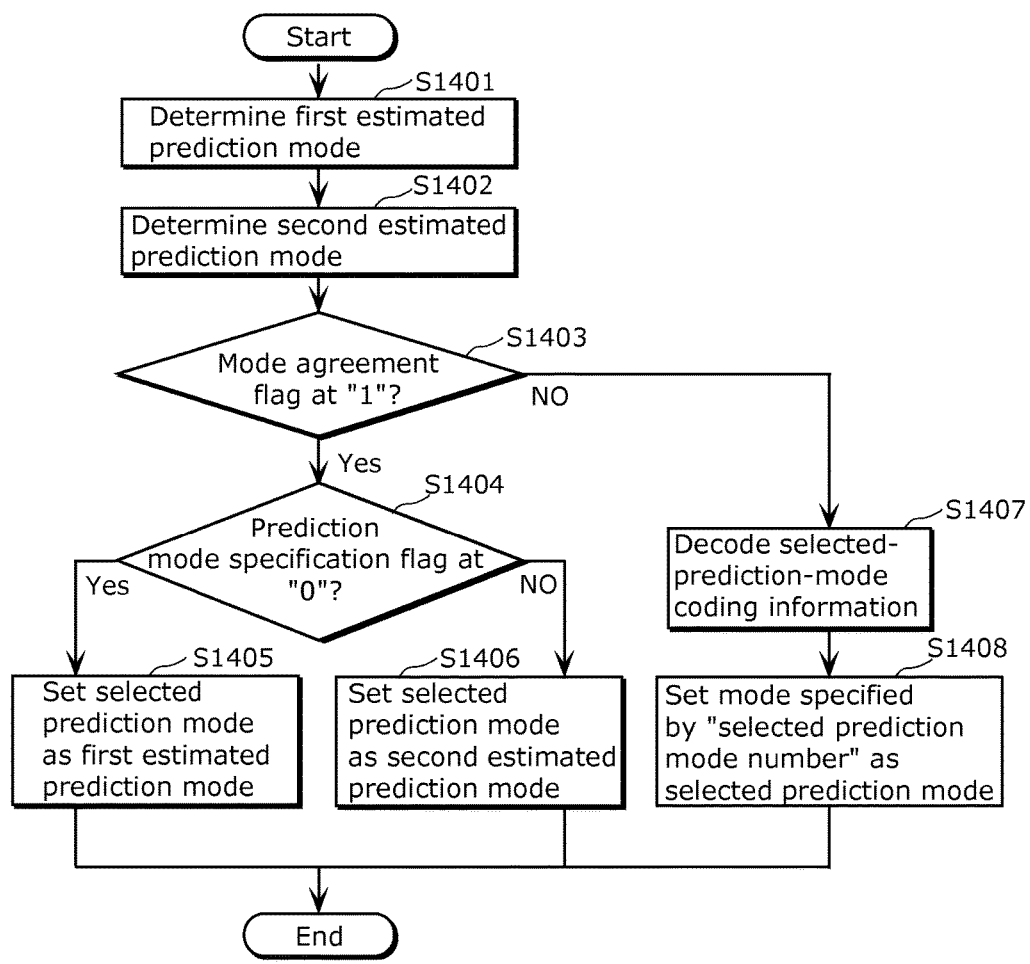
FIG. 13 is a flowchart showing another example of the operation performed by the restoration unit included in the image decoding apparatus in Embodiment 2.

Next, Modification of the examples shown in FIG. 12A and FIG. 12B is described, with reference to FIG. 13. FIG. 13 is a flowchart related to Modification of Embodiment 2. It should be noted that although the following describes an example where the restoration unit 320 shown in FIG. 11A performs a process shown in FIG. 13, the present invention is not limited to this. Moreover, the flowchart shown in FIG. 13 is used typically when the bitstream coded according to the method shown in FIG. 8 is decoded.

Firstly, the first prediction mode estimation unit 321 determines a first estimated prediction mode (S1401). The first estimated prediction mode can be determined according to the method described above. In the present example, among the prediction modes of the blocks that are adjacent to a current block to be decoded and have been previously coded, the prediction mode assigned the smallest index number is determined as the first prediction mode.

Next, the second prediction mode estimation unit 322 determines a second estimated prediction mode (S1402). The second estimated prediction mode is different from the first estimated prediction mode as described above. A method of determining the second estimated prediction mode is not particularly limited, and the following method can be used as an example.

Firstly, the second prediction mode estimation unit 322 determines whether or not the first estimated prediction mode indicates the planar mode. When the first estimated prediction mode indicates the planar mode, the second prediction mode estimation unit 322 determines the DC mode as the second estimated prediction mode. On the other hand, when the first estimated prediction mode does not indicate the planar mode, the second prediction mode estimation unit 322 determines the planar mode as the second estimated prediction mode.

Next, the signal determination unit 323 determines a value set in the mode agreement flag included in the prediction-coding-mode related signal SSMD obtained from the variable-length decoding unit 330 (Step 1403). When the mode agreement flag is set at "1" (Yes in S1403), the signal determination unit 323 determines a value set to the prediction mode specification flag included in the prediction-coding-mode related signal SSMD (S1404).

When the prediction mode specification flag is set at "0" (Yes in S1404), the signal determination unit 323 sets the selected prediction mode as the first estimated prediction mode (S1405). On the other hand, when the prediction mode specification flag is set at "1" (No in S1404), the signal determination unit 323 sets the selected prediction mode as the second estimated prediction mode (S1406).

On the other hand, when the mode agreement flag is set at "0" in Step S1403 (No in S1403), the signal determination unit 323 decodes the selected-prediction-mode coding information (S1407). Then, the signal determination unit 323 sets the prediction mode specified by the selected prediction mode number obtained by the decoding, as the selected prediction mode SMD (Step S1408).

On comparison, the flowchart shown in FIG. 13 is different from the flowcharts shown in FIG. 12A and FIG. 12B in the meanings indicated by the flags and in the sequence of processes such as the comparing processes. However, the flowchart in FIG. 13 and the flowcharts in FIG. 12A and FIG. 12B have in common that the selected prediction mode is restored using the two estimated prediction modes.

To be more specific, in each of the processes shown in FIG. 12A, FIG. 12B, and FIG. 13, when the flag information indicates that the selected prediction mode agrees with the first estimated prediction mode, the first estimated prediction mode is determined to be the selected prediction mode. Moreover, when the flag information indicates that the selected prediction mode agrees with the second estimated prediction mode, the second estimated prediction mode is determined to be the selected prediction mode. When the flag information indicates that the selected prediction mode disagrees with both the first and second estimated prediction modes, the selected prediction mode is restored based on the information that is further included in the mode information and specifies the selected prediction mode.

Although the image decoding apparatus and the method thereof according to the present invention have been described by way of Embodiment, the present invention is not limited to Embodiment above. It is to be noted that various changes and modifications will be apparent to those skilled in the art. Therefore, unless otherwise such changes and modifications depart from the scope of the present invention, they should be intended to be included therein.

For example, decoding may be performed on the following assumption. That is, when the index number of the selected prediction mode SMD is to be coded, coding does not need to be performed in numerical order of the index numbers, or more specifically, a smaller number may be assigned sequentially to a direction vector that is closer to the first estimated prediction mode MPM or the second estimated prediction mode SPM and then coding may be accordingly performed. This means that the bitstream in which a smaller number is coded is to be decoded and, therefore, the amount of coded data can be reduced.

Moreover, the present invention is not limited to the H.264 video coding standard, and is not limited to the above-mentioned conventional predicted values of the intra prediction mode and the location information (motion vector), such as the intra prediction mode using the edge direction (edge prediction mode) as described in Non Patent Literature 2. In fact, the prediction-mode estimation method according to the present invention may be used by any block-by-block-basis video coding apparatus.

Furthermore, the edge detection unit used in the prediction-mode estimation method according to the present invention may be shared with some functions of a video coding system. For example, by applying the present invention to the video coding system having the edge prediction mode, the edge detection unit can be shared. Thus, resources can be used effectively.

Moreover, the present invention is not limited to a video coding application, and may be used for still image coding performed on a block-by-block basis.

Furthermore, as described above, the present invention can be implemented not only as the image decoding apparatus and methods thereof, but also as a computer program causing a computer to execute each of the image decoding methods in Embodiment 2. Also, the present invention can be implemented as a recording medium, such as a computer readable CD-ROM, that has the computer program recorded thereon. Moreover, the present invention can be implemented as information, data, or a signal indicating the computer program. The computer program, the information, the data, and the signal may be distributed via a communication network such as the Internet.

Although the image decoding apparatus and the method thereof according to the present invention have been described by way of Embodiment, the present invention is not limited to Embodiment above. It is to be noted that various changes and modifications will be apparent to those skilled in the art. Therefore, unless otherwise such changes and modifications depart from the scope of the present invention, they should be intended to be included therein.

For example, Embodiment 2 describes the case, as an example, where the DC prediction and the edge prediction are assigned the same prediction index number. However, the present invention is not limited to this. Suppose that the same prediction index number is assigned to: the edge prediction mode; and a prediction mode that generates a predicted pixel according to a method that is not based on the direction prediction, such as a method of generating predicted pixels one by one. Even in this case, the prediction mode can be efficiently coded and decoded by performing the same process as described above.

Embodiment 3

Embodiment 3 describes the case where: the setting unit 140 of the image coding apparatus 100 described above includes an edge vector determination unit 1401 having an edge detector; and the restoration unit 320 of the image decoding apparatus 300 described above includes an edge vector determination unit 1501 having an edge detector.

Figure 14:
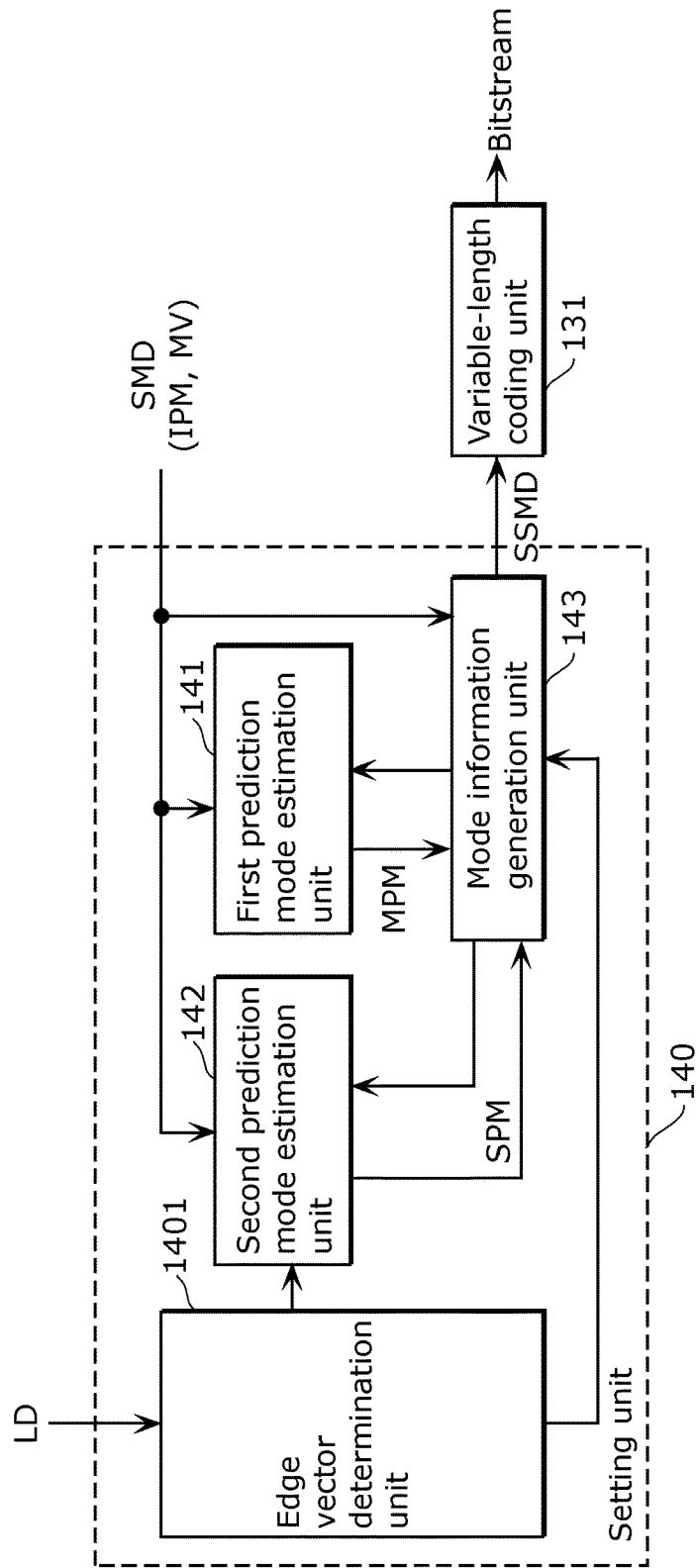
FIG. 14 is a block diagram showing an example of a detailed configuration of a setting unit included in an image coding apparatus in Embodiment 3.

FIG. 14 is a diagram showing an example of a configuration where the setting unit 140 included in the image coding apparatus 100 described in Embodiment 1 includes the edge vector determination unit 1401. As shown in this diagram, the setting unit 140 includes the first prediction mode estimation unit 141, the second prediction mode estimation unit 142, the mode information generation unit 143, and the edge vector determination unit 1401. It should be noted that the components identical to those shown in FIG. 4, FIG. 6A, and FIG. 6B are assigned the same reference signs as used in FIG. 4, FIG. 6A, and FIG. 6B.

The setting unit 140 obtains the selected prediction mode SMD and the image signal LD that has been previously coded and decoded. Then, the setting unit 140 outputs, to the variable-length coding unit 131, the prediction-coding-mode related signal SSMD as the coded signal of the selected prediction mode of the current block.

Figure 18:
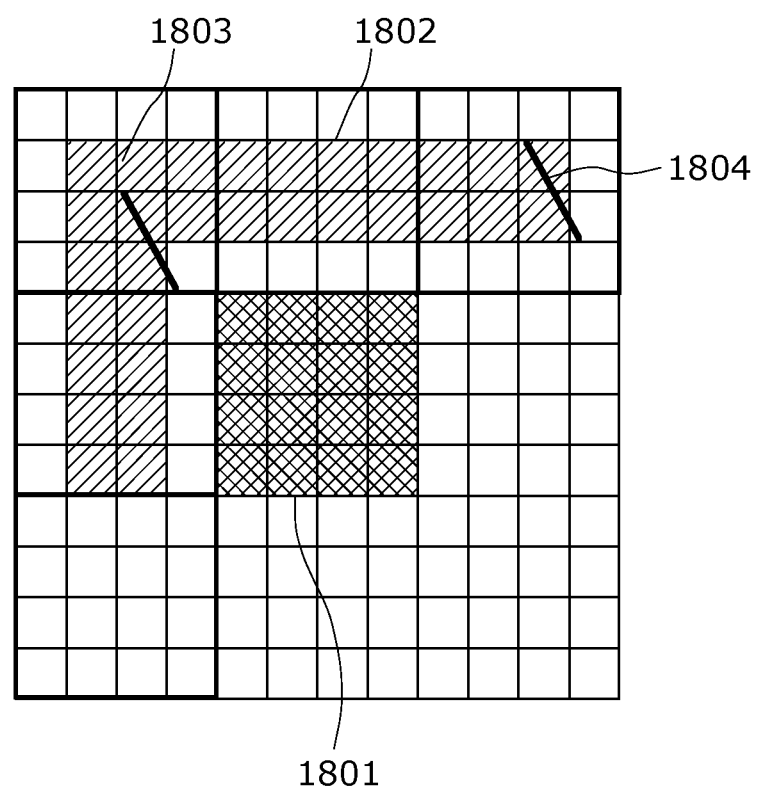
FIG. 18 is a schematic diagram showing an example on which edge detection is to be performed in Embodiment 3.

The edge vector determination unit 1401 obtains the aforementioned previously-coded-decoded image signal LD located near the current block and performs an edge detection process to determine whether or not an edge is present near the current block. This operation is described in detail with reference to FIG. 18. FIG. 18 is a schematic diagram showing an example on which edge detection is to be performed. The diagram shows an example where edge detection is performed on a 4-by-4-pixel block 1801 that is a current block to be coded. This unit of processing is an example, and the present invention is not limited to this as long as the unit of processing is a unit of prediction blocks. The edge detection process is performed on a diagonally shaded area 1802 out of an area that is located near the current block 1801 and has been previously coded and decoded (namely, areas adjacent to the current block and located to the left, upper left, and upper right of, and above the current block). Here, one square represents one pixel. When one pixel included in the diagonally shaded area is to be processed, the process is performed on nine pixels including neighboring eight pixels. The edge detection process is performed using the Sobel operator shown in Expression 13. Using the Sobel operator, edge strengths in the horizontal and vertical directions can be obtained. A vector indicating the strength and the direction is referred to as the edge vector.

[Math. 11]

$$Sobel_x = \begin{bmatrix} -1 & 0 & 1 \\ -2 & 0 & 2 \\ -1 & 0 & 1 \end{bmatrix},$$

$$Sobel_y = \begin{bmatrix} -1 & -2 & -1 \\ 0 & 0 & 0 \\ 1 & 2 & 1 \end{bmatrix}$$

Expression 13

For example, vectors 1803 and 1804 each having a certain strength or higher are detected, and then the vector having the higher strength is detected as the edge vector.

Here, the edge vector determination unit 1401 determines whether to perform DC prediction or edge prediction in DC/edge prediction, according to the aforementioned detected edge vector, and outputs the result to the mode information generation unit 143. As a condition used for making the determination here, the size of the vector having the highest strength may be used. For example, when the size has a certain level or higher, edge prediction may be employed.

Figure 16:
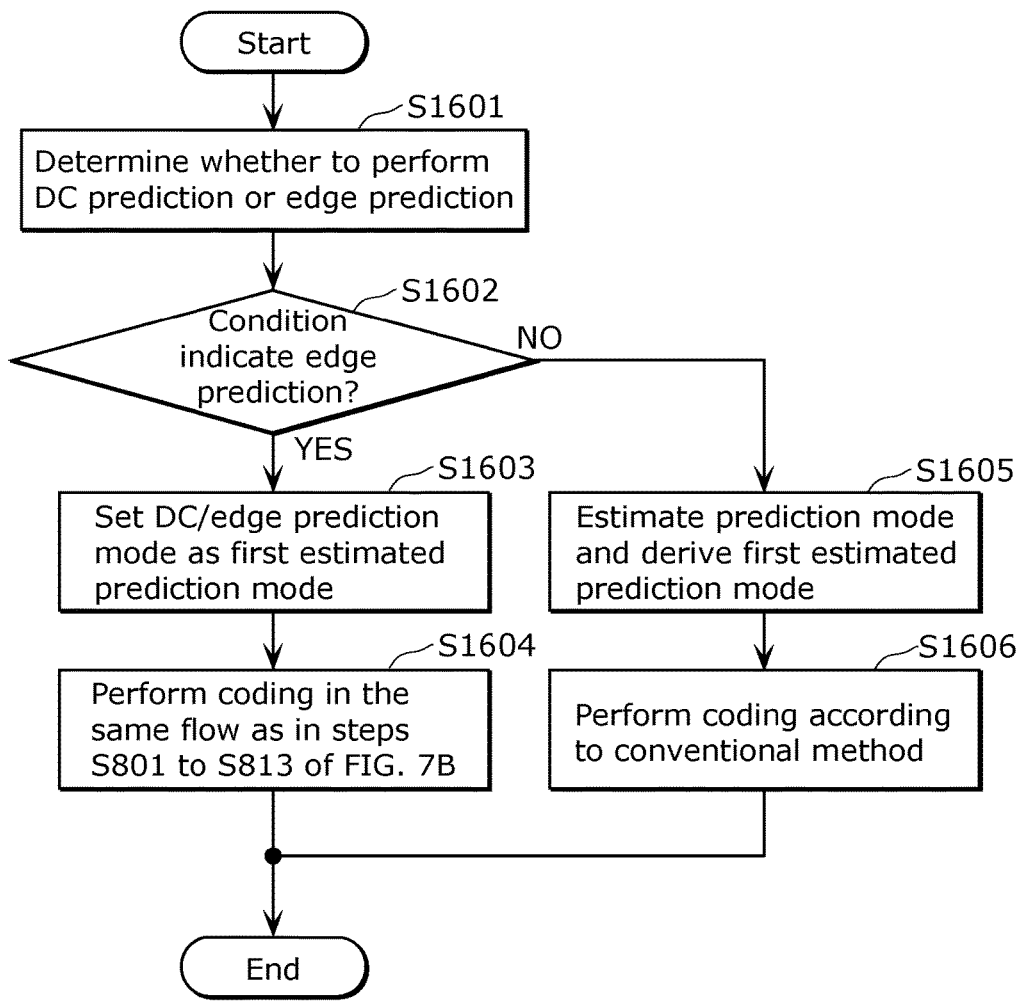
FIG. 16 is a flowchart showing an example of an operation performed by the setting unit included in the image coding apparatus in Embodiment 3.

An operation performed by the setting unit 140 included in the present configuration is described in more detail with reference to FIG. 16. FIG. 16 is a diagram showing an example of the operation performed by the setting unit 140.

The mode information generation unit 143 obtains, from the edge vector determination unit 1401, the information regarding the determination as to whether DC prediction or edge prediction is performed (Step S1601). When the condition indicates that edge prediction is employed (YES in Step S1602), the DC/edge prediction mode is set as the first estimated prediction mode MPM (Step S1603). Hereafter, the coding information is determined according to the same flow as in FIG. 7B (Steps S801 to S813), and the determined prediction-coding-mode related signal SSMD is outputted to the variable-length coding unit 131 (Step S1604).

On the other hand, when the condition indicates that edge prediction is not employed (NO in Step S1602), the first estimated prediction mode MPM derived by the first prediction mode estimation unit 141 is obtained (Step S1605). Hereafter, the coding information is determined according to the method described in Non Patent Literature 1 for example, and the determined prediction-coding-mode related signal SSMD is outputted to the variable-length coding unit 131 (Step S1606).

It should be noted that the above operation is only an example and that the present invention is not limited to this. For example, although coding is performed according to the conventional method in Step S1606, coding may be performed using the second estimated prediction mode SPM. In this case, as the second estimated prediction mode SPM, a mode that is different from the first estimated prediction mode MPM and occurs with a high frequency for the previously-coded blocks may be derived. With this, the coding efficiency can be further improved.

In the present example, the same operation as in FIG. 7B is performed in Step S1604. The second estimated prediction mode SPM in this case may be derived from the direction of the edge detected in the edge detection process. Here, the edge vector determination unit 1401 outputs the information regarding the direction of the detected edge vector to the second prediction mode estimation unit 142.

The second estimated prediction mode SPM may be determined from the direction of the edge vector as follows, for example. Suppose that the number of prediction mode candidates is nine including the eight direction prediction modes, the DC prediction mode, and the edge prediction mode. In this case, the direction prediction mode closer to the direction of the detected edge, out of the nine prediction mode candidates, may be set as the second estimated prediction mode SPM.

With this, as compared to the case where the determination is made according to a distribution of the prediction modes selected for the neighboring blocks, the prediction mode corresponding more to the characteristics of the image can be derived. This allows the amount of coded data to be further reduced.

Figure 15:
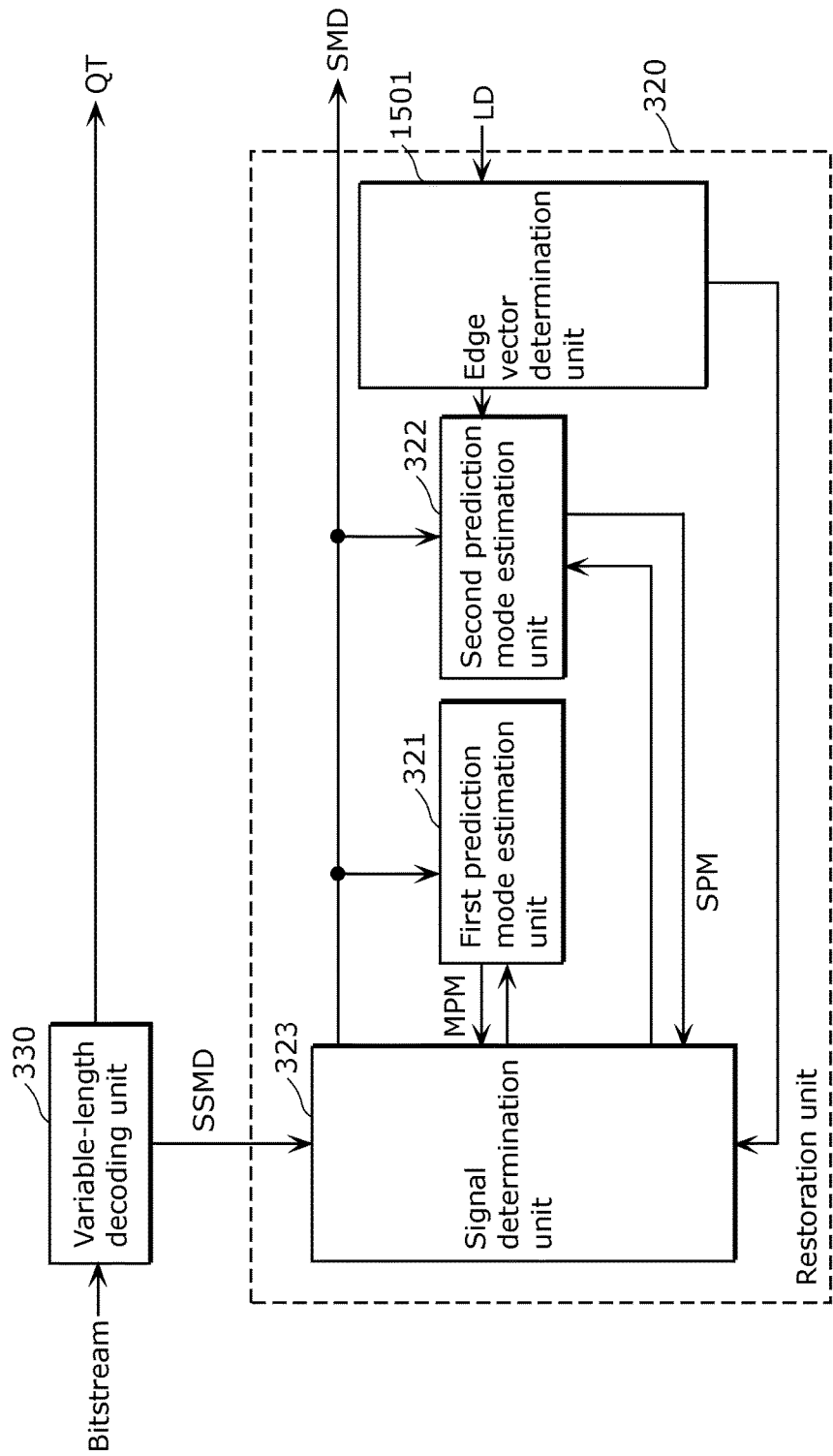
FIG. 15 is a block diagram showing an example of a detailed configuration of a restoration unit included in an image decoding apparatus in Embodiment 3.

FIG. 15 is a diagram showing an example of a configuration where the restoration unit 320 included in the image decoding apparatus 300 described in Embodiment 2 includes the edge vector determination unit 1501. As shown in this diagram, the restoration unit 320 includes the first prediction mode estimation unit 321, the second prediction mode estimation unit 322, the signal determination unit 323, and the edge vector determination unit 1501. It should be noted that the components identical to those shown in FIG. 9, FIG. 11A, and FIG. 11B are assigned the same reference signs as used in FIG. 9, FIG. 11A, and FIG. 11B.

The restoration unit 320 obtains the prediction-coding-mode related signal SSMD that has been variable-length coded and the image signal LD that has been previously coded and decoded. Then, the restoration unit 320 outputs the selected prediction mode SMD as the coded signal of the selected prediction mode of the current block.

The edge vector determination unit 1501 obtains the aforementioned previously-coded-decoded image signal LD located near the current block and performs an edge detection process to determine whether or not an edge is present near the current block. This operation is the same as the operation performed when coding is performed.

Figure 17:
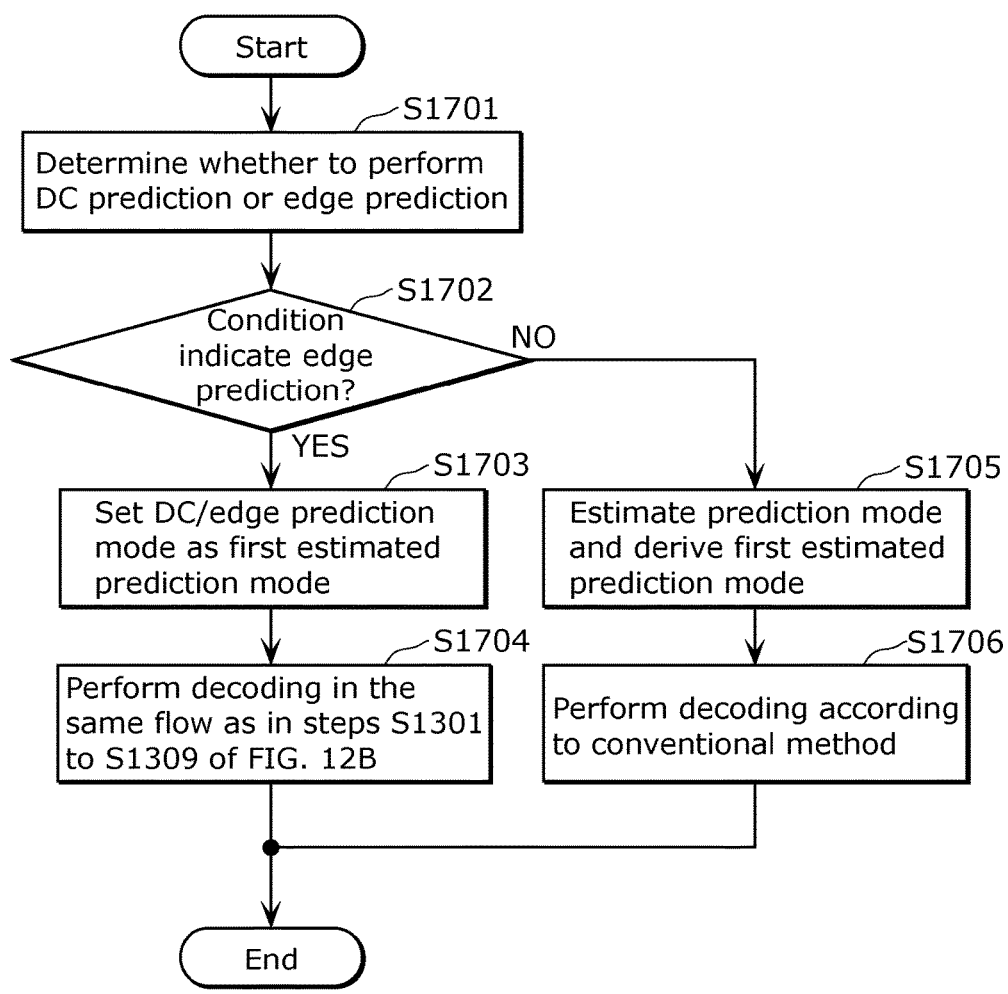
FIG. 17 is a flowchart showing an example of an operation performed by the restoration unit included in the image decoding apparatus in Embodiment 3.

An operation performed by the restoration unit 320 included in the present configuration is described in more detail with reference to FIG. 17. FIG. 17 is a diagram showing an example of the operation performed by the restoration unit 320.

The signal determination unit 323 obtains, from the edge vector determination unit 1501, the information regarding the determination as to whether DC prediction or edge prediction is performed (Step S1701). When the condition indicates that edge prediction is employed (YES in Step S1702), the DC/edge prediction mode is set at the first estimated prediction mode MPM (Step S1703). Hereafter, the decoding process is performed according to the same flow as in FIG. 12B (Steps S1301 to S1309), and the selected prediction mode SMD is outputted (Step S1704).

On the other hand, when the condition indicates that edge prediction is not employed (NO in Step S1702), the first estimated prediction mode MPM derived by the first prediction mode estimation unit 321 is obtained (Step S1705). Hereafter, the selected prediction mode SMD is outputted according to the method described in Non Patent Literature 1 for example (Step S1706).

It should be noted that the above operation is only an example and that the present invention is not limited to this. As in the case of the coding method, a change can be made. For example, coding is performed according to the conventional method in Step S1706. Here, when coding is performed using the second estimated prediction mode SPM, the decoding apparatus side can also perform the operation in the corresponding same manner. In this case, as the second estimated prediction mode SPM, a mode that is different from the first estimated prediction mode MPM and occurs with a high frequency for the previously-coded blocks may be derived. With this, the coding efficiency can be further improved.

In the present example, the same operation as in FIG. 12B is performed in Step S1704. The second estimated prediction mode SPM in this case may be derived from the direction of the edge detected in the edge detection process. Here, the edge vector determination unit 1501 outputs the information regarding the direction of the detected edge vector to the second prediction mode estimation unit 322.

The second estimated prediction mode SPM may be determined from the direction of the edge vector as follows, for example. Suppose that the number of prediction mode candidates is nine including the eight direction prediction modes, the DC prediction mode, and the edge prediction mode. In this case, the direction prediction mode closer to the direction of the detected edge, out of the nine prediction mode candidates, may be set as the second estimated prediction mode SPM.

With this, as compared to the case where the determination is made according to a distribution of the prediction modes selected for the neighboring blocks, the prediction mode corresponding more to the characteristics of the image can be derived. With this, the bitstream in which the amount of coded data is further reduced can be decoded.

For example, when the index number of the selected prediction mode SMD is to be coded, coding does not need to be performed in numerical order of the index numbers. More specifically, a smaller number may be assigned sequentially to a direction vector closer to the detected edge vector, and then may be coded and decoded. This means that a smaller number is coded and decoded. Hence, the amount of coded data can be reduced.

In Embodiment 3, the edge is detected by calculating the gradient using the Sobel operator, for example. However, the present invention is not limited to this. Any edge detection tool may be used as long as the directional property of the detected edge is calculated. The Sobel operator is only an example of available edge detection technologies. For example, the Prewitt operator indicated by Expression 14 may be used.

[Math. 12]

$$Prewitt_x = \begin{bmatrix} -1 & 0 & 1 \\ -1 & 0 & 1 \\ -1 & 0 & 1 \end{bmatrix},$$

$$Prewitt_y = \begin{bmatrix} -1 & -1 & -1 \\ 0 & 0 & 0 \\ 1 & 1 & 1 \end{bmatrix}$$

Expression 14

In order to perform the edge detection process, the image coding apparatus 100 and the image decoding apparatus 300 described in Embodiments above need to store, into the reference picture memory 160 and the frame memory 314, the data of all the pixels included in the block including the reference pixels 20. Here, the moment when the neighboring blocks are decoded, or more specifically, the moment when the values of the reference pixels required to calculate the gradient are obtained, the process of calculating the gradient may be performed. Then, only the result of the gradient calculation process may be stored into the reference picture memory 160 and the frame memory 314, or into a different memory.

Here, by storing only a norm exceeding a threshold (or the gradient value) for example, memory resources can be more saved. Alternatively, only the largest norm in each block or the corresponding pixel location may be stored. In this case, the calculated norm (or the gradient value) is stored into the reference picture memory 160 and the frame memory 314, for example.

With this, the memory resources included in the image coding apparatus 100 and the image decoding apparatus 300 can be effectively used.

Moreover, the present invention is not limited to the H.264 video coding standard, and is not limited to the above-mentioned conventional predicted values of the intra prediction mode and the location information (motion vector), such as the intra prediction mode using the edge direction (edge prediction mode) as described in Non Patent Literature 2. In fact, the prediction-mode estimation method according to the present invention may be used by any block-by-block-basis video coding apparatus.

Furthermore, the edge detection unit used in the prediction-mode estimation method according to the present invention may be shared with some functions of a video coding system. For example, by applying the present invention to the video coding system having the edge prediction mode, the edge detection unit can be shared. Thus, resources can be used effectively.

Moreover, the present invention is not limited to a video coding application, and may be used for still image coding performed on a block-by-block basis.

Furthermore, as described above, the present invention can be implemented not only as the image coding apparatus, the image decoding apparatus, and the methods thereof, but also as a computer program causing a computer to execute each of the image coding method and the image decoding method in Embodiments above. Also, the present invention can be implemented as a recording medium, such as a computer readable CD-ROM, that has the computer program recorded thereon. Moreover, the present invention can be implemented as information, data, or a signal indicating the computer program. The computer program, the information, the data, and the signal may be distributed via a communication network such as the Internet.

Embodiment 4

The processing described in each of embodiments can be simply implemented in an independent computer system, by recording, in a recording medium, a program for implementing the configurations of the moving picture coding method and the moving picture decoding method described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method and the moving picture decoding method described in each of embodiments and systems using thereof will be described.

Figure 19:
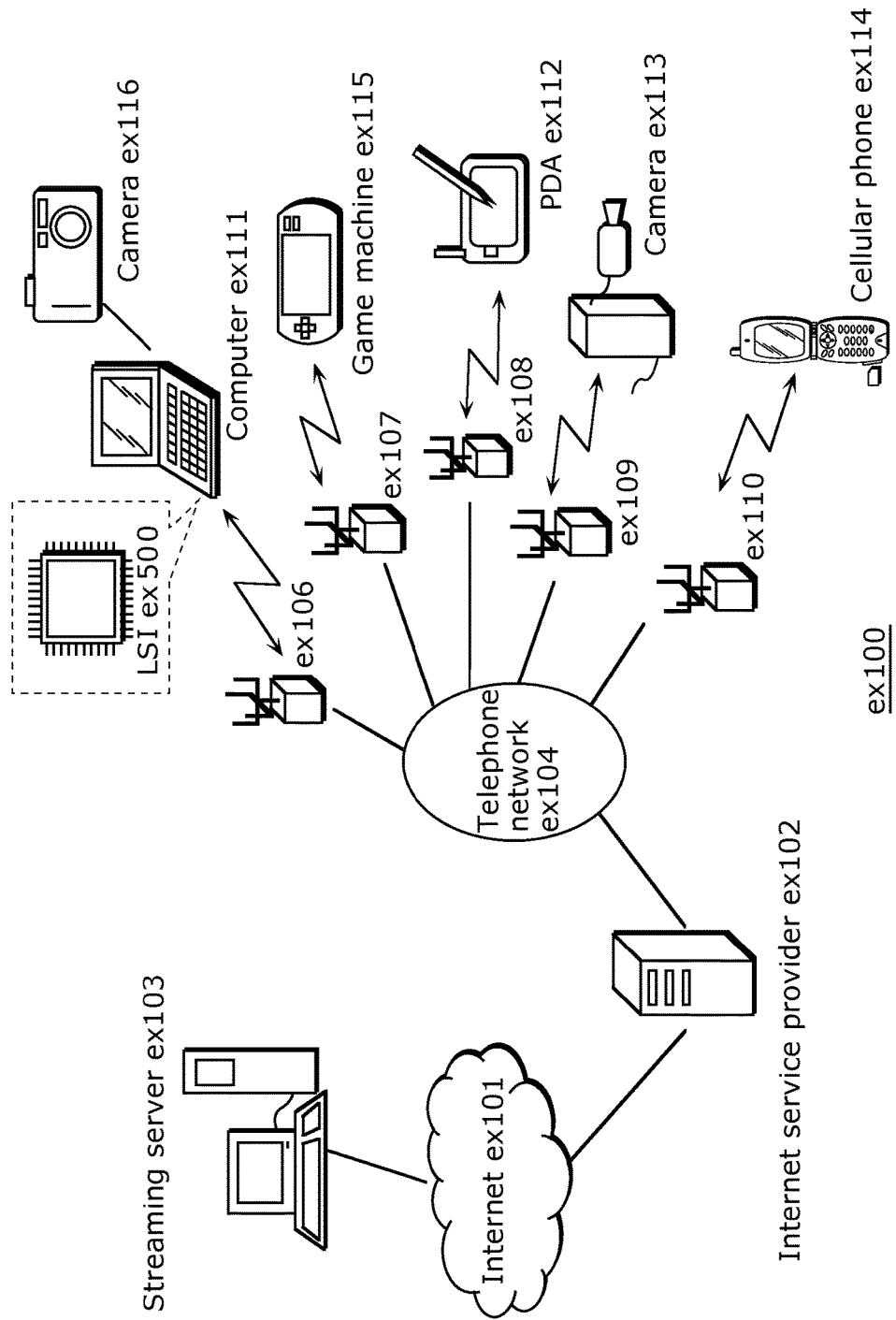
FIG. 19 shows an overall configuration of a content providing system for implementing content distribution services.

FIG. 19 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 19, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 20:
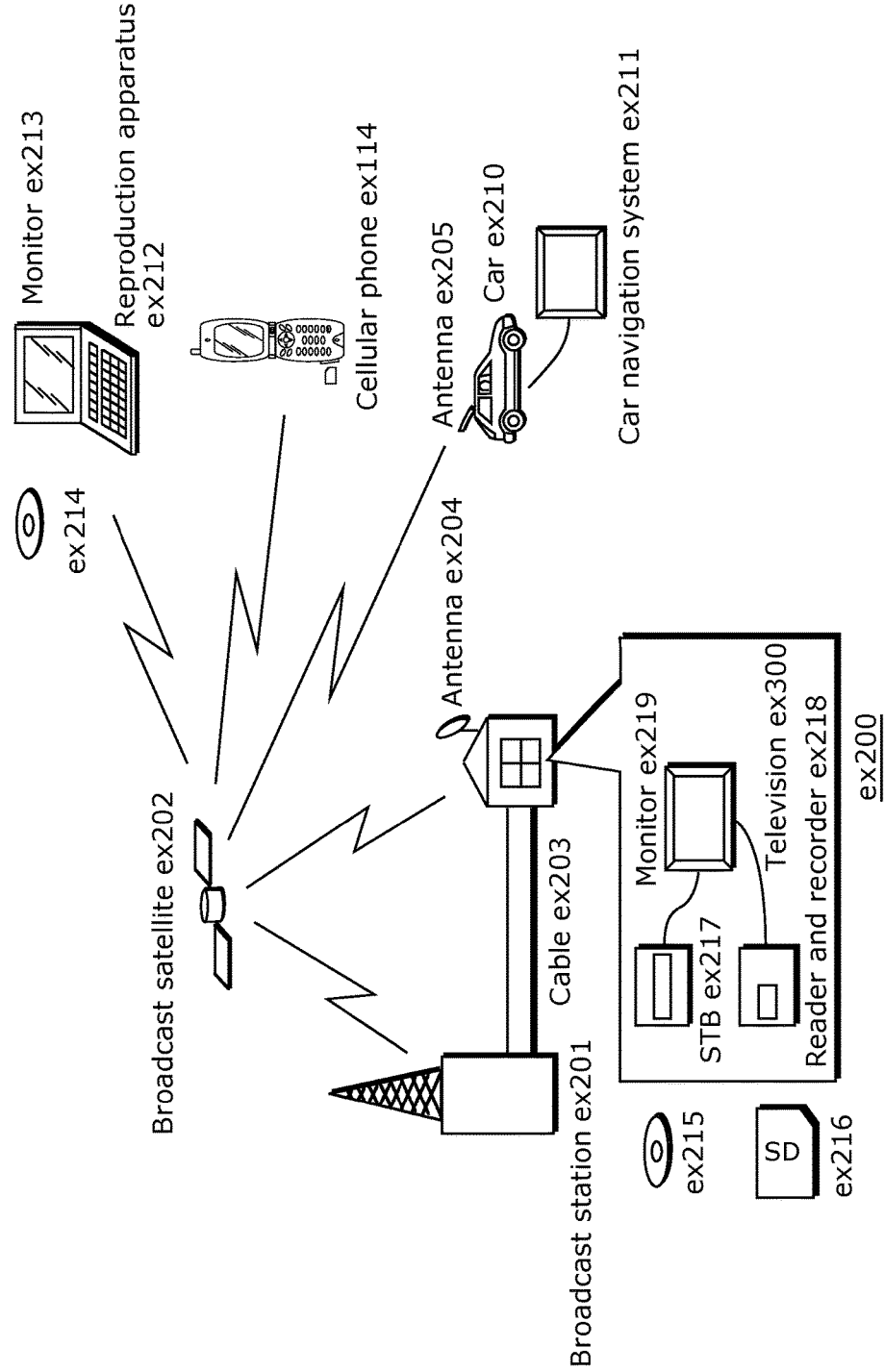
FIG. 20 shows an overall configuration of a digital broadcasting system.

Aside from the example of the content providing system ex100, at least one of the moving picture coding apparatus and the moving picture decoding apparatus described in each of embodiments may be implemented in a digital broadcasting system ex200 illustrated in FIG. 20. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments. Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data.

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 21:
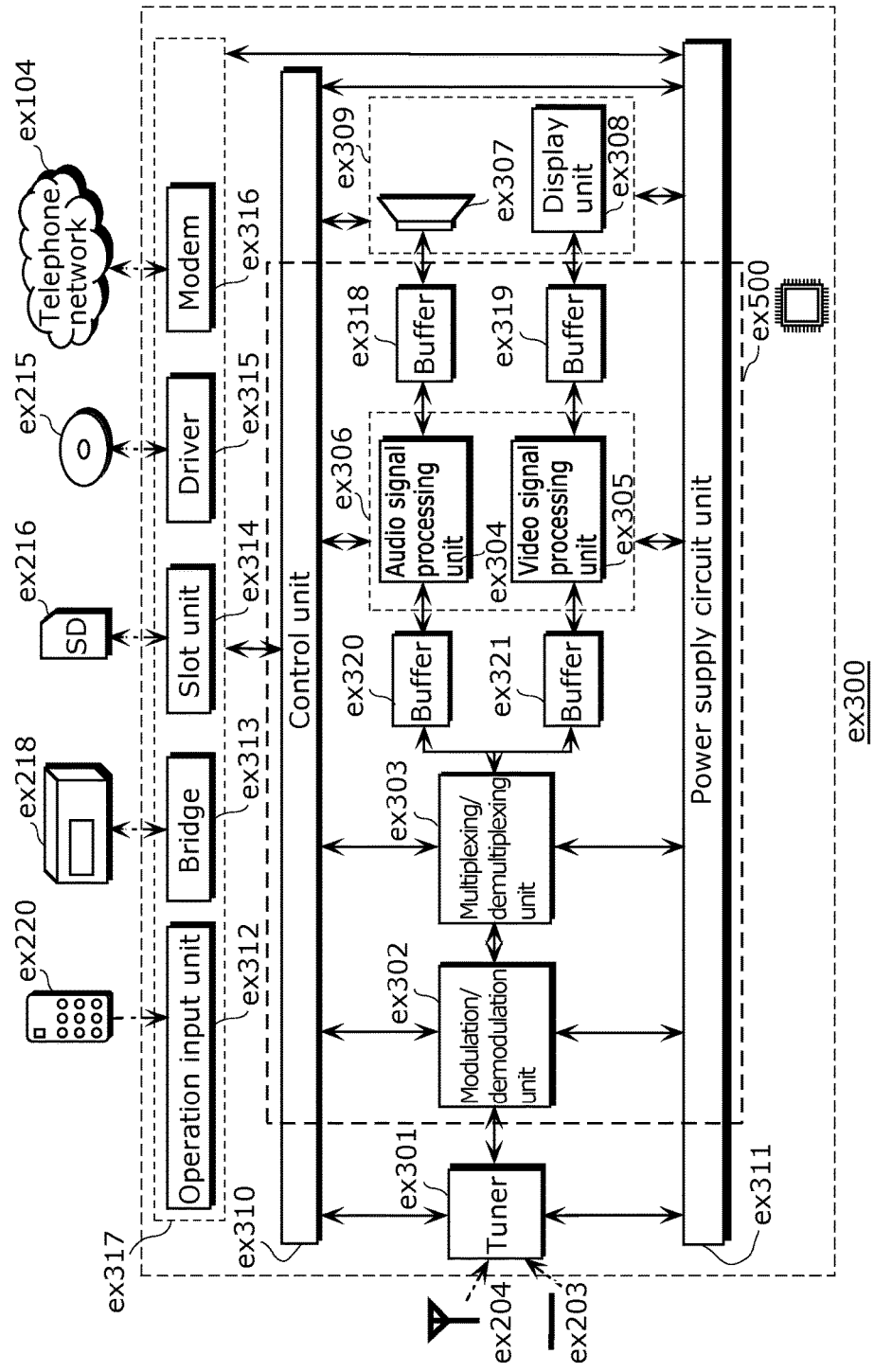
FIG. 21 shows a block diagram illustrating an example of a configuration of a television.

FIG. 21 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 22:
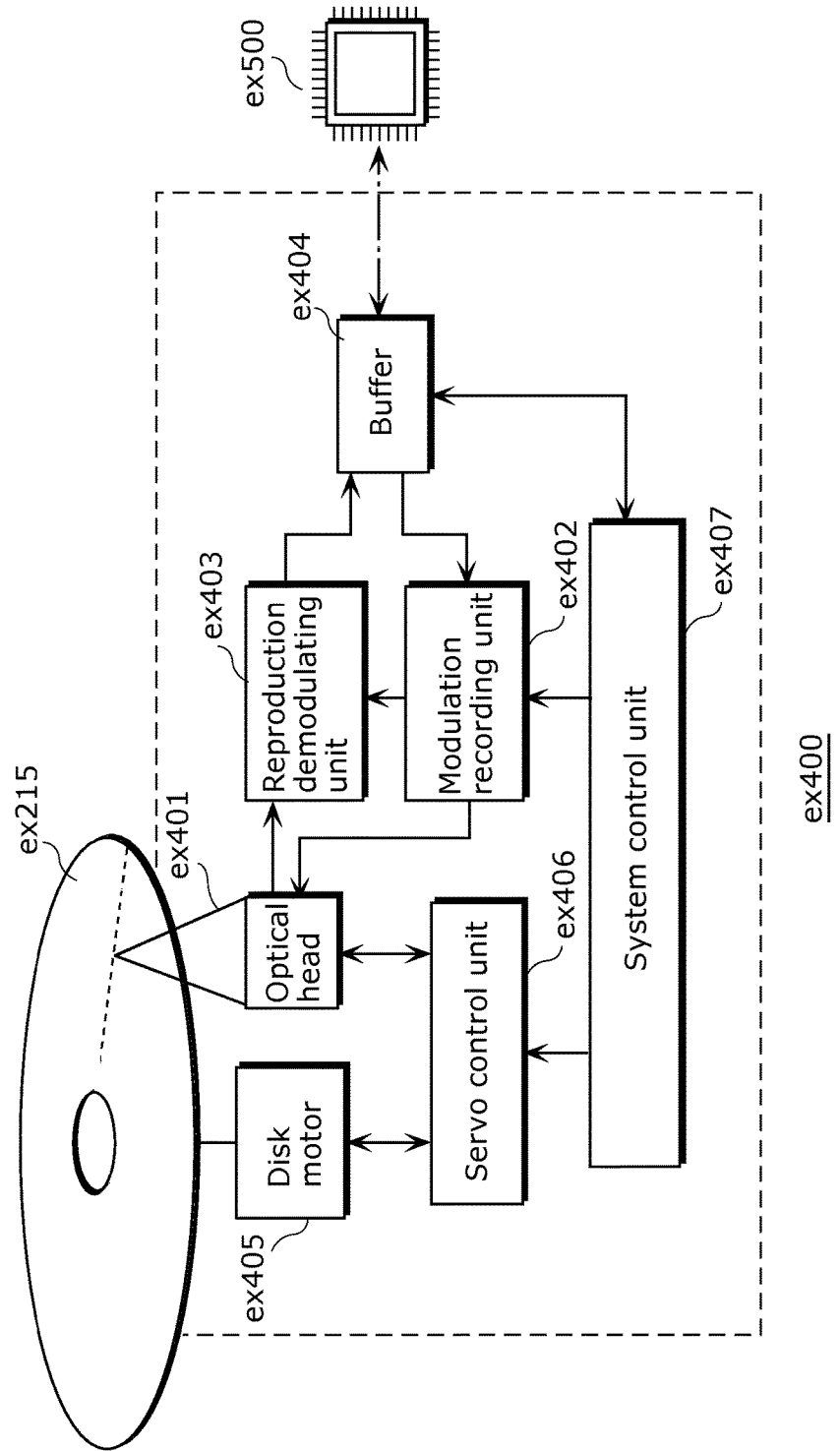
FIG. 22 shows a block diagram illustrating an example of a configuration of an information reproducing/recording unit that reads and writes information from and on a recording medium that is an optical disk.

As an example, FIG. 22 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 23:
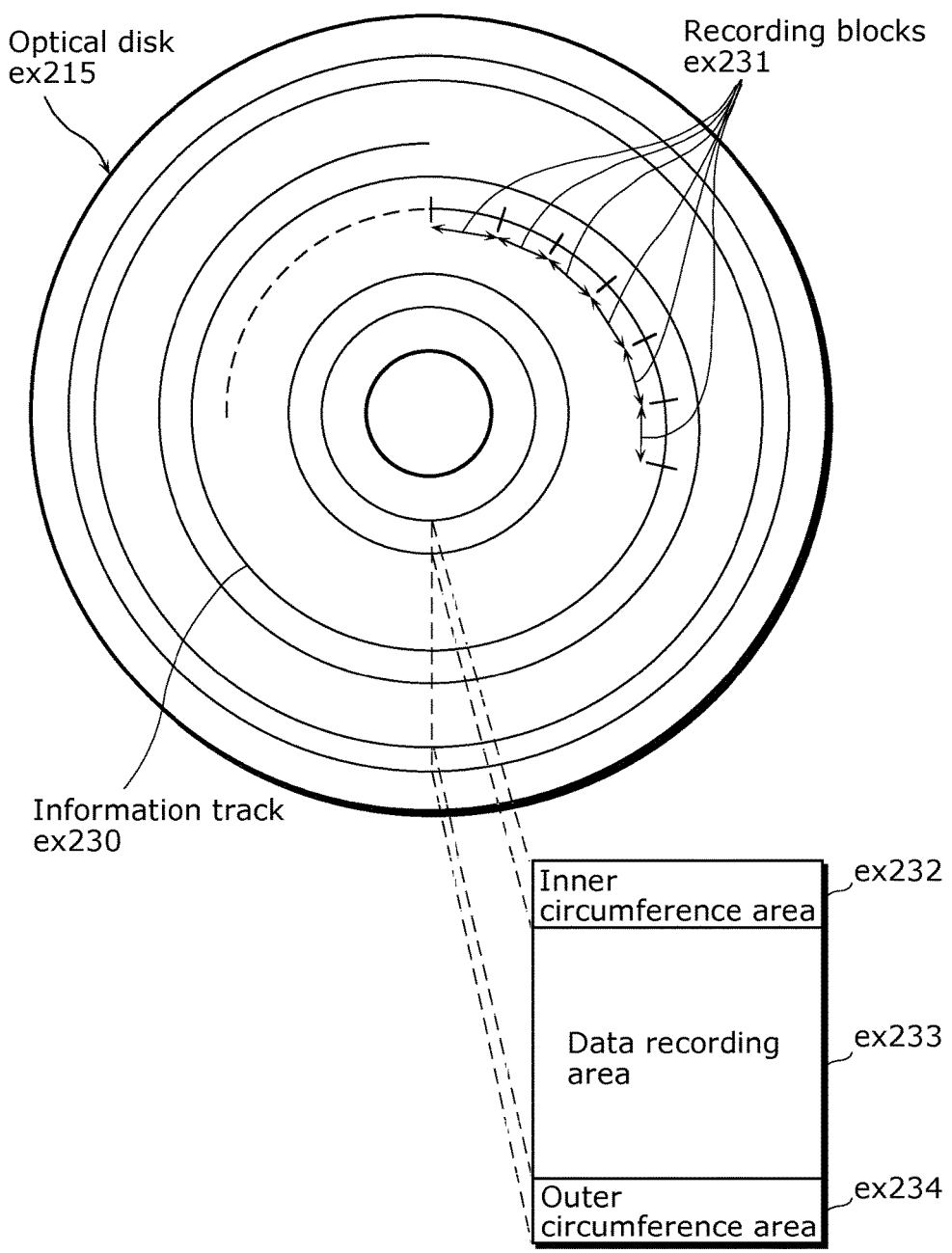
FIG. 23 shows an example of a configuration of a recording medium that is an optical disk.

FIG. 23 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 21. The same will be true for the configuration of the computer ex111, the cellular phone ex114, and others. Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, the present invention is not limited to embodiments, and various modifications and revisions are possible without departing from the scope of the present invention.

Embodiment 5

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 24:
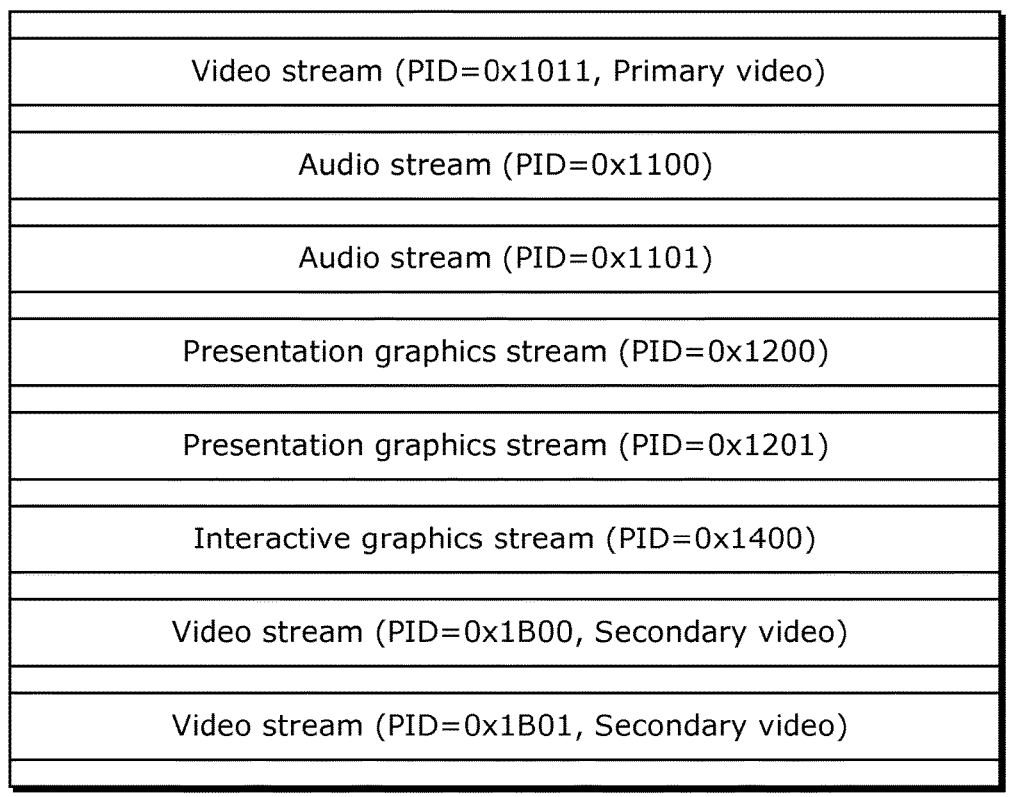
FIG. 24 illustrates a structure of multiplexed data.

FIG. 24 illustrates a structure of the multiplexed data. As illustrated in FIG. 24, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 25:
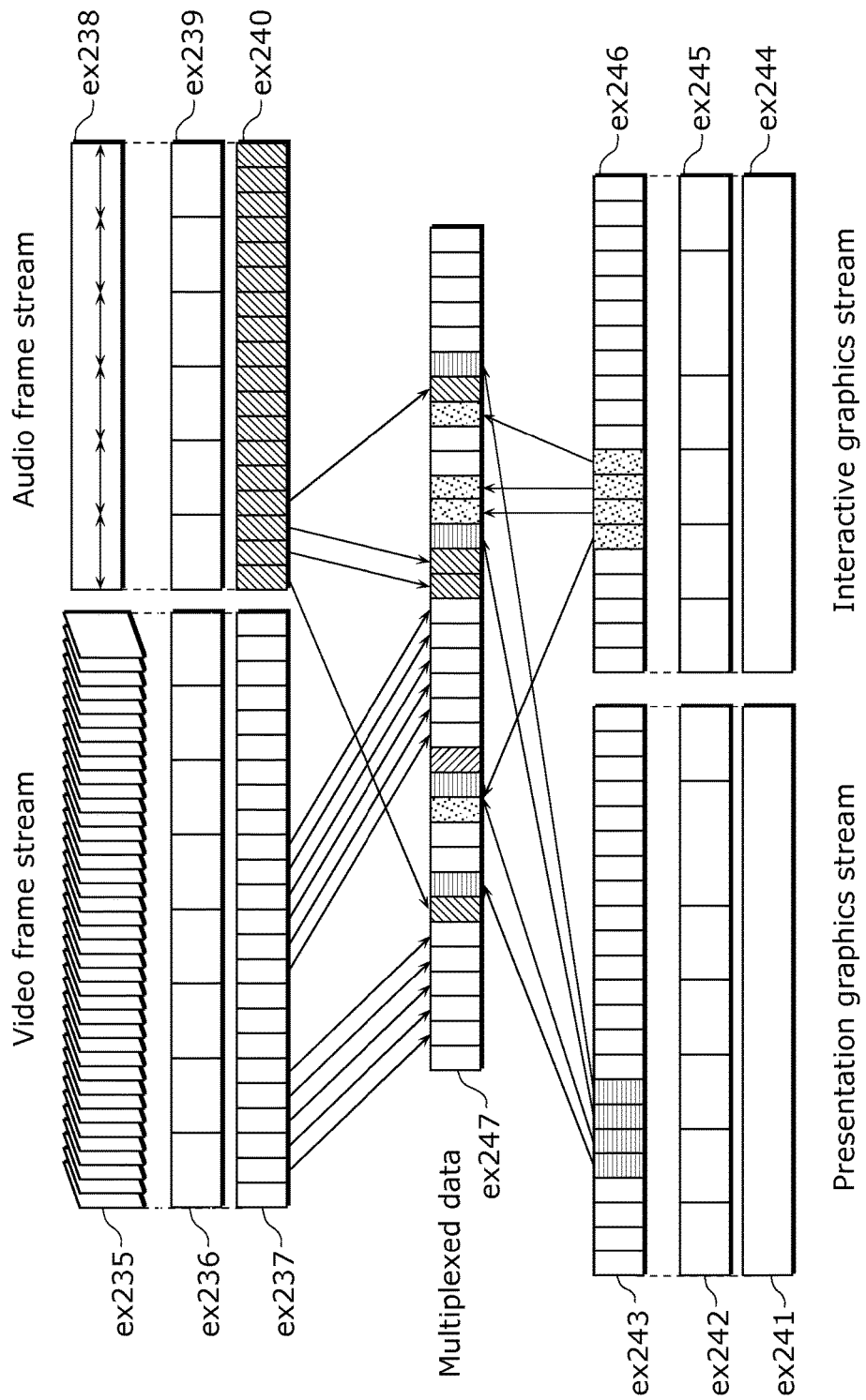
FIG. 25 schematically shows how each stream is multiplexed in multiplexed data.

FIG. 25 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 26:
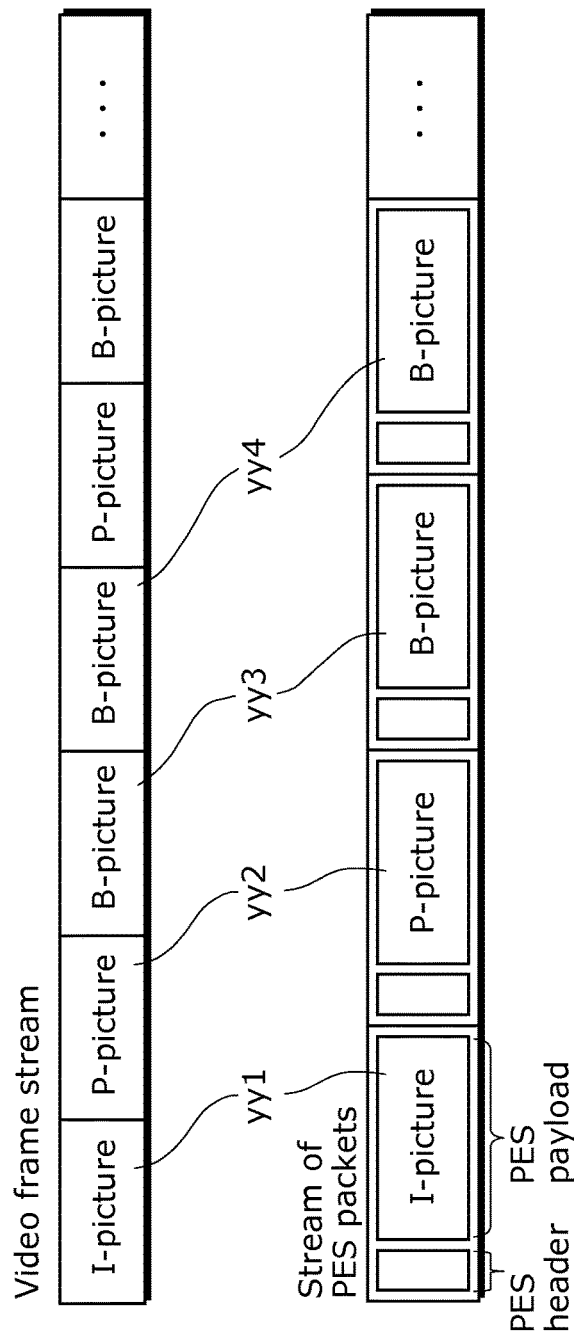
FIG. 26 shows how a video stream is stored in a stream of PES packets in more detail.

FIG. 26 illustrates how a video stream is stored in a stream of PES packets in more detail. The first bar in FIG. 26 shows a video frame stream in a video stream. The second bar shows the stream of PES packets. As indicated by arrows denoted as yy1, yy2, yy3, and yy4 in FIG. 26, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

Figure 27:
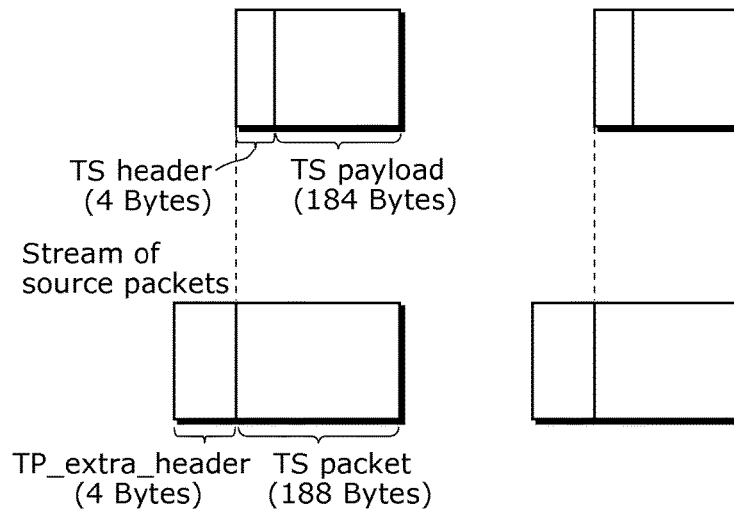
FIG. 27 shows a structure of TS packets and source packets in the multiplexed data.

FIG. 27 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 27. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 28:
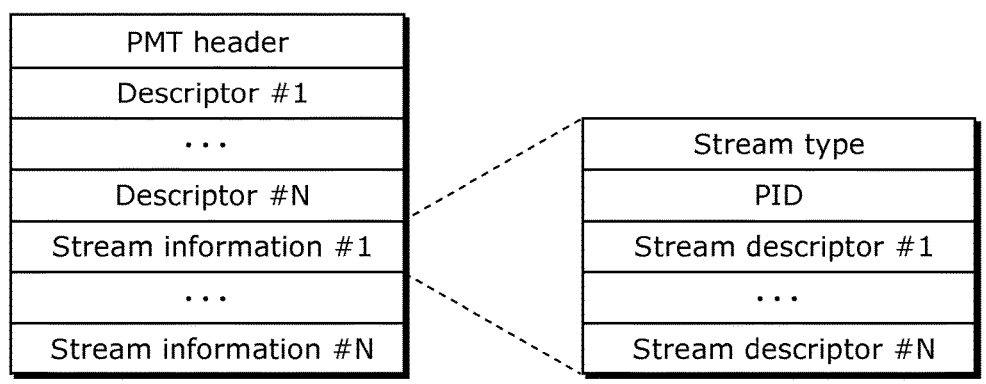
FIG. 28 shows a data structure of a PMT.

FIG. 28 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 29:
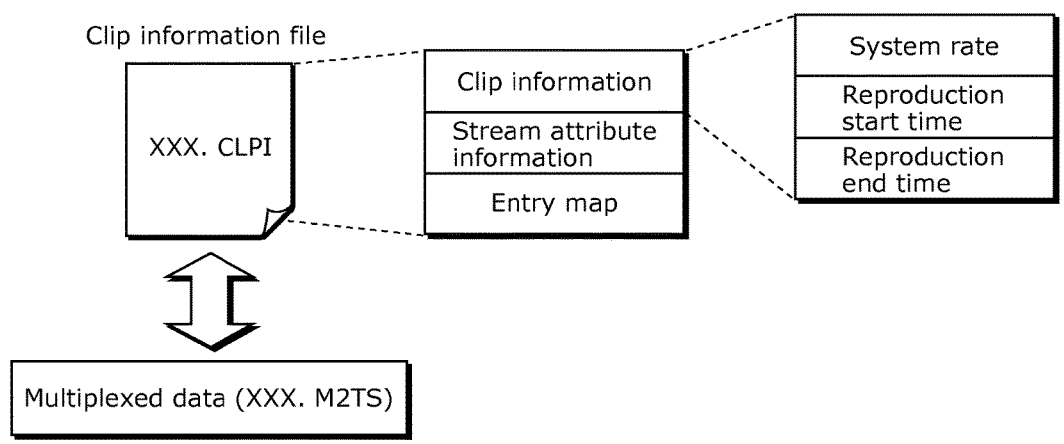
FIG. 29 shows an internal structure of multiplexed data information.

Each of the multiplexed data information files is management information of the multiplexed data as shown in FIG. 29. The multiplexed data information files are in one to one correspondence with the multiplexed data, and each of the files includes multiplexed data information, stream attribute information, and an entry map.

As illustrated in FIG. 29, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 30:
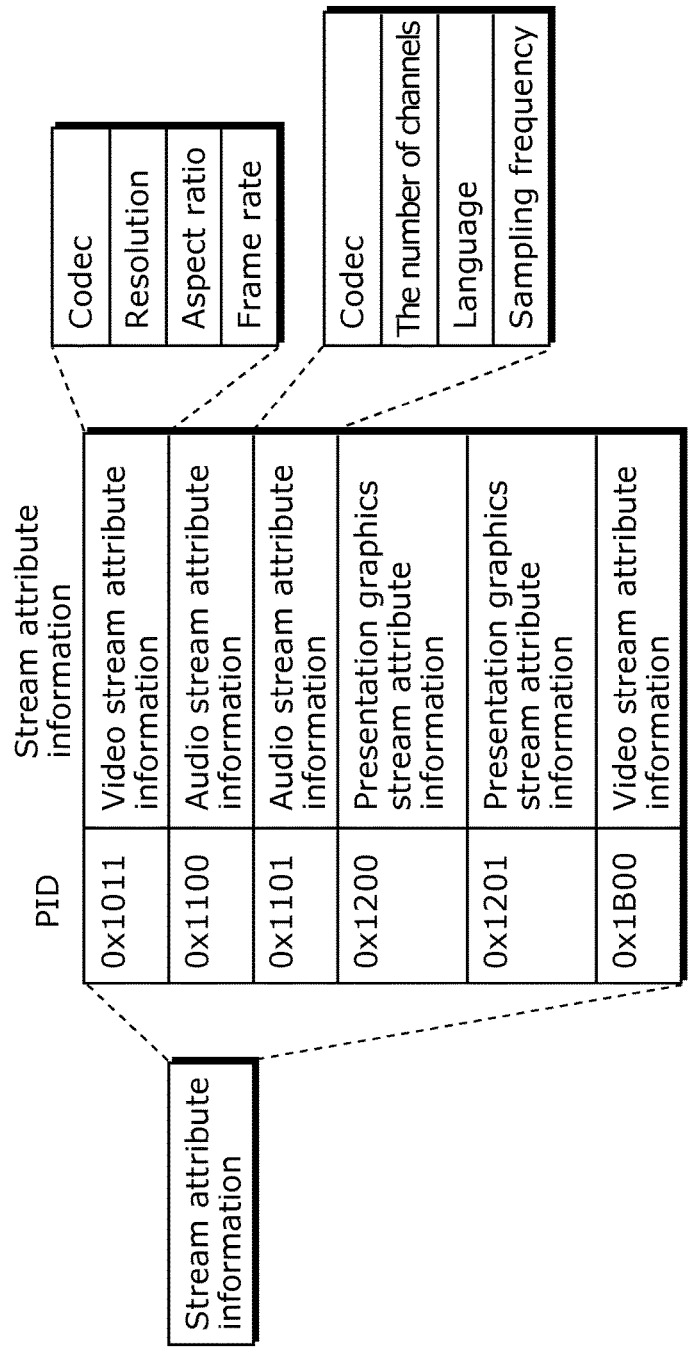
FIG. 30 shows an internal structure of stream attribute information.

As shown in FIG. 30, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 31:
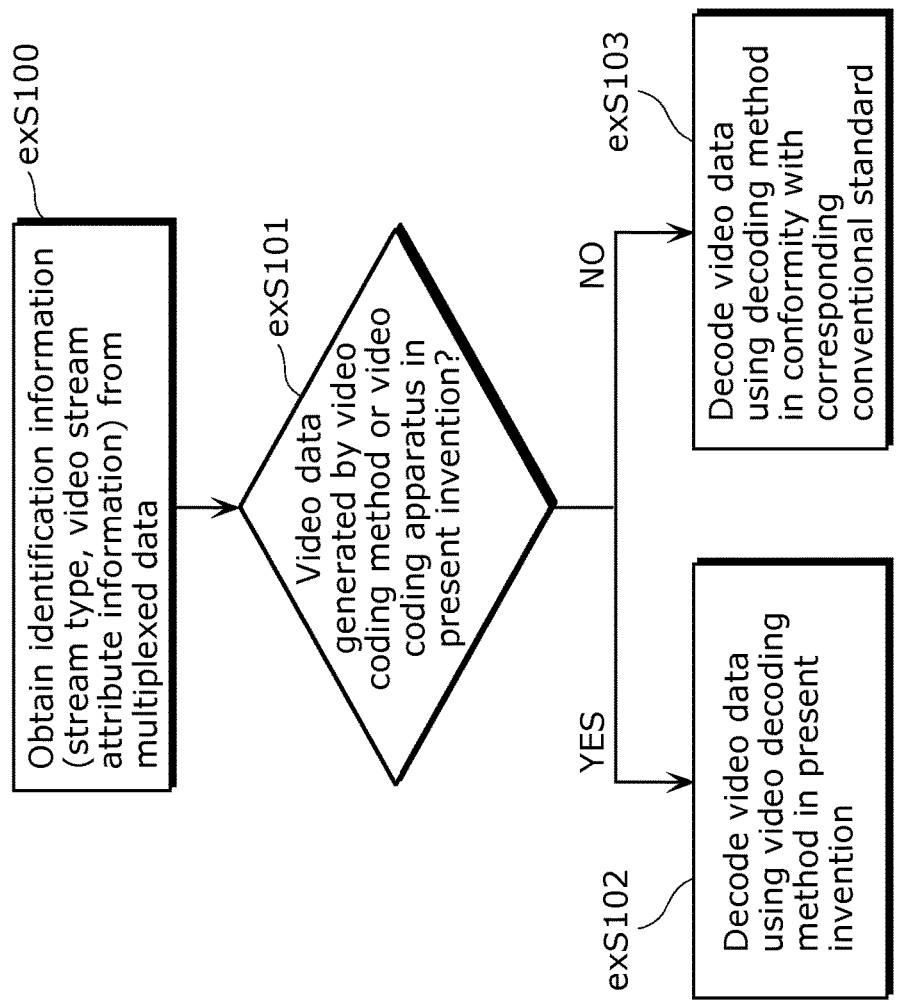
FIG. 31 shows steps for identifying video data.

Furthermore, FIG. 31 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 6

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit. As an example of the LSI, FIG. 124 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 7

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 33:
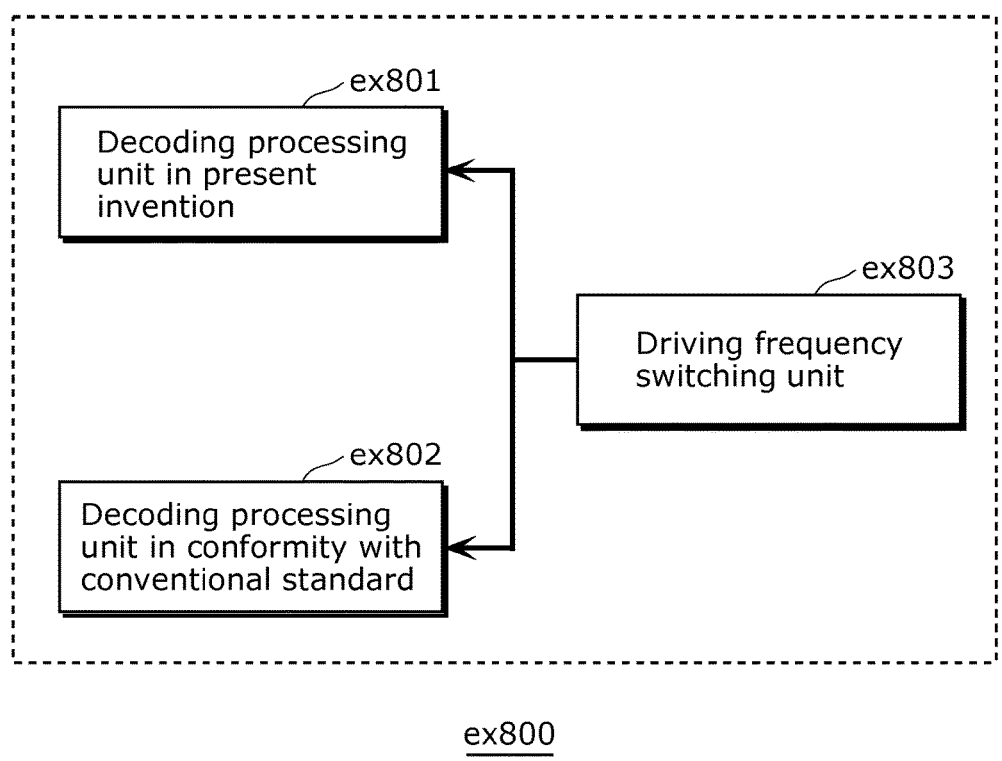
FIG. 33 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 33 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

Figure 32:
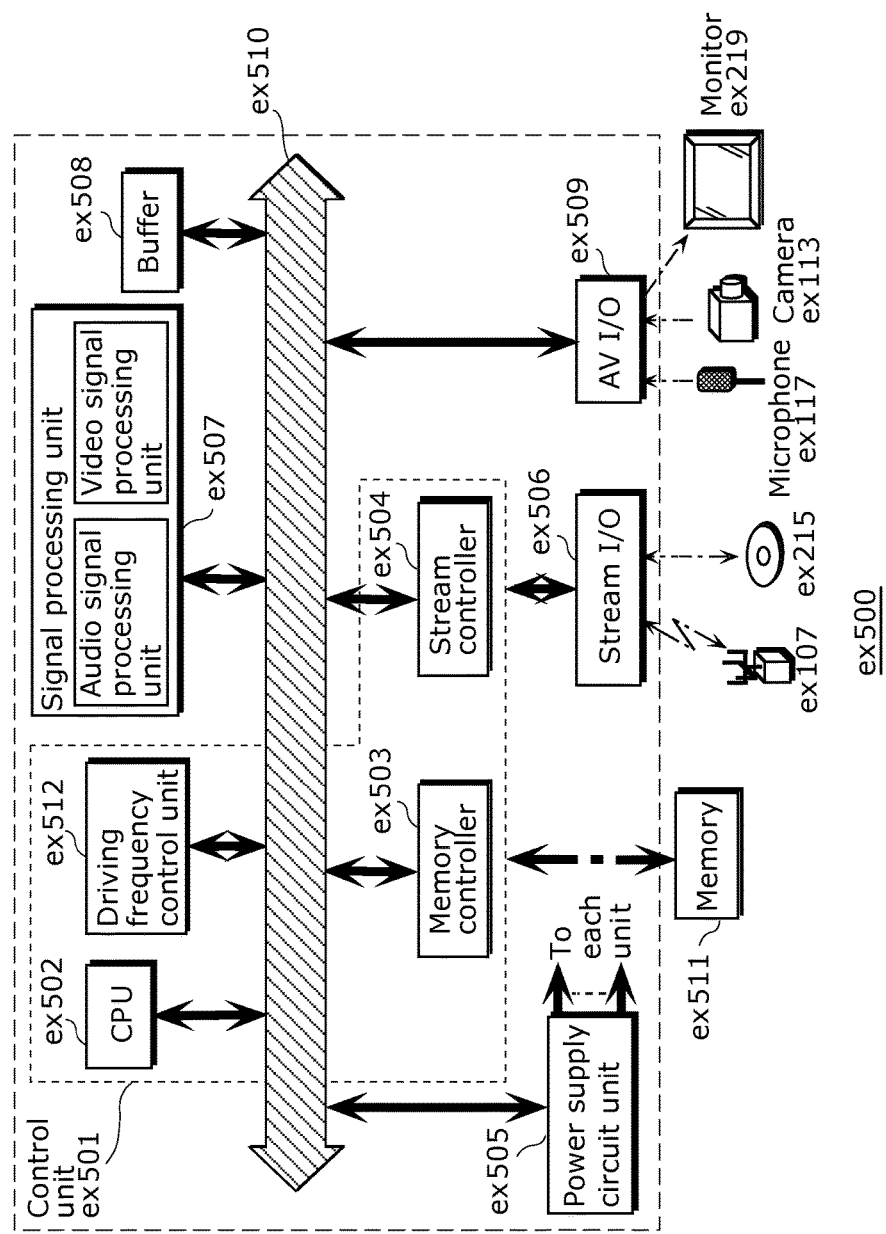
FIG. 32 shows an example of a configuration of an integrated circuit for implementing the moving picture coding method and the moving picture decoding method according to each of embodiments.

More specifically, the driving frequency switching unit ex803 includes the CPU ex502 and the driving frequency control unit ex512 in FIG. 32. Here, each of the decoding processing unit ex801 that executes the moving picture decoding method described in each of embodiments and the decoding processing unit ex802 that conforms to the conventional standard corresponds to the signal processing unit ex507 in FIG. 32. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 5 is probably used for identifying the video data. The identification information is not limited to the one described in Embodiment 5 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 35. The driving frequency can be selected by storing the look-up table in the buffer ex508 and in an internal memory of an LSI, and with reference to the look-up table by the CPU ex502.

Figure 34:
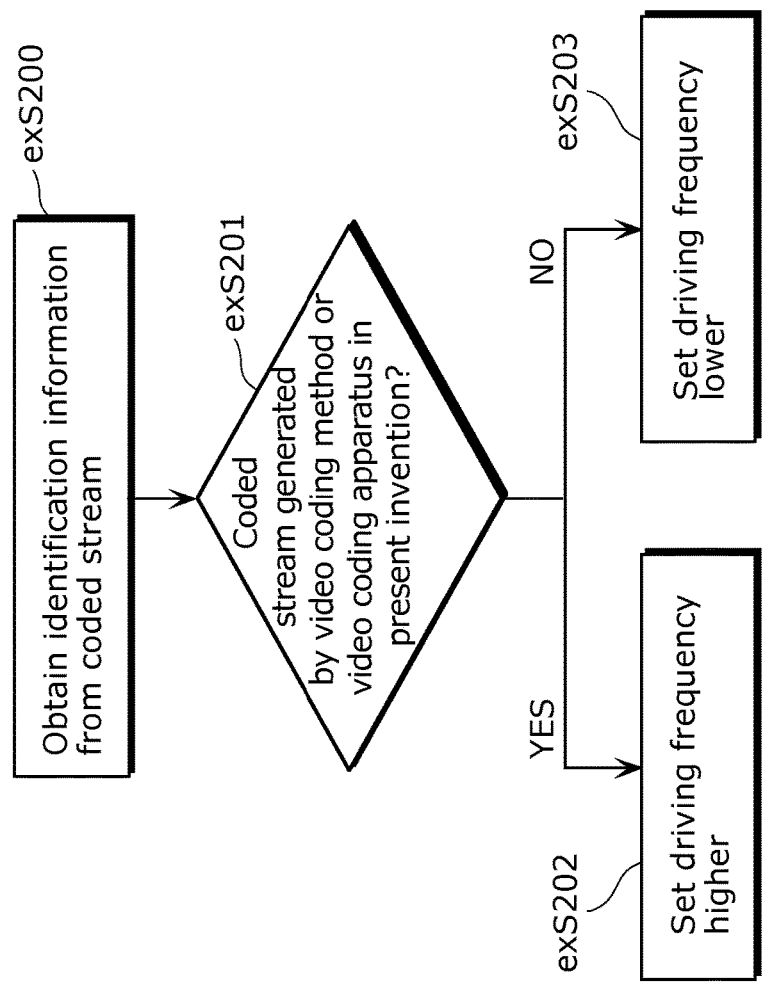
FIG. 34 shows steps for identifying video data and switching between driving frequencies.

FIG. 34 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 8

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in (a) of FIG. 36 shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present invention. Since the aspect of the present invention is characterized by the filtering process performed on the boundary between the divided regions in particular, for example, the dedicated decoding processing unit ex901 is used for the filtering process performed on the boundary between the divided regions. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Furthermore, ex1000 in (b) of FIG. 36 shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the moving picture decoding method according to the present invention and the conventional moving picture decoding method. Here, the dedicated decoding processing units ex1001 and ex1002 are not necessarily specialized for the processing according to the present invention and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the present invention and the moving picture decoding method in conformity with the conventional standard.

INDUSTRIAL APPLICABILITY

The image coding method and the image decoding method according to the present invention achieve the effect of increasing the coding efficiency, and can be thus used for a digital camera, a digital television, a Blu-ray disc (BD) recorder, and the like.

REFERENCE SIGNS LIST

10 Current block
20 Reference pixel
30, 40 Neighboring block
100 Image coding apparatus
110 Coding unit
111 Subtraction unit
112 Frequency transform unit
113 Quantization unit
114 Intra prediction mode determination unit
115 Motion estimation unit
116, 316 Intra prediction unit
117, 317 Motion compensation unit
118, 119, 315, 318 Switch
120 Decoding unit
121, 311 Inverse quantization unit
122, 312 Inverse frequency transform unit
123, 313 Addition unit
130 Output unit
131, 520 Variable-length coding unit
140, 510 Setting unit
141, 321 First prediction mode estimation unit
142, 322 Second prediction mode estimation unit
143, 515 Mode information generation unit
150, 314 Frame memory
160 Reference picture memory
170, 340 Control unit
211, 411, 511, 623 Prediction mode storage memory
212, 412 First prediction mode estimation derivation unit
213, 413 Second prediction mode estimation derivation unit
300 Image decoding unit
310 Decoding unit
320, 620 Restoration unit
323, 621 Signal determination unit
330, 610 Variable-length decoding unit
1401, 1501 Edge vector determination unit
1803, 1804 Edge

The invention claimed is:

1. A decoding method for decoding an encoded image on a block-by-block basis, the decoding method comprising:
decoding mode information that indicates a selected prediction mode for a current block in the encoded image;
specifying the selected prediction mode from among a plurality of candidates of prediction modes based on the mode information, the plurality of candidates of prediction modes including (i) a plurality of direction prediction modes and (ii) a plurality of predetermined prediction modes not including any of the plurality of direction prediction modes; and
decoding the current block by predicting the current block using the selected prediction mode,
wherein the specifying the selected prediction mode includes:
determining a first probable prediction mode from among the plurality of candidates of prediction modes, the first probable prediction mode being determined based on a prediction mode used to predict a neighboring block that is already decoded and is adjacent to the current block;
determining a second probable prediction mode from among the plurality of candidates of prediction modes, the second probable prediction mode not being determined based on each of prediction modes for neighboring blocks that are adjacent to the current block, and the second probable prediction mode being different from the first probable prediction mode; and
decoding the selected prediction mode based on the mode information, the first probable prediction mode, and the second probable prediction mode, and
wherein the determining of the second probable prediction mode includes:
determining whether or not the first probable prediction mode is set to a predetermined prior mode, the predetermined prior mode being included in the plurality of predetermined prediction modes not including any of the plurality of direction prediction modes; and
determining the predetermined prior mode as the second probable prediction mode, when the first probable prediction mode is not the predetermined prior mode.

2. The decoding method according to claim 1,
wherein the decoding the selected prediction mode further includes:
determining the first probable prediction mode as the selected prediction mode, when the mode information indicates that the first probable prediction mode is selected;
determining the second probable prediction mode as the selected prediction mode, when the mode information indicates that the second probable prediction mode is selected; and
decoding the selected prediction mode based on information that is included in the mode information and specifies the selected prediction mode, when the mode information indicates that both of the first probable prediction mode and the second probable prediction mode are not selected.

3. The decoding method according to claim 1,
wherein the determining the first probable prediction mode includes
determining, as the first probable prediction mode, a prediction mode assigned a smallest index number of index numbers assigned to each of the prediction modes of the neighboring blocks.

4. A decoding apparatus that decodes an encoded image on a block-by-block basis, the decoding apparatus comprising:
a processor; and
a non-transitory memory having stored thereon executable instructions, which when executed, cause the processor to perform:

decoding mode information that indicates a selected prediction mode for a current block in the encoded image;

specifying the selected prediction mode from among a plurality of candidates of prediction modes based on the mode information, the plurality of candidates of prediction modes including (i) a plurality of direction prediction modes and (ii) a plurality of predetermined prediction modes not including any of the plurality of direction prediction modes; and decoding the current block by predicting the current block using the selected prediction mode, wherein the specifying the selected prediction mode includes:

determining a first probable prediction mode from among the plurality of candidates of prediction modes, the first probable prediction mode being determined based on a prediction mode used to predict a neighboring block that is already decoded and is adjacent to the current block;

determining a second probable prediction mode from among the plurality of candidates of prediction modes, the second probable prediction mode not being determined based on each of prediction modes for neighboring blocks that are adjacent to the current block, and the second probable prediction mode being different from the first probable prediction mode; and decoding the selected prediction mode based on the mode information, the first probable prediction mode, and the second probable prediction mode, and wherein the determining of the second probable prediction mode includes:

determining whether or not the first probable prediction mode is set to a predetermined prior mode, the predetermined prior mode being included in the plurality of predetermined prediction modes not including any of the plurality of direction prediction modes; and determining the predetermined prior mode as the second probable prediction mode, when the first probable prediction mode is not the predetermined prior mode.

5. A non-transitory computer readable medium having encoded thereon a program for decoding an encoded image on a block-by-block basis using prediction, the program causing a computer to execute:

decoding mode information that indicates a selected prediction mode for a current block in the encoded image;

specifying the selected prediction mode from among a plurality of candidates of prediction modes based on the mode information, the plurality of candidates of prediction modes including (i) a plurality of direction prediction modes and (ii) a plurality of predetermined prediction modes not including any of the plurality of direction prediction modes; and decoding the current block by predicting the current block using the selected prediction mode, wherein the specifying the selected prediction mode includes:

determining a first probable prediction mode from among the plurality of candidates of prediction modes, the first probable prediction mode being determined based on a prediction mode used to predict a neighboring block that is already decoded and is adjacent to the current block;

determining a second probable prediction mode from among the plurality of candidates of prediction modes, the second probable prediction mode not being determined based on each of prediction modes for neighboring blocks that are adjacent to the current block, and the second probable prediction mode being different from the first probable prediction mode; and decoding the selected prediction mode based on the mode information, the first probable prediction mode, and the second probable prediction mode, and wherein the determining of the second probable prediction mode includes:

determining whether or not the first probable prediction mode is set to a predetermined prior mode, the predetermined prior mode being included in the plurality of predetermined prediction modes not including any of the plurality of direction prediction modes; and determining the predetermined prior mode as the second probable prediction mode, when the first probable prediction mode is not the predetermined prior mode.

6. The decoding method according to claim 1, wherein in the determining the second probable prediction mode, the second probable prediction mode is not determined dependent on each of the prediction modes for the neighboring blocks that are adjacent to the current block such that the second probable prediction mode is only determined based on the first probable prediction mode.

7. The decoding method according to claim 1, wherein a plurality of predetermined prediction modes includes a prediction mode in which a value of the current block is predicted using an average value of reference pixels.

8. The decoding method according to claim 1, wherein the plurality of predetermined prediction modes includes a DC prediction mode and an edge prediction mode, and the plurality of predetermined prediction modes does not include any direction prediction modes.

* * * * *